(12) United States Patent
Ishizuka

(10) Patent No.: US 6,831,267 B2
(45) Date of Patent: Dec. 14, 2004

(54) OPTICAL ENCODER

(75) Inventor: Kou Ishizuka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 09/780,433

(22) Filed: Feb. 12, 2001

(65) Prior Publication Data

US 2001/0017350 A1 Aug. 30, 2001

(30) Foreign Application Priority Data

| Feb. 15, 2000 | (JP) | .................................. 2000-037043 |
| Feb. 15, 2000 | (JP) | .................................. 2000-037044 |
| Feb. 15, 2000 | (JP) | .................................. 2000-037045 |
| Feb. 1, 2001 | (JP) | .................................. 2001-025124 |

(51) Int. Cl.$^7$ ................................................ H01J 3/14
(52) U.S. Cl. ........................... 250/231.13; 250/231.18
(58) Field of Search ................... 250/231.13–231.18, 250/237 R, 237 G; 356/140, 454, 455

(56) References Cited

U.S. PATENT DOCUMENTS

| 5,283,434 A | | 2/1994 | Ishizuka et al. |
| 5,390,022 A | | 2/1995 | Ishizuka et al. |
| 5,448,358 A | | 9/1995 | Ishizuka et al. |
| 5,481,106 A | | 1/1996 | Nyui et al. |
| 5,483,377 A | | 1/1996 | Kaneda et al. |
| 5,498,870 A | | 3/1996 | Ishizuka |
| 5,537,210 A | * | 7/1996 | Kaneda et al. ............... 356/499 |
| 5,557,396 A | | 9/1996 | Ishizuka et al. |
| 5,569,913 A | | 10/1996 | Ishizuka et al. |
| 5,621,527 A | | 4/1997 | Kaneda et al. |
| 5,663,794 A | | 9/1997 | Ishizuka |
| 5,666,196 A | | 9/1997 | Ishii et al. |
| 5,680,211 A | | 10/1997 | Kaneda et al. |
| 5,696,373 A | * | 12/1997 | Fukui et al. ............. 250/237 G |
| 5,880,839 A | | 3/1999 | Ishizuka et al. |
| 5,956,140 A | | 9/1999 | Ishizuka et al. |
| 6,151,185 A | | 11/2000 | Ishizuka et al. |

* cited by examiner

Primary Examiner—Edward J. Glick
Assistant Examiner—Hoon Song
(74) Attorney, Agent, or Firm—Fitzpatrick, Cella, Harper & Scinto

(57) ABSTRACT

A light beam emitted from a semiconductor-laser light source is projected onto a diffraction-grating scale after passing through a collimator lens, a beam splitter and a central portion of an annular reflection grating. Two diffracted light beams reflected from the diffraction-grating scale are projected onto the annular reflection grating. The annular reflection grating diffracts the light beams projected onto all portions thereon to a substantially original direction to be projected onto and diffracted from the same position on the diffraction-grating scale. The diffracted light beams are superposed and the resultant light beam is returned to the beam splitter. The light beam is guided by the beam splitter in a direction different from the semiconductor-laser light source, and is detected by a photosensor as an interference light beam. Even if the oscillation wavelength of the semiconductor-laser light source changes, for example, due to a change in the temperature environment, to change the diffraction angles of the diffracted light beams, the light beams are diffracted with original diffraction angles by the annular reflection grating, the position of rediffraction by the diffraction-grating scale and the state of emitted light beams are invariable. Hence, the state of interference is stable.

11 Claims, 46 Drawing Sheets

OPTICAL ENCODER

BACKGROUND OF THE INVENTION

1. Field of the Invention

The present invention relates to an optical encoder having a reflection mechanism using an annular diffraction grating for detecting information relating to the position or the angle in an industrial measuring apparatus or the like.

2. Description of the Related Art

FIG. 1 is a perspective view illustrating the configuration of a conventional linear encoder. In FIG. 1, a light beam from a semiconductor-laser light source 1, serving as a coherent light source, is divided into polarized components by a polarizing beam splitter 3 via a collimator lens 2. A P-polarized light beam passing through the polarizing beam splitter 3 is projected onto a diffraction-grating portion on a scale 4 with an angle θ after being propagated on an optical reflecting surface, is emitted as a +first-order diffracted light beam by being reflected, is returned to the original optical path by a reflecting optical element 6 via a ¼-wavelength plate 5, and is finally returned to the polarizing beam splitter 3 by being subjected to +first-order diffraction.

An S-polarized light beam reflected by the polarizing beam splitter 3 is projected onto the diffraction-grating portion on the scale 4 with an angle θ after being propagated on the optical reflecting surface, is emitted as a −first-order diffracted light beam by being reflected, is returned to the original optical path by a reflecting optical element 6 via a ¼-wavelength plate 5, and is returned to the polarizing beam splitter 3 by being subjected to −first-order diffraction.

Since the ¼-wavelength plate 5 is inserted in the optical path of each of the diffracted light beams, the orientation of polarization is shifted by 90 degrees during the back and forth movement, so that the +first-order diffracted light beam and the −first-order diffracted light beam are returned to the polarizing beam splitter 3 as an S-polarized light beam and a P-polarized light beam, respectively. Accordingly, the +first-order diffracted light beam is reflected by the polarizing beam splitter 3 and the −first-order diffracted light beam passes through the polarizing beam splitter 3, and the two light beams are emitted in a state in which the wave surfaces of the two light beams are superposed. Then, the superposed light beams are converted into a linearly-polarized light beam, in which the orientation of polarization changes based on the phase difference between the two light beams, while passing through a ¼-wavelength plate 7. The light beam is then divided into two light beams by a non-polarizing beam splitter 8 provided behind the ¼-wavelength plate 7. Only light beams having specific orientations of polarization are extracted by polarizing plates 9a and 9b, and light/dark signals are obtained in photosensors 10a and 10b.

Since the phases (timings) of the light/dark signals are provided by deviations in the orientations of polarization of the polarizing plates 9a and 9b, the phase difference between the light/dark signals is set to 90 degrees by shifting the orientations of polarization of the polarizing plates 9a and 9b by 45 degrees.

A refractive-index-distribution-type lens optical system is used as the reflecting optical element 6, whose length is selected so as to condense an incident parallel light beam at an end surface. A reflecting film is coated on the end surface. Such an optical element is called a cat's eye, and has the property of guiding an incident light beam in the entirely opposite direction. In general, the above-described encoder has the properties that, when the wavelength of the semiconductor-laser light source 1 changes, the diffraction angle changes to shift the optical path and to change the angle between two light beams to be subjected to interference. As a result, the state of interference changes.

Furthermore, if the relative alignment between the scale 4 and the detection head unit shifts, the optical path is also shifted.

However, by using the above-described reflecting optical element 6, the light beam moves with an original angle even if the diffraction angle changes, so that the path of the rediffracted light beam does not change. As a result, stable measurement can be performed.

However, in the above-described conventional approach, the reflecting optical element 6 must have a size of about 5 mm. Since it is necessary to project the light beam substantially perpendicularly in order to obtain a predetermined performance, the location to dispose the reflecting optical elements 6 must generally be determined in accordance with the diffraction angle. In addition, since the reflecting optical elements 6 are obliquely disposed in the space, reduction in the size of the entire encoder is limited.

When the scale 4 is a rotary encoder, a radial diffraction grating is used. In this case, if the light beam is not projected onto a central portion of the cat's eye, the location irradiated by the returned light beam is slightly shifted when the returned light beam is reprojected onto the diffraction-grating scale 4.

As a result, the phenomenon that the orientation of the rediffracted light beam is shifted occurs. The influence of this phenomenon is larger as the pitch of the grating is smaller to the order of micrometers and the diameter of the radial-grating scale (the diameter of the disk) is smaller. In a type in which the scale 4 and the detection unit are separated, this influence greatly appears as an alignment error due to errors in the gap between the scale 4 and the detection unit, the angle of installation of these units, and the like. Accordingly, a system using a cat's eye has a limitation in the use of a finer radial-grating scale.

A grating interference encoder of this type adopts a micrometer-order fine scale. By causing two light beams obtained as a result of diffraction by this scale to interfere with each other, a encoder having a much higher resolution than a geometrical-optics-type encoder is obtained.

This encoder adopts a configuration of generating an interference pattern by synthesizing the wavefronts of two diffracted light beams. Since the encoder is constituted as an interference optical system, it is necessary to very precisely process respective optical elements and very precisely dispose these elements. Particularly in the case of an assembled encoder in which a scale unit and a detection-head unit are separated, since the user must mount the scale unit and the detection-head unit on a motor, a stage or the like, difficulty in the mounting operation causes problems.

SUMMARY OF THE INVENTION

It is an object of the present invention to provide an optical encoder that solves the above-described problems and stably detects light beams using an optical system for correcting shifts of optical paths, instead of a cat's eye.

It is another object of the present invention to provide an optical encoder in which an excellent S/N ratio can be obtained.

According to one aspect, the present invention which achieves these objectives relates to a grating interference encoder including a light-emitting device, a diffraction grating for generating two diffracted light beams having different orders by being irradiated by a coherent light beam from an illuminating optical system, an annular grating for deflecting the two diffracted light beams having the different orders generated from the diffraction grating to cause the deflected light beams to be reprojected onto the diffraction grating, and a beam splitter for guiding a light beam, obtained by causing diffracted light beams generated by rediffraction of the diffracted light beams reprojected onto the diffraction grating and interfere with each other, to a photosensor, and the photosensor.

According to another aspect, the present invention which achieves these objectives relates to a grating interference encoder including a light-emitting device, a diffraction grating for generating two diffracted light beams having different orders by being irradiated by a coherent light beam from an illuminating optical system, an annular grating for deflecting the two diffracted light beams having the different orders generated from the diffraction grating to cause the deflected light beams to be reprojected onto the diffraction grating, a condenser for condensing the diffracted light beams generated by the diffraction grating onto substantially one point on the annular grating, and a beam splitter for guiding a light beam, obtained by causing diffracted light beams generated by rediffraction of the diffracted light beams reprojected onto the diffraction grating to be superposed and interfere with each other, to a photosensor, and the photosensor.

According to still another aspect, the present invention which achieves these objectives-relates to a grating interference encoder including a light-emitting device, a diffraction grating for generating two diffracted light beams having different orders by being irradiated by a coherent light beam from an illuminating optical system, an annular grating for deflecting the two diffracted light beams having the different orders generated from the diffraction grating to cause the deflected light beams to be reprojected onto the diffraction grating, a condenser for making the diffracted light beams generated by the diffraction grating in a state of tending to be condensed onto the annular grating, and a beam splitter for guiding a light beam, obtained by causing diffracted light beams generated by rediffraction of the diffracted light beams reprojected onto the diffraction grating to be superposed and interfere with each other, to a photosensor, and the photosensor.

According to yet another aspect, the present invention which achieves these objectives relates to a grating-interference-type encoder including a light-emitting device, a diffraction grating for generating two diffracted light beams having different orders by being irradiated by a coherent light beam from an illuminating optical system, an annular grating for deflecting the two diffracted light beams having the different orders generated from the diffraction grating to cause the deflected light beams to be reprojected onto the diffraction grating, a condenser for condensing the diffracted light beams generated by the diffraction grating onto substantially one point on the diffraction grating, and a beam splitter for guiding a light beam, obtained by causing diffracted light beams generated by rediffraction of the diffracted light beams reprojected onto the diffraction grating to be superposed and interfere with each other, to a photosensor, and the photosensor.

According to still a further aspect, the present invention which achieves these objectives relates to a grating interference encoder including a light-emitting device, a diffraction grating for generating two diffracted light beams having different orders by being irradiated by a coherent light beam from an illuminating optical system, an annular grating for deflecting the two diffracted light beams having the different orders generated from the diffraction grating to cause the deflected light beams to be reprojected onto the diffraction grating, a condenser for projecting the diffracted light beams generated by the diffraction grating in a state of tending to be condensed on the annular grating for causing the diffracted light beams to be diffracted and deflected, and for condensing the diffracted light beams onto substantially one point on the diffraction grating, and a beam splitter for guiding a light beam, obtained by causing diffracted light beams generated by rediffraction of the diffracted light beams reprojected onto the diffraction grating to be superposed and interfere with each other, to a photosensor, and the photosensor.

According to still another aspect, the present invention which achieves these objectives relates to a grating interference encoder including a light-emitting device, a diffraction grating for generating two diffracted light beams having different orders by being irradiated by a coherent light beam from an illuminating optical system, an annular grating for deflecting the two diffracted light beams having the different orders generated from the diffraction grating to cause the deflected light beams to be reprojected onto the diffraction grating, a linear condenser for linearly condensing the coherent light beam from the light-emitting device onto the diffraction grating, and a beam splitter for guiding a light beam, obtained by causing diffracted light beams generated by rediffraction of the diffracted light beams reprojected onto the diffraction grating to be superposed and interfere with each other, to a photosensor, and the photosensor.

The foregoing and other objects, advantages and features of the present invention will become more apparent from the following detailed description of the invention taken in conjunction with the accompanying drawings.

DETAILED DESCRIPTION OF THE INVENTION

The present invention will now be described in detail with reference to embodiments shown in FIGS. 2 through 11.

Figure 1:
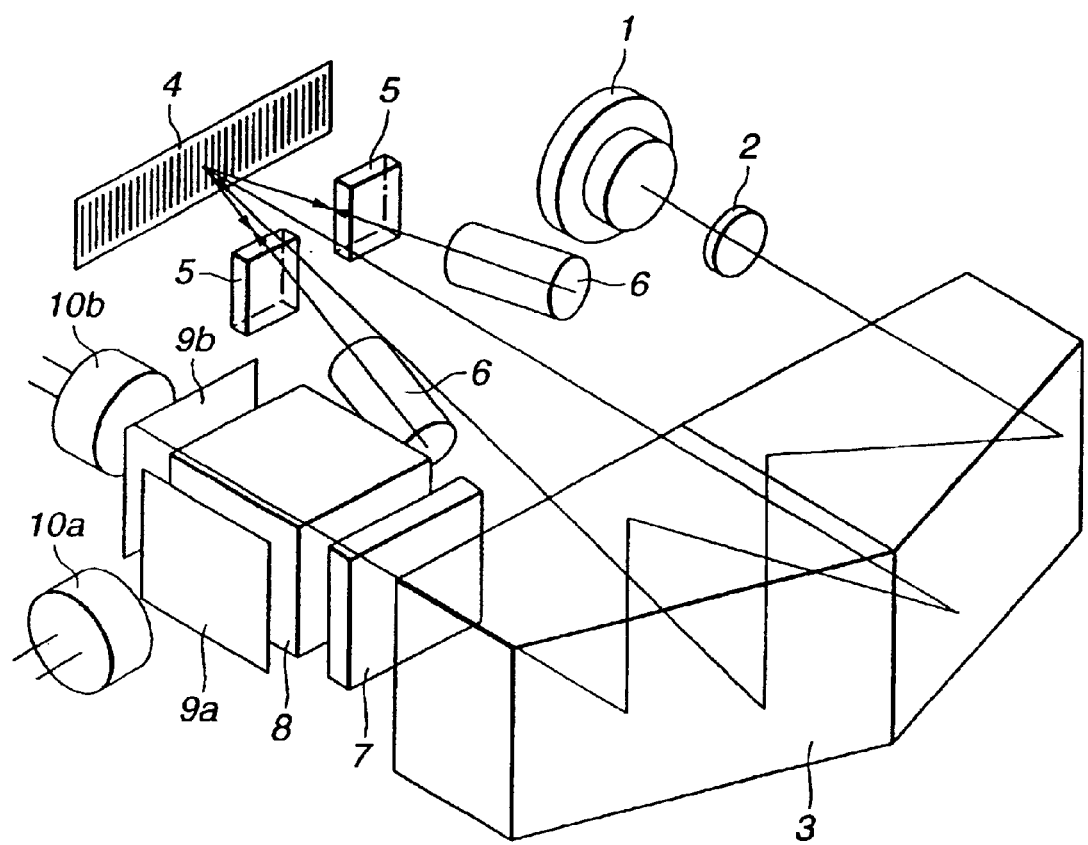
FIG. 1 is a diagram illustrating the configuration of a conventional encoder.
Figure 2:
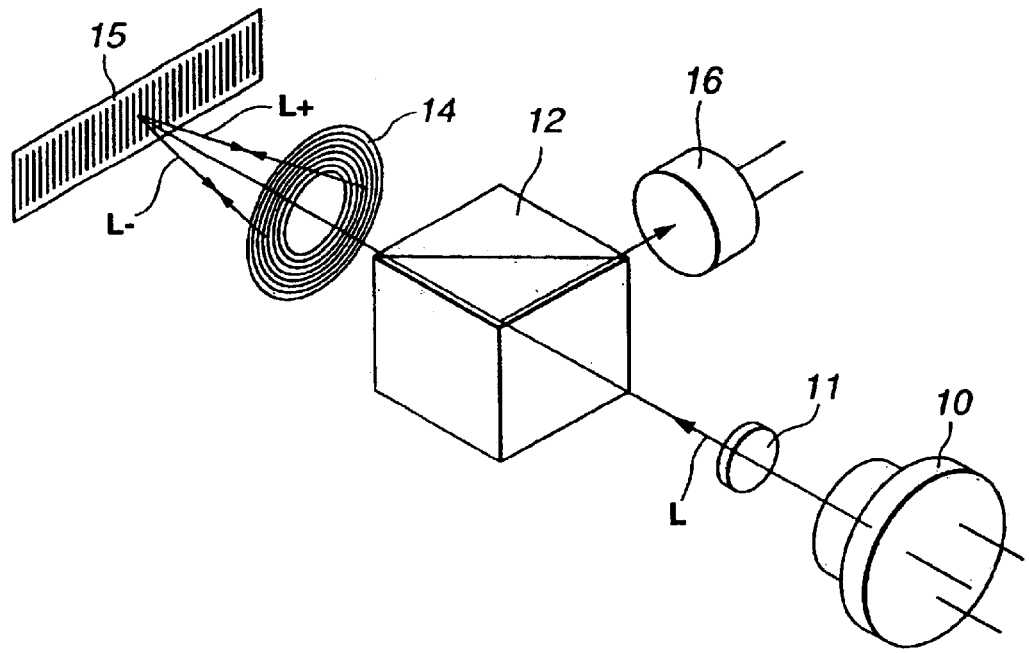
FIG. 2 is a diagram illustrating the configuration of an encoder according to a first embodiment of the present invention.

FIG. 2 is a diagram illustrating the configuration of a linear encoder according to a first embodiment of the present invention. In FIG. 2, a collimator lens 11, a beam splitter 12, an annular reflection grating 14, and a diffraction-grating scale 15 are arranged in the optical path of a light beam emitted from a semiconductor-laser light source 10, and a photosensor 16 is disposed in a reflecting direction of the beam splitter 12.

When a grating pitch on the diffraction-grating scale 15 is represented by P1, a pitch P2 of the annular reflection grating 14 is set so as to satisfy a relationship of $P2=P1/2$.

According to such a configuration, a light beam L emitted from the semiconductor-laser light source 10 becomes a substantially parallel light beam by the collimator lens 11, and is projected onto the diffraction-grating scale 15 after passing through central portions of the beam splitter 12 and a central portion of the annular reflection grating 14. Diffracted light beams L+ and L− reflected from the diffraction-grating scale 15 are projected onto the annular reflection grating 14. The annular reflection grating 14 locally operates as a linear diffraction grating having the grating pitch of P2, to project the light beams L+ and L− onto the same position on the diffraction-grating scale 15. The light beams L+ and L− are again diffracted and returned to the beam splitter 12 in a superposed state.

The resultant light beam is guided in a direction different from the semiconductor-laser light source 10 by the beam splitter 12, and is detected as an interference light beam by the photosensor 16. When ±first-order diffracted light beams are used, the period of light and dark of interference equals four periods with respect to the movement of one pitch of the diffraction-grating scale 15.

Figure 3:
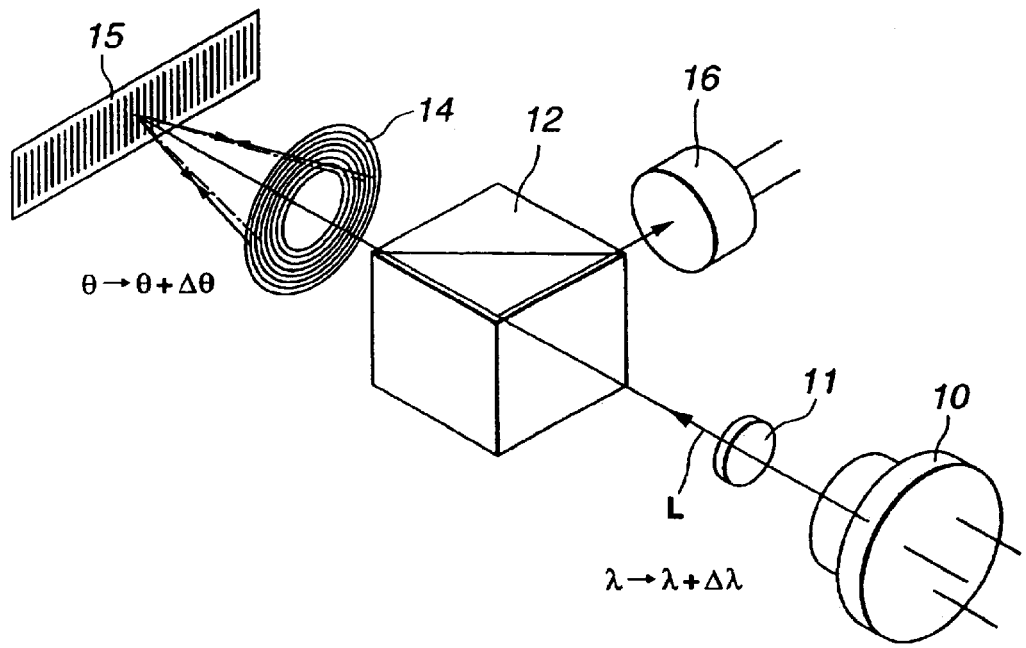
FIG. 3 is a diagram illustrating the influence of a change in the wavelength of a light beam emitted from a light source.

FIG. 3 is a diagram illustrating a shift of the optical path when the diffraction angle changes due to a change in the oscillation wavelength of the semiconductor-laser light source 10 caused, for example, by a change in the temperature environment. Even if the diffraction angle of the diffracted light beam by the diffraction-grating scale 15 changes, since the light beam is diffracted with an original diffraction angle by the annular reflection grating 14, the position of rediffraction by the diffraction-grating scale 15 and the state of emitted light beams are invariable. Hence, the state of interference is stable, and no problems arise even if the grating is replaced by a radial grating.

Figure 4:
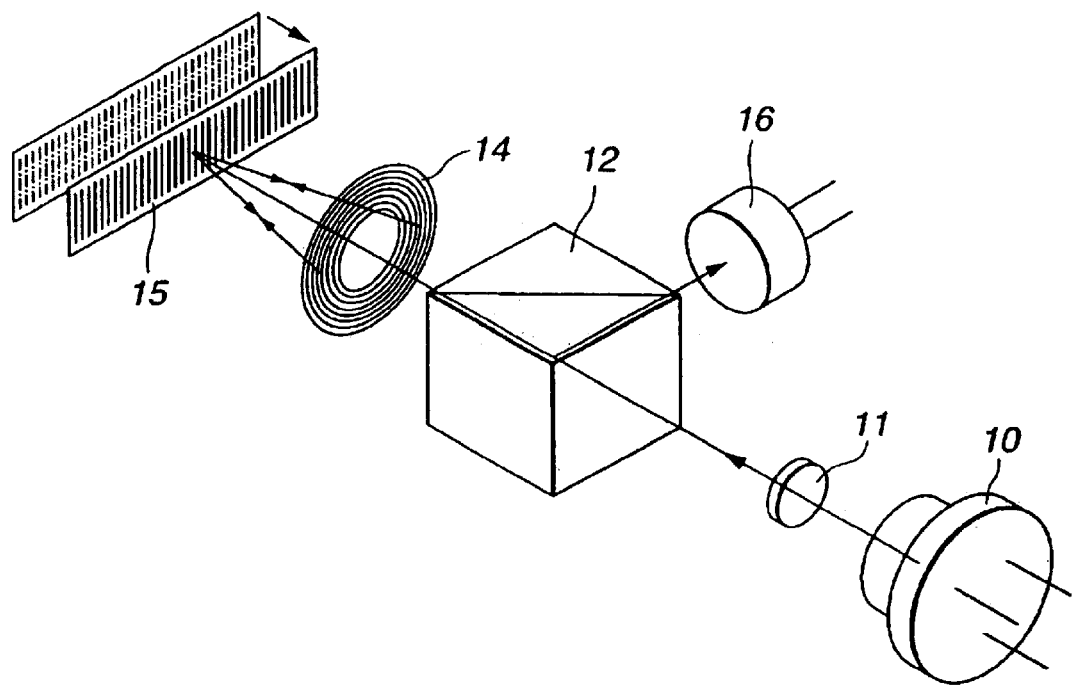
FIG. 4 is a diagram illustrating a change in the gap between a scale and a detection head.

FIG. 4 is a diagram illustrating a shift of the optical path when the position of the diffraction-grating scale 15 is shifted. Even if the gap between the detection head and the diffraction-grating scale 15 is reduced, since the diffracted light beams from the diffraction-grating scale 15 are diffracted by the annular reflection grating 14, the position of rediffraction by the diffraction-grating scale 15 and the state of emitted light beams are invariable, and the state of interference is stable. No problems arise even if the grating is replaced by a radial grating.

Figure 5:
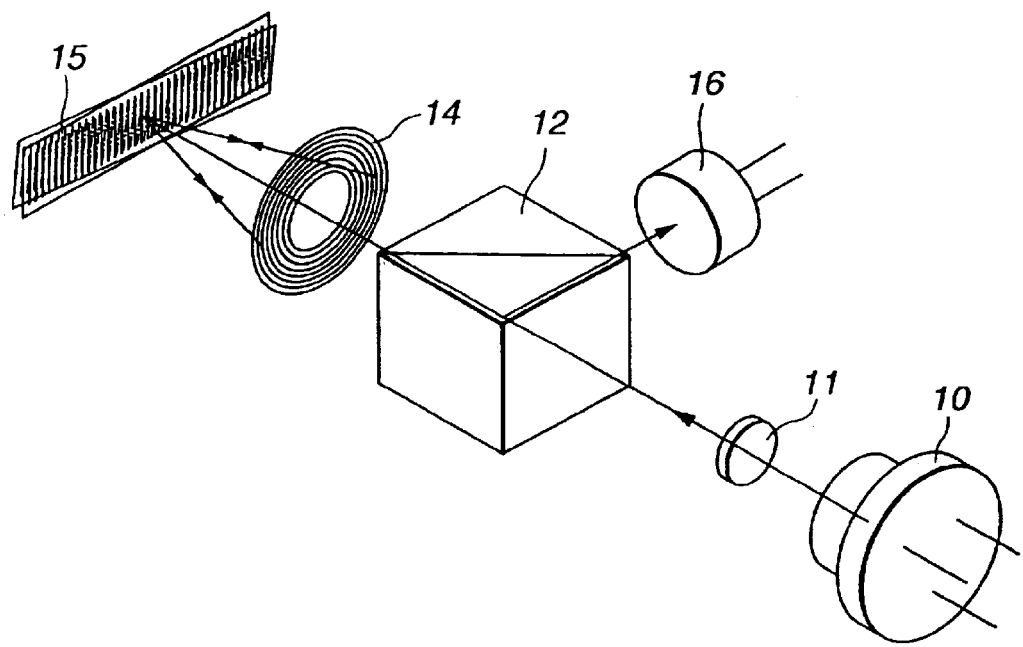
FIG. 5 is a diagram illustrating the influence of a change in the azimuth angle between the scale and the detection head.

FIG. 5 is a diagram illustrating a shift of the optical path when the angle of installation between the diffraction-grating scale 15 and the detection-head unit is slightly shifted in an azimuth direction. Even if an azimuth error is slightly present, the diffracted light beams from the diffraction-grating scale 15 are diffracted in the original optical paths by the function of the annular diffraction grating 14, the position of rediffraction by the diffraction-grating scale 15 and the state of emitted light beams are invariable, and the state of interference is stable.

Figure 6:
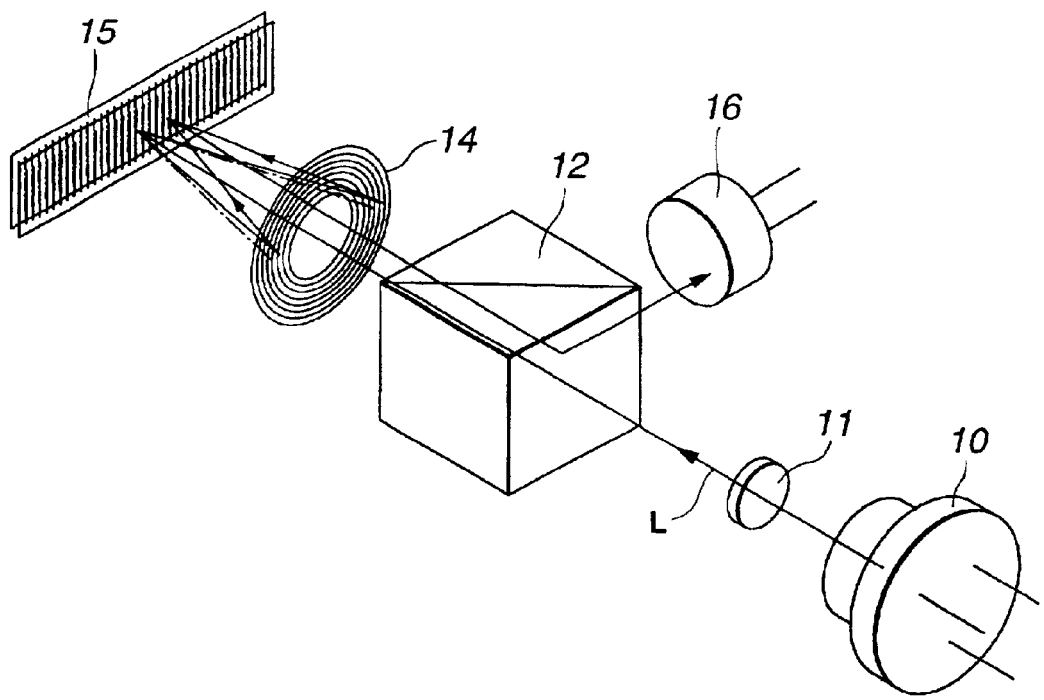
FIGS. 6 and 7 are diagrams, each illustrating the influence of a change in the tilt angle between the scale and the detection head.

FIG. 6 is a diagram illustrating a shift of the optical path when the angle of installation between the diffraction-grating scale 15 and the detection-head unit is provided with a tilt error with respect to the line of the grating. Even if a slight amount of tilt error is provided, since the difference between the ±first-order diffracted light beams in the position of rediffraction and the state of the emitted light beam does not change, the state of interference is stable. However, the position of rediffraction is shifted.

Figure 7:
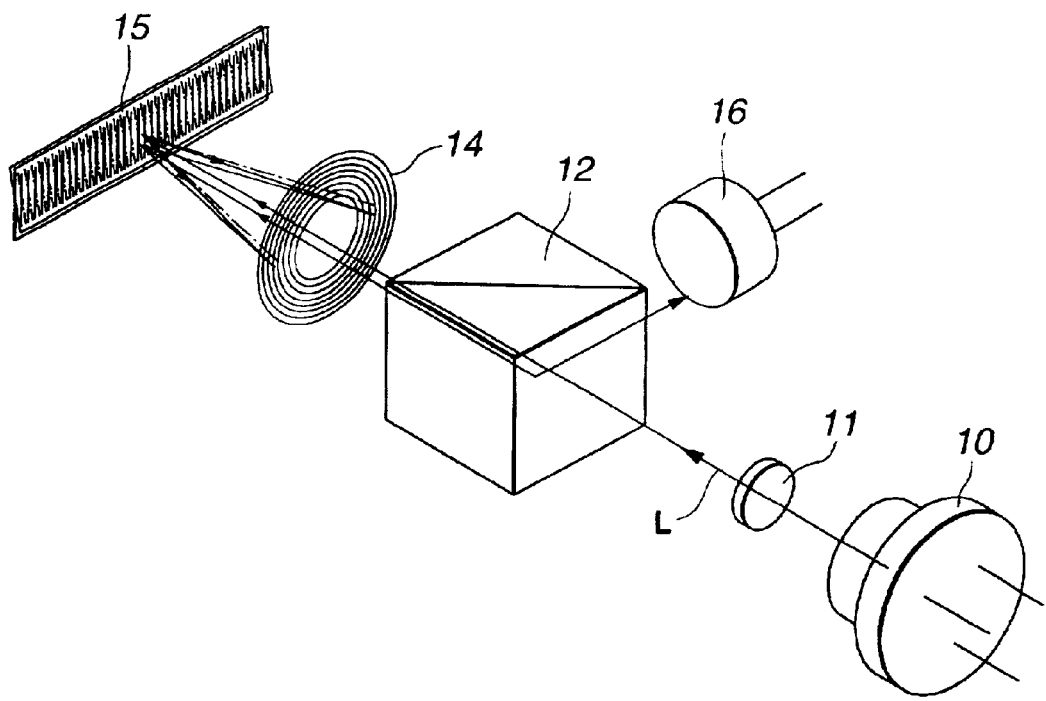

FIG. 7 is a diagram illustrating a shift of the optical path when the angle of installation between the diffraction-grating scale 15 and the detection-head unit is provided with a tile error with respect to the orientation of arrangement of the grating. Even if a slight amount of tilt error is provided, since the difference between the ±first-order diffracted light beams does not change, the state of interference is stable. However, the position of rediffraction is shifted.

As described above, by adopting the annular reflection grating 14 as a reflecting optical element, it is possible to obtain a small-size and high-resolution encoder having a large allowance for a mounting error.

Figure 8:
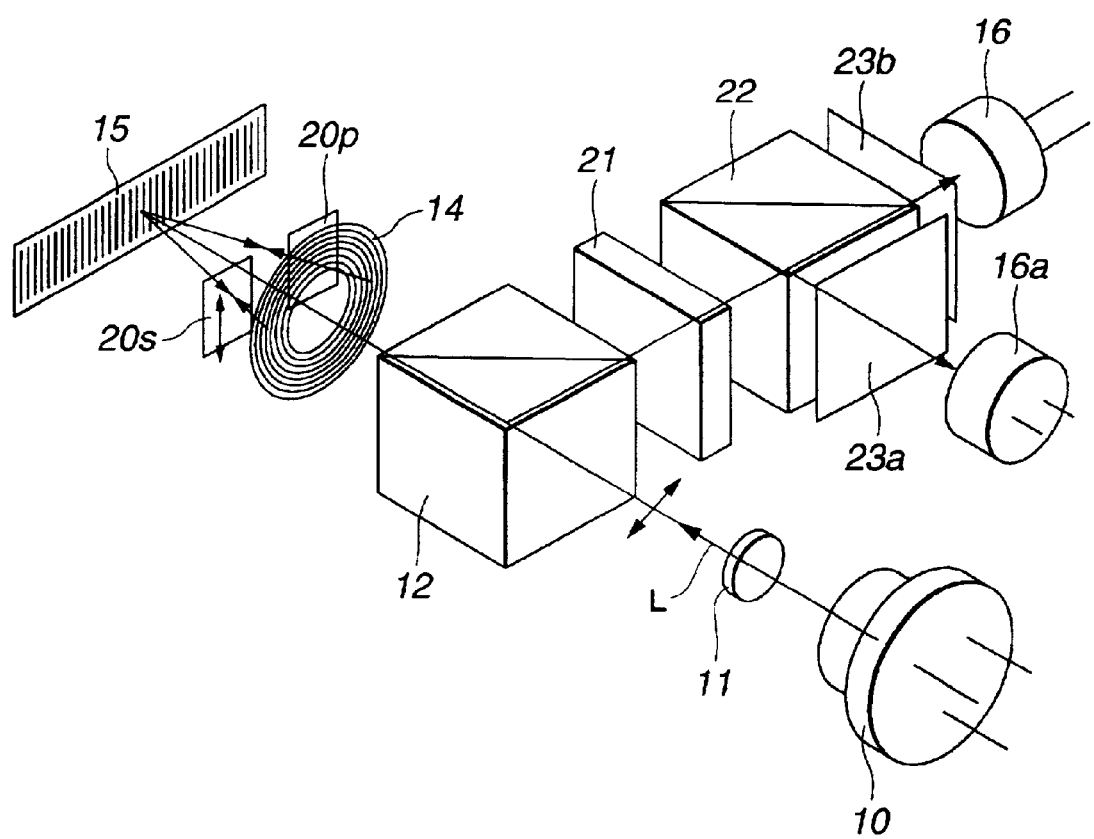
FIG. 8 is a diagram illustrating the configuration of an encoder according to a second embodiment of the present invention.

FIG. 8 is a diagram illustrating the configuration of a second embodiment of the present invention, in which two-phase signals are detected by disposing polarizers so as to generate a phase-difference signal. In FIG. 8, a collimator lens 11, a non-polarizing beam splitter 12, an annular reflection grating 14, two polarizing plates 20S and 20P whose orientations of polarization are shifted by 90 degrees from each other, and a diffraction-grating scale 15 are arranged in the optical path of a light beam from a semiconductor-laser light source 10, serving as a coherent light source. A ¼-wavelength plate 21 and a non-polarizing beam splitter 22 are arranged in the reflecting direction of the non-polarizing beam splitter 12. A polarizing plate 23a and a photosensor 16a are disposed in the reflecting direction of the non-polarizing beam splitter 22, and a polarizing plate 23b and a photosensor 16b are arranged in the transmitting direction of the non-polarizing beam splitter 22.

According to the above-described configuration, a light beam L from the semiconductor-laser light source 10 passes through the collimator lens 11 and the non-polarizing beam splitter 12, and is substantially perpendicularly projected onto the diffraction-grating scale 15 after passing through a central transmitting window portion of the annular reflection grating 14. A +first-order diffracted light beam reflected from the diffraction-grating scale 15 is emitted with a diffraction angle θ, is diffracted and reflected to the original optical path by the annular reflection grating 14, and is returned to the non-polarizing beam splitter 12 by being subjected to +first-order diffraction by the diffraction-grating scale 15.

A −first-order diffracted light beam reflected from the diffraction-grating scale 15 is diffracted and reflected to the original optical path by the annular reflection grating 14, and is returned to the non-polarizing beam splitter 12 by being subjected to −first-order diffraction by the diffraction-grating scale 15. The light beam projected from the semiconductor-laser light source 10 onto the diffraction-grating scale 15 has vertically and horizontally polarized components. Although the ±first-order diffracted light beams propagated to the non-polarizing beam splitter 12 are not light/dark light beams, the orientations of polarization of these light beams are shifted by 90 degrees from each other and the wavefronts of these light beams are superposed.

As a result, the two light beams reflected by the non-polarizing beam splitter 12 pass through the ¼-wavelength plate 21 and is converted into a linearly polarized light beam whose orientation of polarization changes based on the phase difference between the two light beams. The obtained light beam is divided into two light beams by the non-polarizing beam splitter 22 provided behind the ¼-wavelength plate 21. Only specific orientations of polarization are extracted by the polarizing plates 23a and 23b, and light/dark signals are sensed by the photodetectors 16a and 16b. The phases (timings) of these light/dark signals are provided by shifts of the orientation of polarization of the polarizing plates 23a and 23b. That is, by shifting the orientations of polarization of the polarizing plates 23a and 23b by 45 degrees in opposite directions, the phase difference between the light-dark signals is set to 90 degrees.

Figure 9:
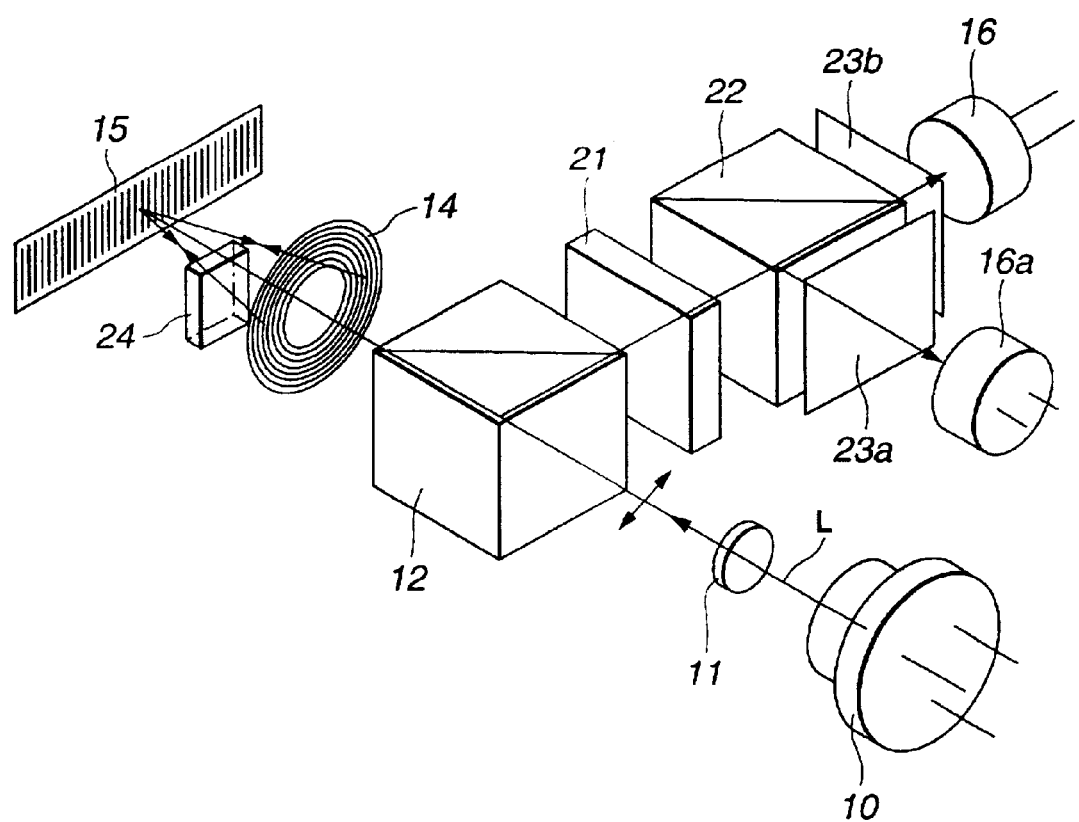
FIG. 9 is a diagram illustrating the configuration of an encoder according to a third embodiment of the present invention.

FIG. 9 is a diagram illustrating the configuration of a third embodiment of the present invention, in which two-phase signals are detected by disposing a crystal optical element so as to generate a phase-difference signal. In the third embodiment, a ¼-wavelength plate 24 is inserted in one of optical paths between a diffraction-grating scale 15 and an annular reflection grating 14.

A light beam from a semiconductor-laser light source 10 is substantially perpendicularly projected onto the diffraction-grating scale 15 after passing through a non-polarizing beam splitter 12. A +first-order diffracted light beam reflected from the diffraction-grating scale 15 is emitted with a diffraction angle θ reaches an annular reflection grating 14 after passing through the ¼-wavelength plate 24, is diffracted and reflected to the original optical path by the annular reflection grating 14, and is returned to the non-polarizing beam splitter 12 by being subjected to +first-order diffraction by the diffraction-grating scale 15.

A −first-order diffracted light beam reflected from the diffraction-grating scale 15 is emitted with a diffraction angle θ reaches the annular reflection grating 14 after passing through the ¼-wavelength plate 24, is diffracted and reflected to the original optical path by the annular reflection grating 14, and is returned to the non-polarizing beam splitter 12 by being subjected to −first-order diffraction by the diffraction-grating scale 15. The polarized component of the light beam projected from the semiconductor-laser light source 10 onto the diffraction-grating scale 15 makes an angle of 45 degrees with respect to the optical axis of the ¼-wavelength plate 24, and the orientation of polarization is shifted by 90 degrees only for a light beam passing back and forth through the ¼-wavelength plate 24. Hence, although the ±first-order diffracted light beams propagated to the non-polarizing beam splitter 12 are not light/dark light beams, the wavefronts of these light beams are superposed in a state in which the orientations of polarization are shifted by 90 degrees from each other.

Then, as in the second embodiment, these light beams pass through a ¼-wavelength plates 21 and a non-polarizing beam splitter 22, and light/dark signals are sensed by photosensors 16a and 16b via polarizing plates 23a and 23b, respectively.

Figure 10:
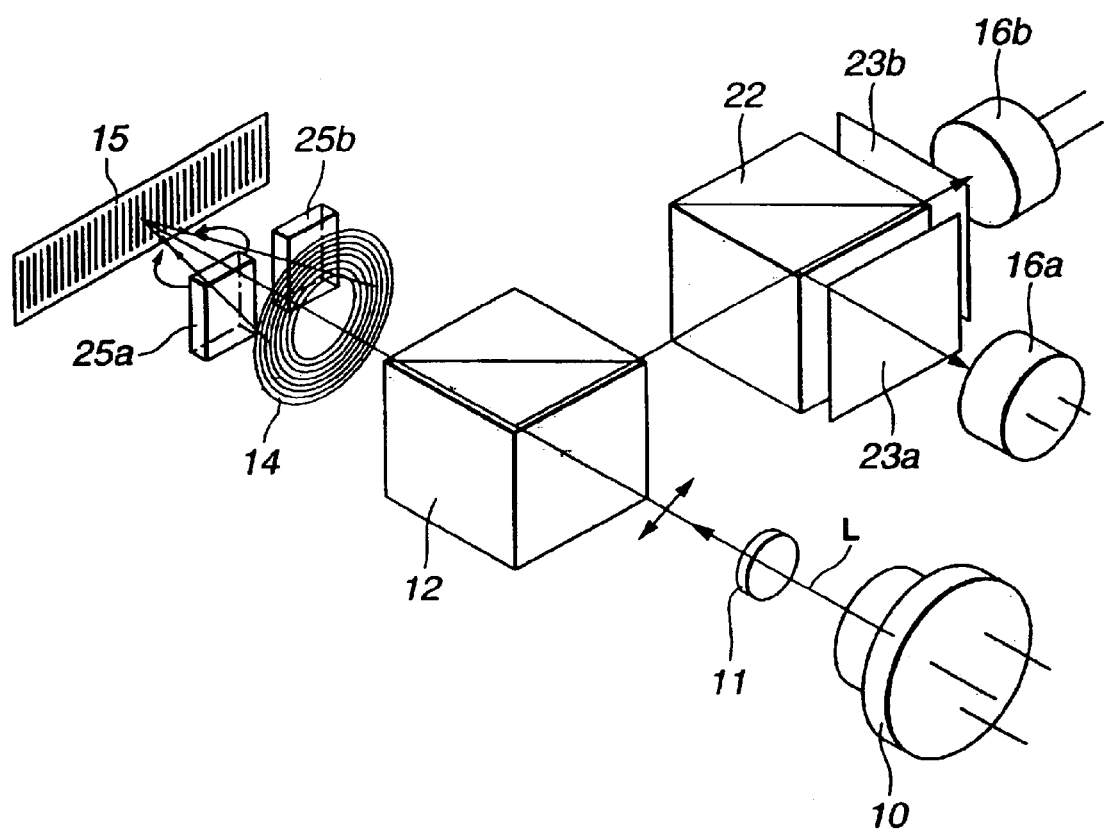
FIG. 10 is a diagram illustrating the configuration of an encoder according to a fourth embodiment of the present invention.

FIG. 10 is a diagram illustrating the configuration of a fourth embodiment of the present invention, in which two-phase signals are detected by disposing a crystal optical element so as to generate a phase-difference signal. In the fourth embodiment, ⅛-wavelength plates 25a and 25b are inserted in optical paths between a diffraction-grating scale 15 and an annular reflection grating 14 in a state in which the optical axes are shifted by 90 degrees from each other.

A light beam L from a semiconductor-laser light source 10 is substantially perpendicularly projected onto the diffraction-grating scale 15 after passing through a non-polarizing beam splitter 12. A +first-order diffracted light beam reflected from the diffraction-grating scale 15 is emitted with a diffraction angle θ reaches the annular reflection grating 14 after passing through the ⅛-wavelength plate 25a, is diffracted and reflected to the original optical path by the annular reflection grating 14, and is reflected to the non-polarizing beam splitter 12 by being subjected to +first-order diffraction by the diffraction-grating scale 15.

A −first-order diffracted light beam reflected from the diffraction-grating scale 15 is emitted with a diffraction angle θ reaches the annular reflection grating 14 after passing through the ⅛-wavelength plate 25b, is diffracted and reflected to the original optical path by the annular reflection grating 14, and is returned to the non-polarizing beam splitter 12 by being subjected to −first-order diffraction by the diffraction-grating scale 15. The polarized component of the light beam projected from the semiconductor-laser light source 10 onto the diffraction-grating scale 15 makes an angle of 45 degrees with respect to the optical axis of the ⅛-wavelength plates 25a and 25b.

The ±first-order diffracted light beams propagated to the non-polarizing beam splitter 12 are circularly polarized light beams which circulate in opposite directions. Hence, when these light beams are subjected to vector synthesis, they are converted into a linearly polarized light beam in which the orientation of polarization changes based on the phase difference between these light beams. The obtained light beam is divided into two light beams by a non-polarizing beam splitter 22 provided behind the non-polarizing beam splitter 12. Only specific orientations of polarization are extracted by polarizing plates 23a and 23b, and light/dark signals are sensed by photosensors 16a and 16b.

Figure 11:
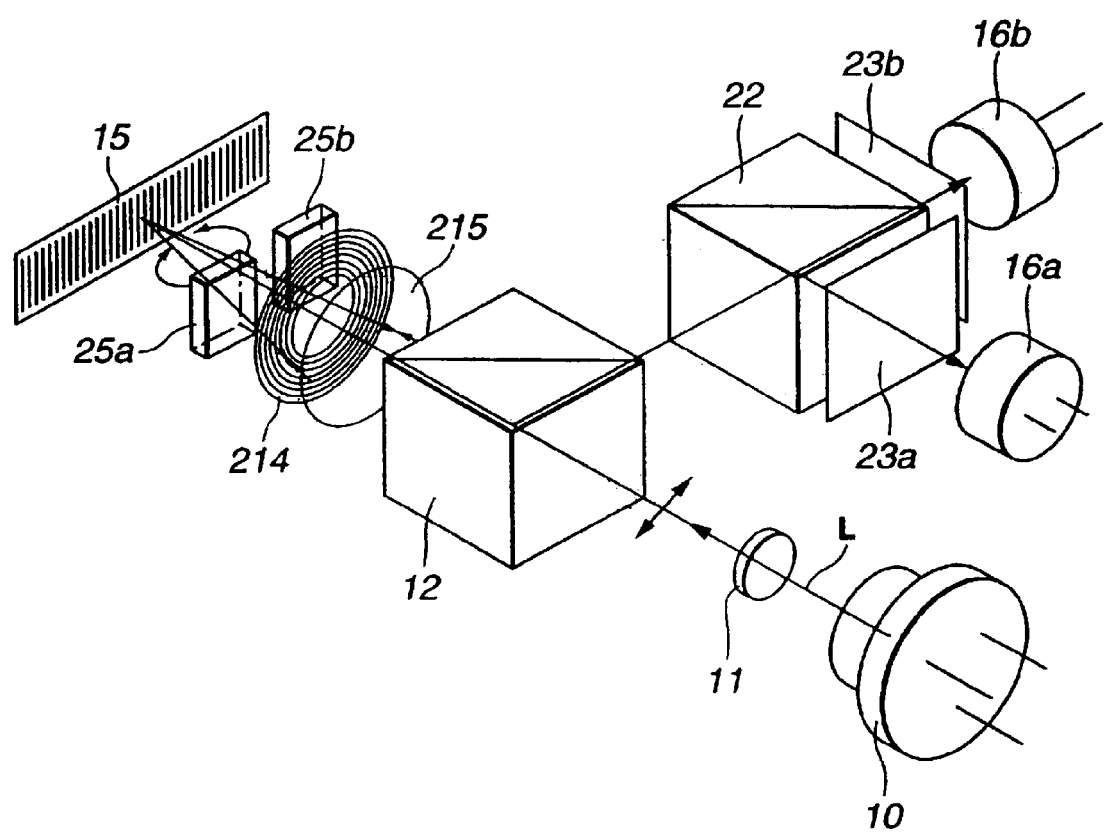
FIG. 11 is a diagram illustrating the configuration of an encoder according to a fifth embodiment of the present invention.

FIG. 11 is a diagram illustrating the configuration of a fifth embodiment of the present invention. In FIG. 11, an annular transmission grating 214 is adopted instead of the annular reflection grating 14. A light beam is reflected by a reflecting surface 215 provided immediately behind the annular transmission grating 214, and is reprojected onto a diffraction-grating scale 15 after being subjected to diffraction twice. The pitch of the annular transmission grating 214 is set to the same value as the pitch of the diffraction-grating scale 15.

As in the fourth embodiment, a light beam from a semiconductor-laser light source 10 is projected onto the diffraction-grating scale 15 after passing through a non-polarizing beam splitter 12. A +first-order diffracted light beam reflected from the diffraction-grating scale 15 is emitted with a diffraction angle θ, is diffracted by the annular transmission grating 214 after passing through a ⅛-wavelength plate 25a, is returned to the original optical path by the reflecting surface 215 immediately after diffraction, is again diffracted and deflected by the annular transmission grating 214, and is returned to the non-polarizing beam splitter 12 by being subjected to +first-order diffraction by the diffraction-grating scale 15.

A −first-order diffracted light beam reflected from the diffraction-grating scale 15 is emitted with a diffraction angle θ, is diffracted by the annular transmission grating 214 after passing through a ⅛-wavelength plate 25b, is returned to the original optical path by the reflecting surface 215, is again diffracted and deflected by the annular transmission grating 214, and is returned to the non-polarizing beam splitter 12 by being subjected to −first-order diffraction by the diffraction-grating scale 15.

As in the fourth embodiment, the ±first-order diffracted light beams are converted into a linearly polarized light beam, which is divided into two light beams by a non-polarizing beam splitter 22, and light/dark signals are sensed by photosensors 16a and 16b via the polarizing plates 23a and 23b, respectively.

In FIG. 11, in order to obtain a phase-difference signal, an approach of inserting polarizing plates as shown FIG. 8, or an approach of inserting a phase-difference plate as shown in FIG. 9 may also be adopted. These polarizing-state changing elements may be inserted between the annular transmission grating 214 and the reflecting surface 215.

In the above-described embodiments, partial modification may be performed with respect to the following items.

(a) In the diffraction-grating scale 15 and the annular reflection grating 14, diffracted light beams having a diffraction order other than the ±first-order diffracted light beams are used.

(b) The polarizing plates 20S, 20P, 23a and 23b are replaced by prisms, each having a polarizing film, or fine-grating patterns, serving as other elements having the equivalent functions.

(c) The phase-difference plates, i.e., the ¼-wavelength plate 21 and the ⅛-wavelength plates 25a and 25b are replaced by fine-structure patterns or other anisotropic materials having functions equivalent to the functions of a crystal optical element, such as quartz or the like.

(d) The same effects are obtained by providing at least two phases for a phase-difference signal and setting the phase difference to a value other than 90 degrees, and partially changing the arrangement of polarizers or phase-difference plates.

(e) In the above-described embodiments, the non-polarizing beam splitters 12 and 22 are used in order to guide light beams to be projected onto the diffraction-grating scale 15 and to guide rediffracted light beams to the photosensor 16, respectively. However, the light beams may be guided by using any other appropriate beam dividing/synthesizing means, such as diffraction gratings or the like, or by separating the light beams by spatially shifting forward and backward optical paths, or by selectively reflecting only one of the light beams and guiding the selected light beam to the photosensor 16.

(f) By replacing the diffraction-grating scale 15 by a disc-shaped scale having a radial grating, the above-described encoder can be easily changed to a rotary encoder.

In the above-described embodiments, for example, an element having a reflecting film deposited in the vacuum on the back of a glass plate processed by etching or the like can be used as the annular reflection grating. Hence, an excellent environment resisting property is obtained.

As described above, the optical encoder according to the present invention has the following effects by optimizing a state of projection of a light beam onto a diffraction-grating scale or an annular diffraction grating.

(1) Since, for example, a plane optical element can be used, the space of arrangement is not complicated as in the case of using a cat's eye, and a small encoder can be easily provided.

(2) Since variations in the wavelength of the light beam from the light source are corrected, an interference signal is stabilized.

(3) Since an alignment error is corrected, even an encoder in which a diffraction-grating scale and a detection head are separated can be relatively easily mounted.

(4) The size of a beam reflecting optical element is small and the number of components is small. Hence, by adding deflection means to light-beam projection means, the degree of freedom in the method or the direction of projection of a light beam onto a diffraction-grating scale is increased, and a wider posture of application can be obtained.

Figure 12:
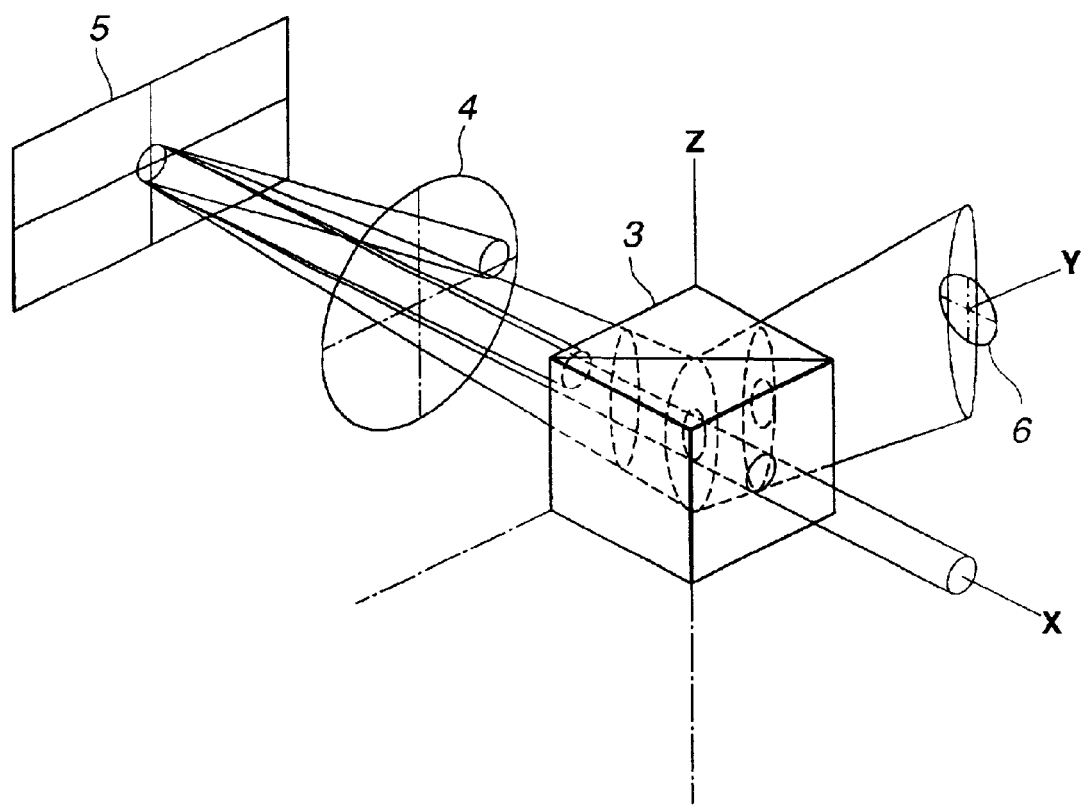
FIGS. 12 and 13 are diagrams, each illustrating a result of tracking of a light beam.

In the above-described embodiments, since the light beam actually projected onto the diffraction-grating scale 5 has a finite size, if tracking of a light beam when, for example, using the diffraction-grating scale 5 having a pitch of 2.8 μm, and setting the distance between the diffraction-grating scale 5 and the annular reflection grating 4 to 10 mm is performed, an elliptic wavefront is obtained as shown in FIG. 12, due to a wavefront distortion peculiar to the annular reflection grating 4, and a loss may be produced when the photosensor 6 senses the light beam.

Figure 13:
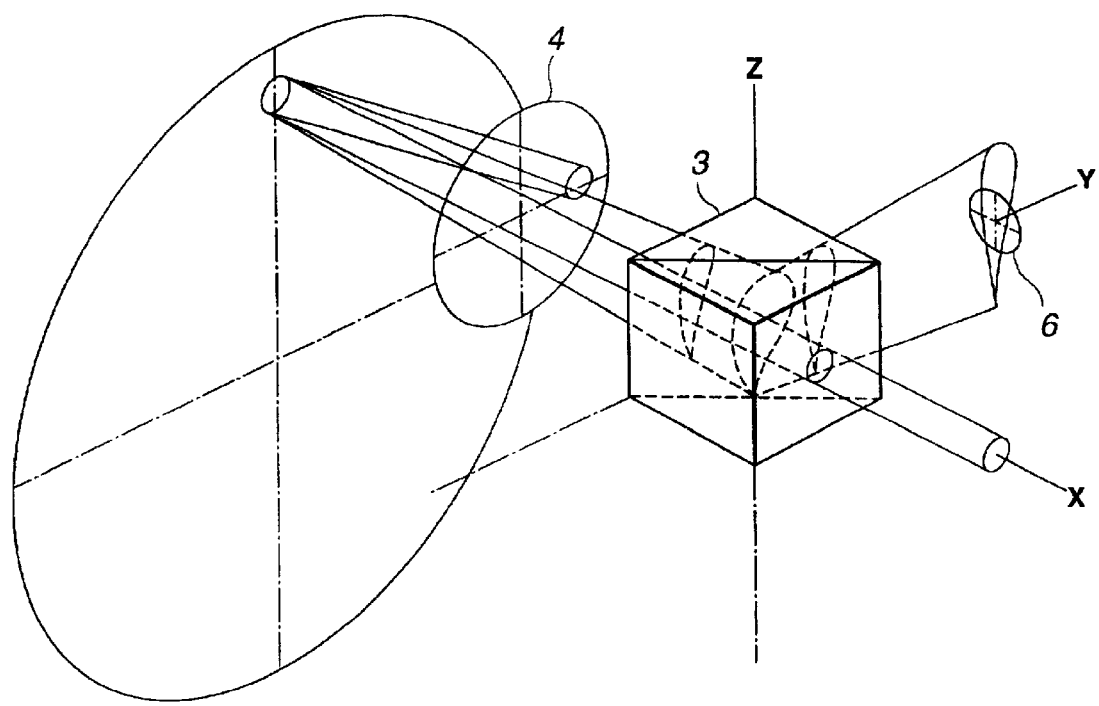

Furthermore, if tracking of a light beam having a diameter of 1 mm when projecting the light beam onto a radial grating having a radius of 9.2 mm and 20,250 grooves at the circumference is performed, then, as shown in FIG. 13, a wavefront distortion peculiar to a radial grating is added to the wavefront distortion peculiar to the annular reflection grating 4, and the wavefronts of ±first-order diffracted light beams may be distorted when synthesizing these light beams.

The following embodiments have been made in consideration of the above-described problems.

A description will now be provided in detail for the embodiments shown in FIGS. 14 through 27.

Figure 14:
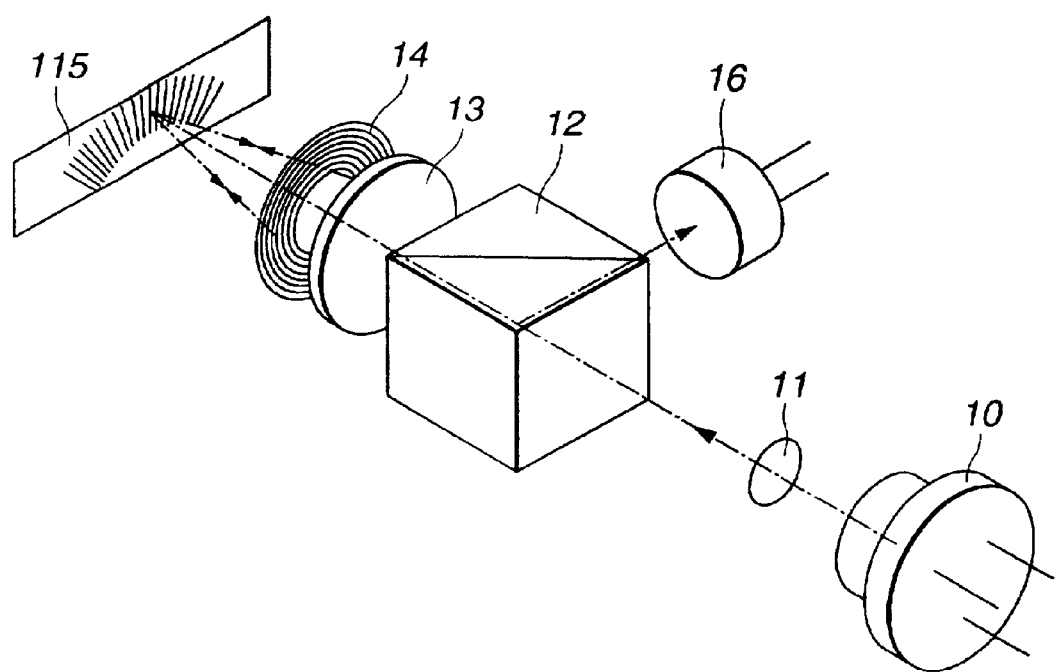
FIG. 14 is a diagram illustrating the configuration of an encoder according to a sixth embodiment of the present invention.

FIG. 14 is a diagram illustrating the configuration of a linear encoder according to a sixth embodiment of the present invention. In FIG. 14, a collimator lens 11, a beam splitter 12, a lens 13, an annular reflection grating 14, and a diffraction-grating scale 115 are arranged in the optical path of a light beam emitted from a semiconductor-laser light source 10, and a photosensor 16 is disposed in the reflecting direction of the beam splitter 12.

When the pitch of the grating on the diffraction-grating scale 115 is represented by P1, the pitch P2 of the annular reflection grating 14 is set so as to satisfy a relationship of $P2=P1/2$.

According to such a configuration, a light beam L emitted from the semiconductor-laser light source 10 becomes a substantially parallel light beam by the collimator lens 11, and is condensed and projected onto the diffraction-grating scale 115 after passing through the beam splitter 12, the lens 13 and a central portion of the annular reflection grating 14. Diffracted light beams L+ and L− reflected from the diffraction-grating scale 115 are projected onto substantially one point on the annular reflection grating 14. When using a radial diffraction-grating scale as the diffraction-grating scale 115 as shown in FIG. 14, the light beams are not completely condensed on one point due to an aberration peculiar to a radial grating.

Even when using a linear diffraction-grating scale, the light beam cannot be condensed on an area less than the beam waste size of the laser beam. However, since this size is very small, it can be considered as one point.

Figure 15:
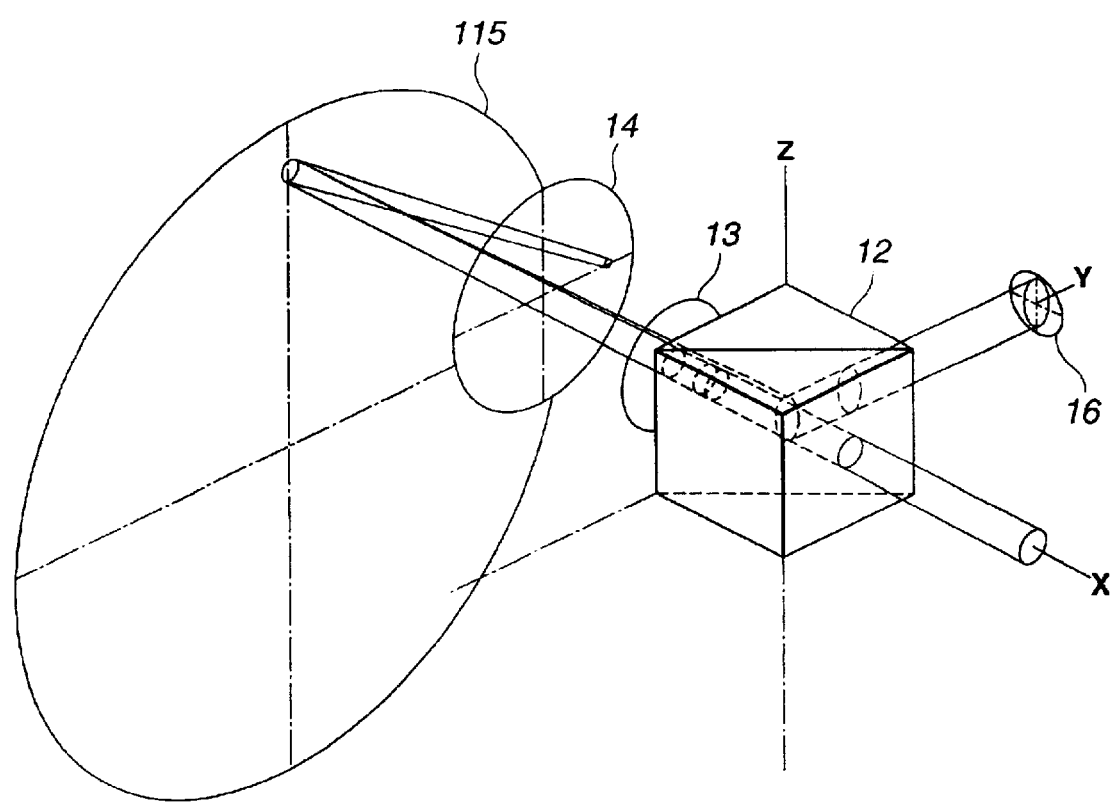
FIGS. 15 and 16 are diagrams, each illustrating a result of tracking of a light beam.
Figure 16:
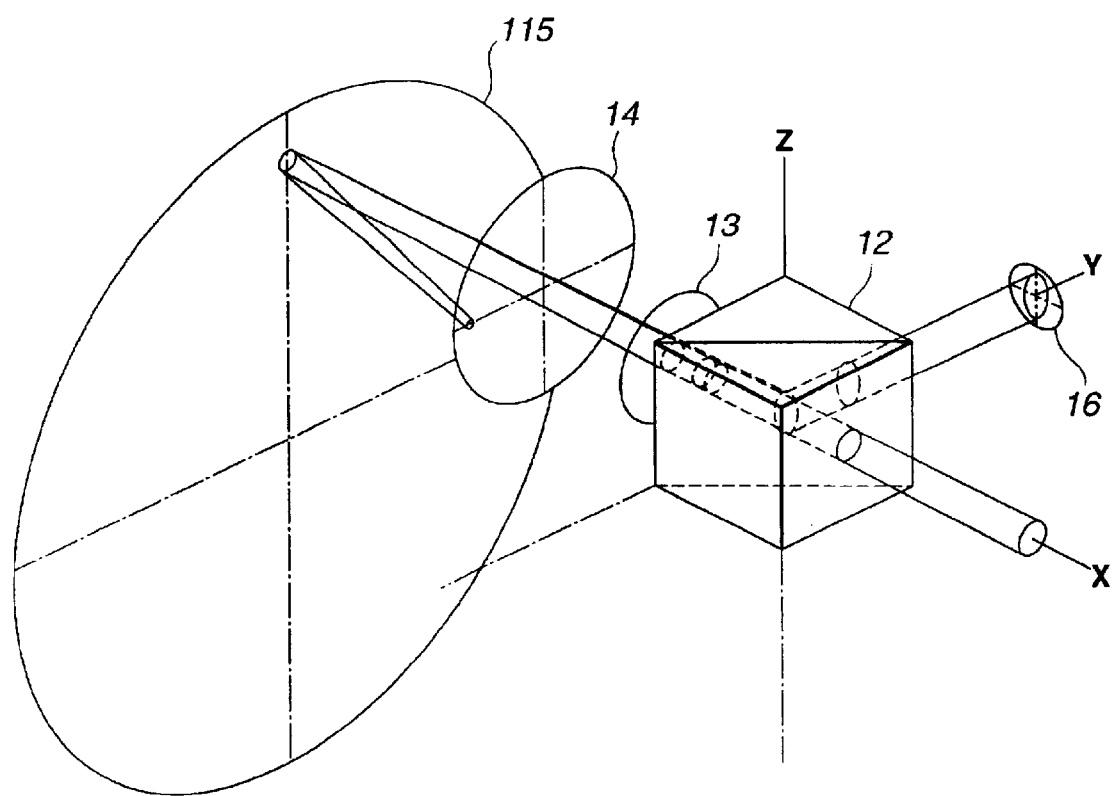

The annular reflection grating 14 locally operates as a linear diffraction grating having the pitch of P2. Hence, the light beams emitted from the condensed and projected region of the diffraction-grating scale 115 and projected onto substantially one point on the annular reflection grating 14 are diffracted and returned to the original optical path to be projected onto and diffracted by the diffraction-grating scale 115, and are returned to the beam splitter 12 in a superposed state. The resultant light beam is guided in a direction different from the semiconductor-laser light source 10 by the beam splitter 12, and is detected as an interference light beam by the photosensor 16. When ±first-order diffracted light beams are used, the period of light and dark of interference equals four periods with respect to one pitch of the diffraction-grating scale 115. As shown in FIG. 15 or 16, a substantially circular light beam is obtained on the photosensor 16.

Figure 17:
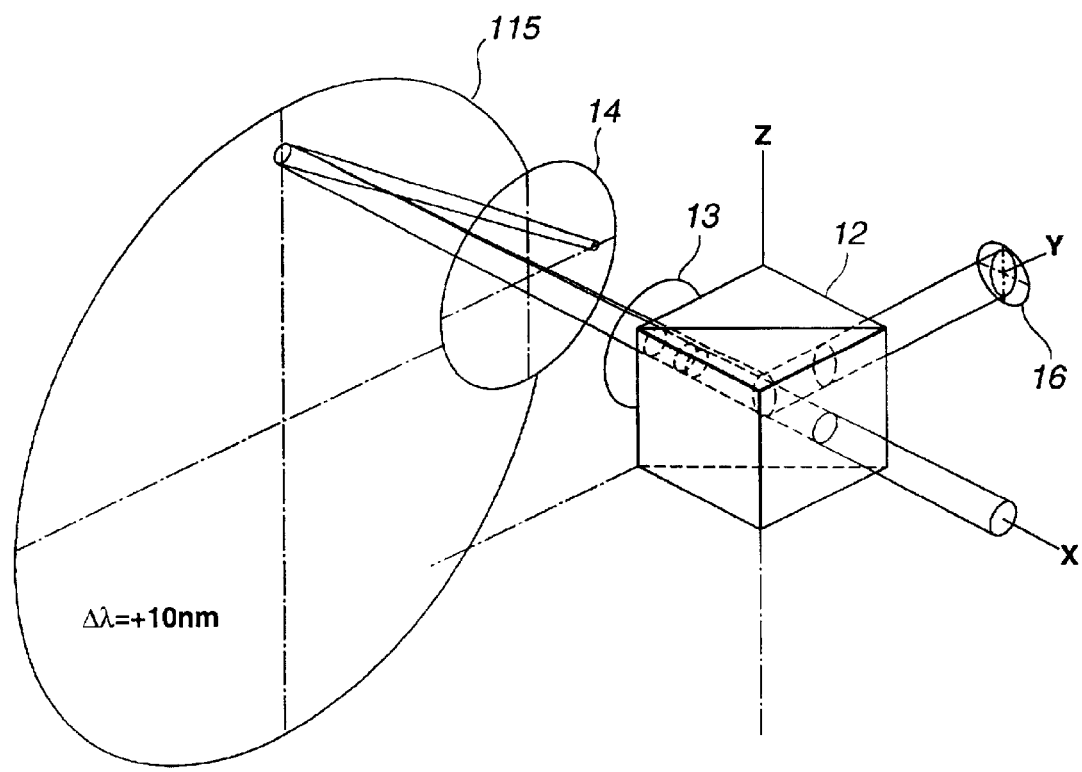
FIG. 17 is a diagram illustrating the influence of a change in the wavelength of a light beam.

FIG. 17 is a diagram illustrating a result of calculating a shift of the optical path when the diffraction angle changes due to a change in the oscillation wavelength of the semiconductor-laser light source 10 by $\Delta\lambda=10$ nm caused, for example, by a change in the temperature environment.

In this case, the irradiated position on the annular reflection grating 14 is slightly shifted due to a change in the diffraction angle of the diffracted light beam by the diffraction-grating scale 115. However, since the light beam is diffracted with an original diffraction angle by the annular reflection grating 14, the position of rediffraction by the diffraction-grating scale 15 and the state of the emitted light beam are invariable. Hence, the state of interference is stable.

Figure 18:
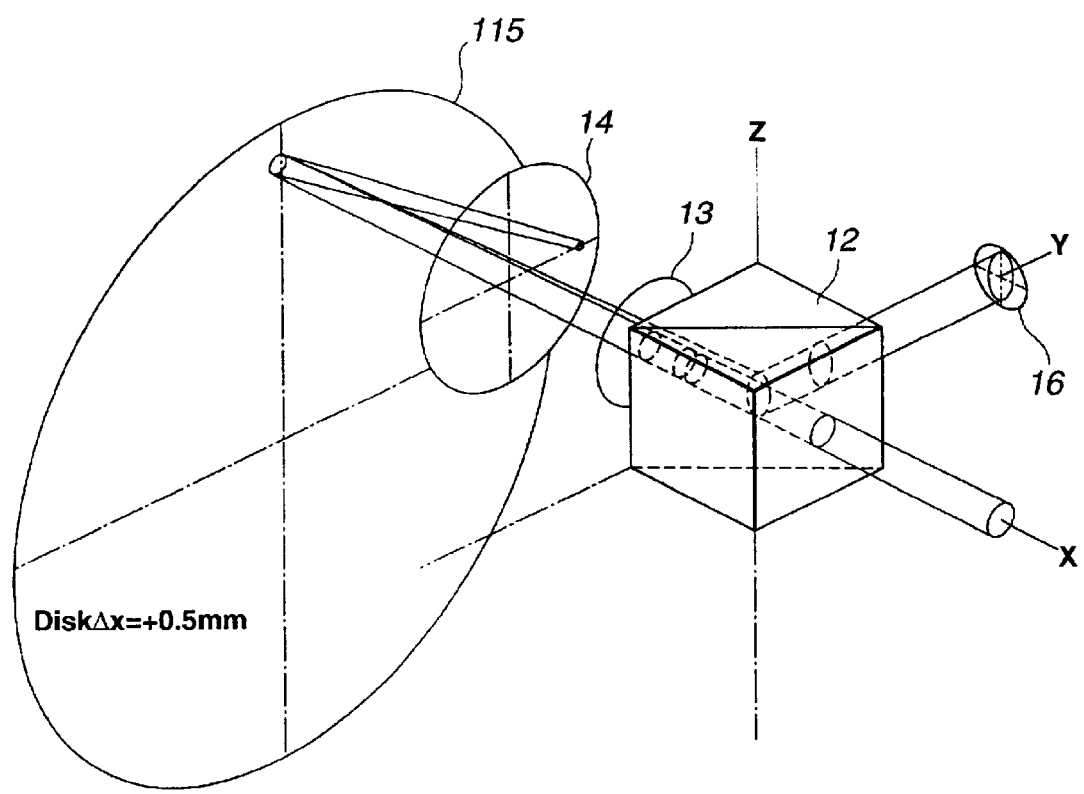
FIG. 18 is a diagram illustrating the influence of a change in the gap between a scale and a detection head.

FIG. 18 is a diagram illustrating a shift of the optical path when the position of the radial-grating disk of the diffraction-grating scale 115 is shifted by $\Delta x=0.5$ mm. Even if the gap between the detection-head unit and the diffraction-grating scale 115 is reduced, the position of rediffraction by the diffraction-grating scale 115 and the state of the emitted light beam are invariable. Hence, the state of interference is stable.

Figure 19:
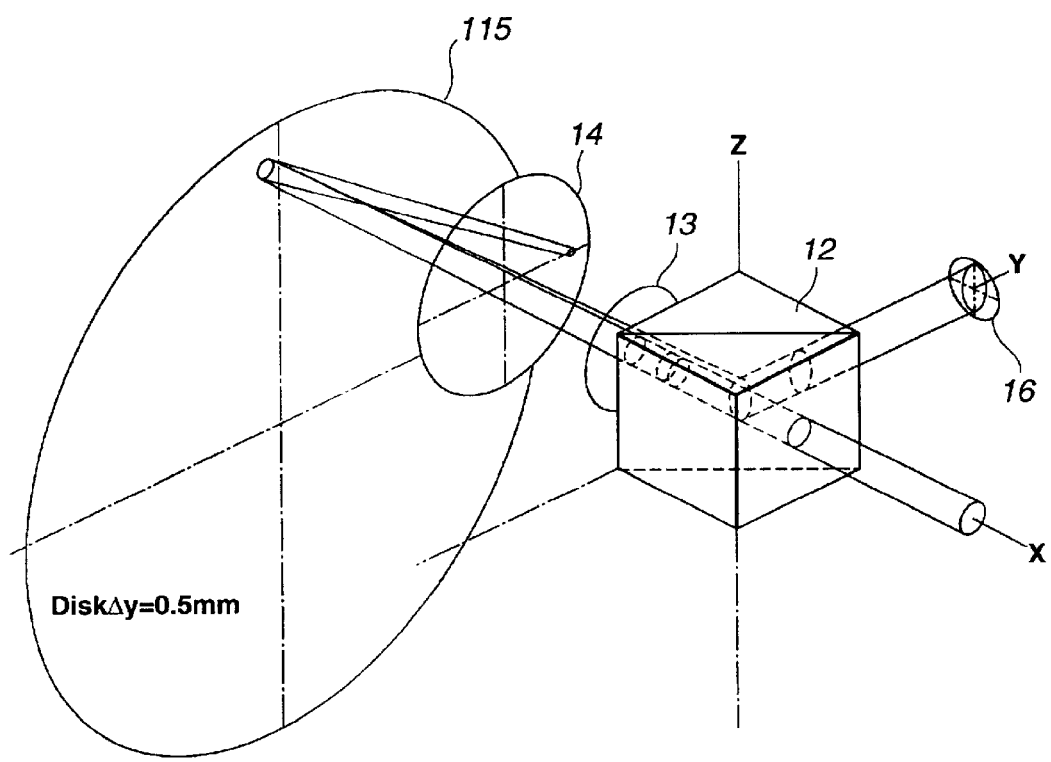
FIGS. 19 and 20 are diagrams, each illustrating the influence of a change in the azimuth angle between the scale and the detection head.
Figure 20:
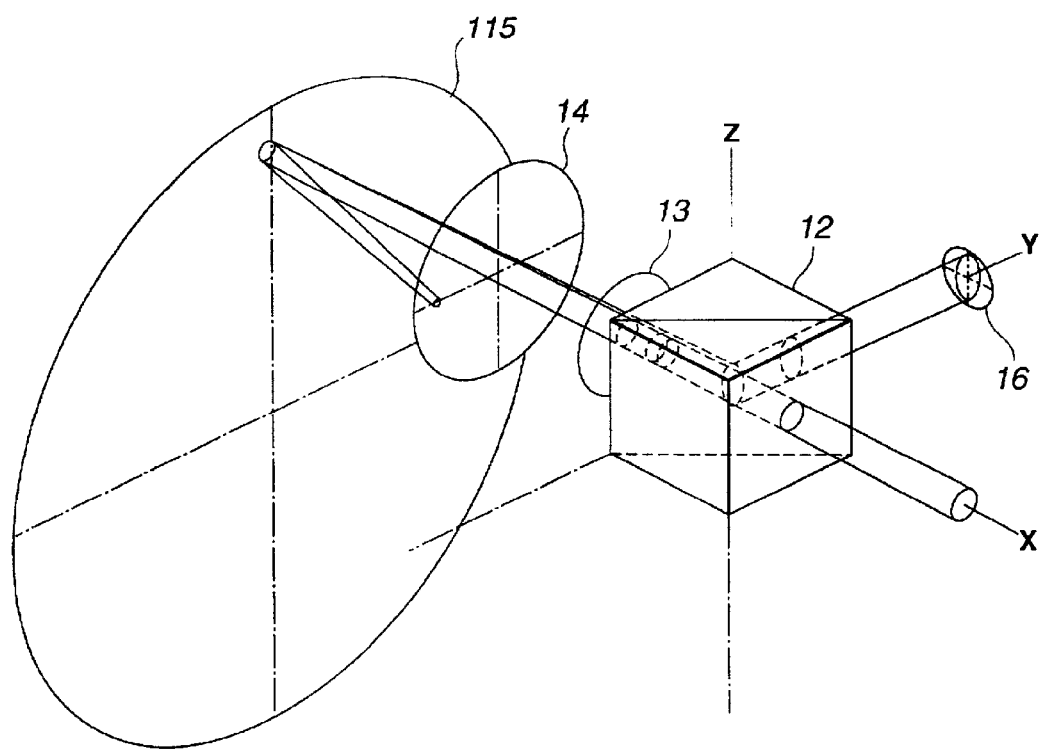

FIGS. 19 and 20 are diagrams, each illustrating a result of calculation when the detection-head unit is shifted with respect to the radial-grating disk by $\Delta y=0.5$ mm in a tangential direction. This case is equivalent to the case that the radial-grating disk is eccentric by 0.5 mm, and is also equivalent to an azimuth error in the arrangement of the scale when using a linear grating. Even if the irradiated position is shifted, since the light beam is diffracted to original optical path by the function of the annular reflection grating 14, the position of rediffraction by the diffraction-grating scale 15 and the state of the emitted light beam are invariable.

FIGS. 19 and 20 illustrates the optical paths of a +first-order diffracted light beam and a −first-order diffracted light beam, respectively. Although the irradiated positions on the photosensor 16 are slightly shifted in the vertical direction, these light beams are substantially parallel to each other, and the state of interference is stable. The above-described amount of shift of 0.5 mm is provided in order to facilitate understanding of the result of calculation. The amount of shift in the actual encoder is much smaller.

Figure 21:
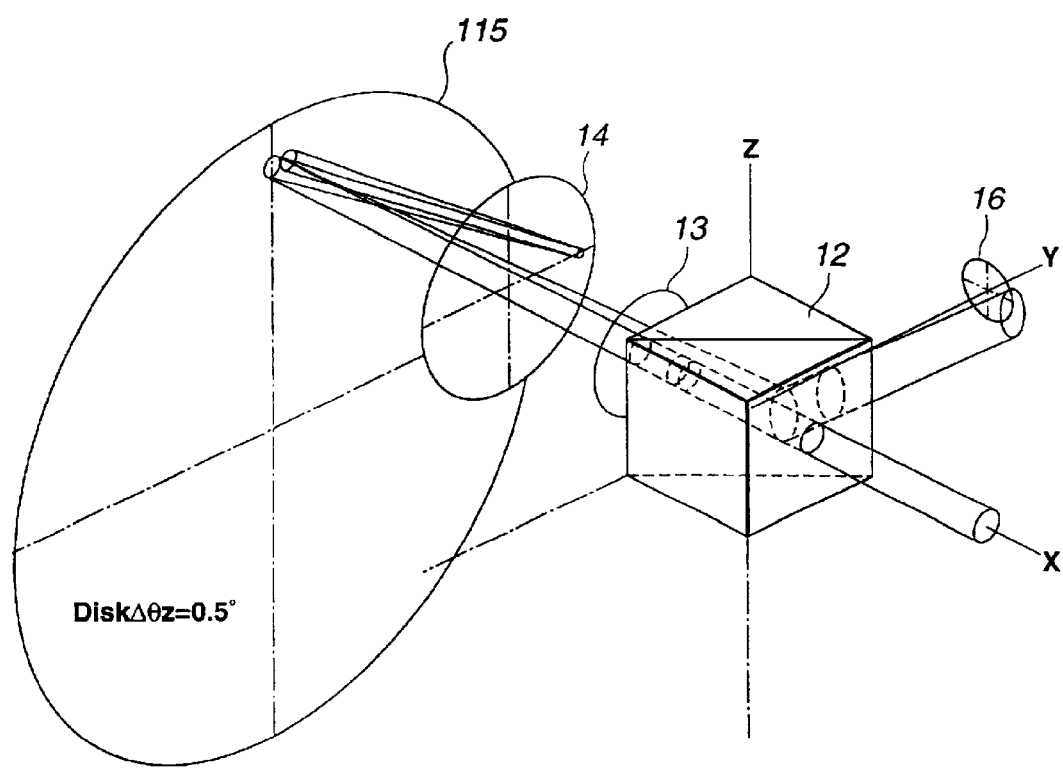
FIGS. 21 through 24 are diagrams, each illustrating the influence of a change in the tilt angle between the scale and the detection head.
Figure 22:
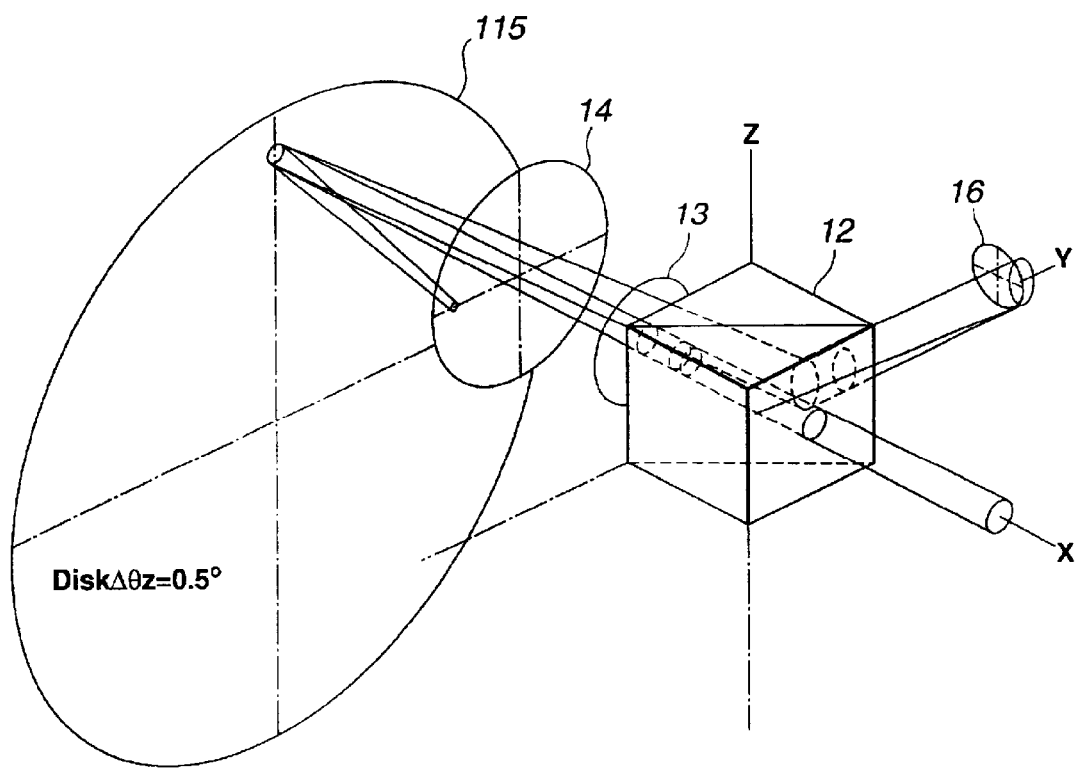

FIGS. 21 and 22 are diagrams, each illustrating a shift of the optical path when a tilt error of $\Delta\theta z=0.5$ degrees is given with respect the orientation of arrangement of the grating. The result of reading of the optical paths of the ±first-order diffracted light beams indicates that, even if a small amount of tilt error is added, the difference between the ±first-order diffracted light beams in the position of rediffraction by the diffraction-grating scale 15 and the state of emitted light beams does not change. Hence, the state of interference is stable.

In FIGS. 21 and 22, the incident light beams on the photosensor 16 are shifted from the surface of the photosensor 16. However, the amount of shift of 0.5 mm is provided in order to facilitate understanding of the result of calculation. The amount of shift in the actual encoder is much smaller.

Figure 23:
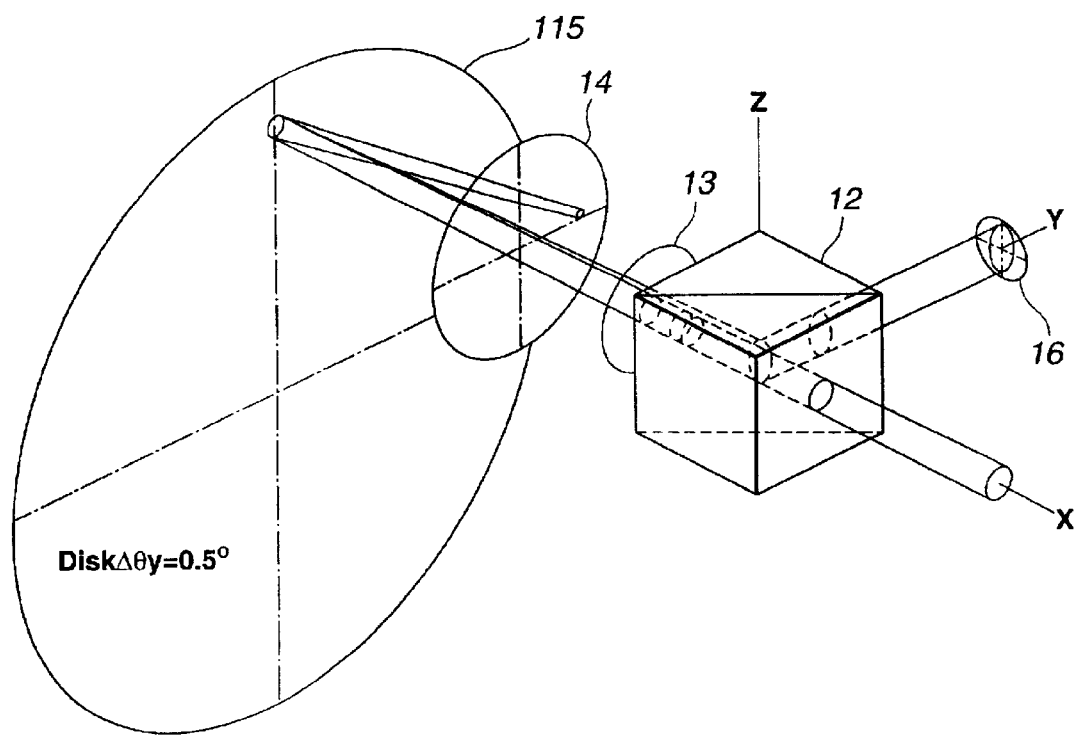
Figure 24:
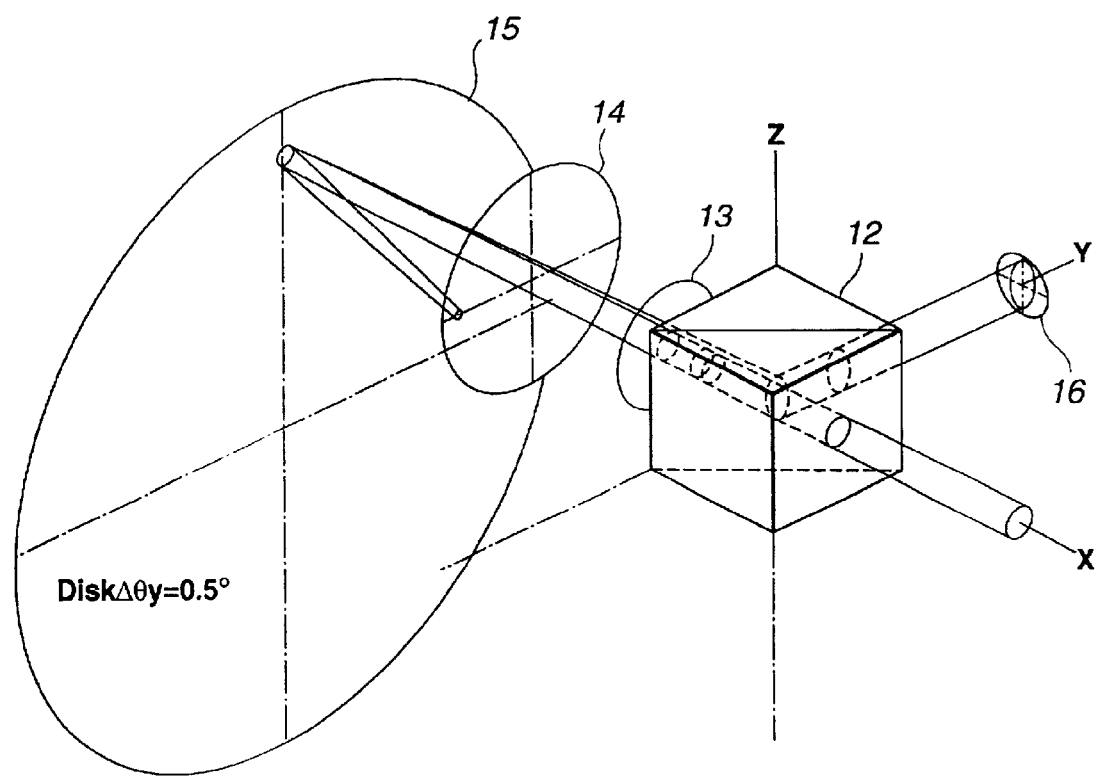

FIGS. 23 and 24 are diagrams, each illustrating a shift of the optical path when a tilt error of Δθy=0.5 degrees is given with respect the orientation of arrangement of the grating. Also in this case, the result of reading of the optical paths of the ±first-order diffracted light beams indicates that, even if a small amount of tilt error is added, the difference between the ±first-order diffracted light beams in the position of rediffraction by the diffraction-grating scale 15 and the state of emitted light beams does not change. Hence, the state of interference is stable, and the irradiated position on the photosensor 16 is substantially not shifted.

As described above, by combining the annular reflection diffraction grating 14 with projection of a light beam on a point of this optical element, it is possible to make provision of a small-size and high-resolution encoder having a large allowance in a mounting error to be compatible with detection of a stable interference signal.

Figure 25:
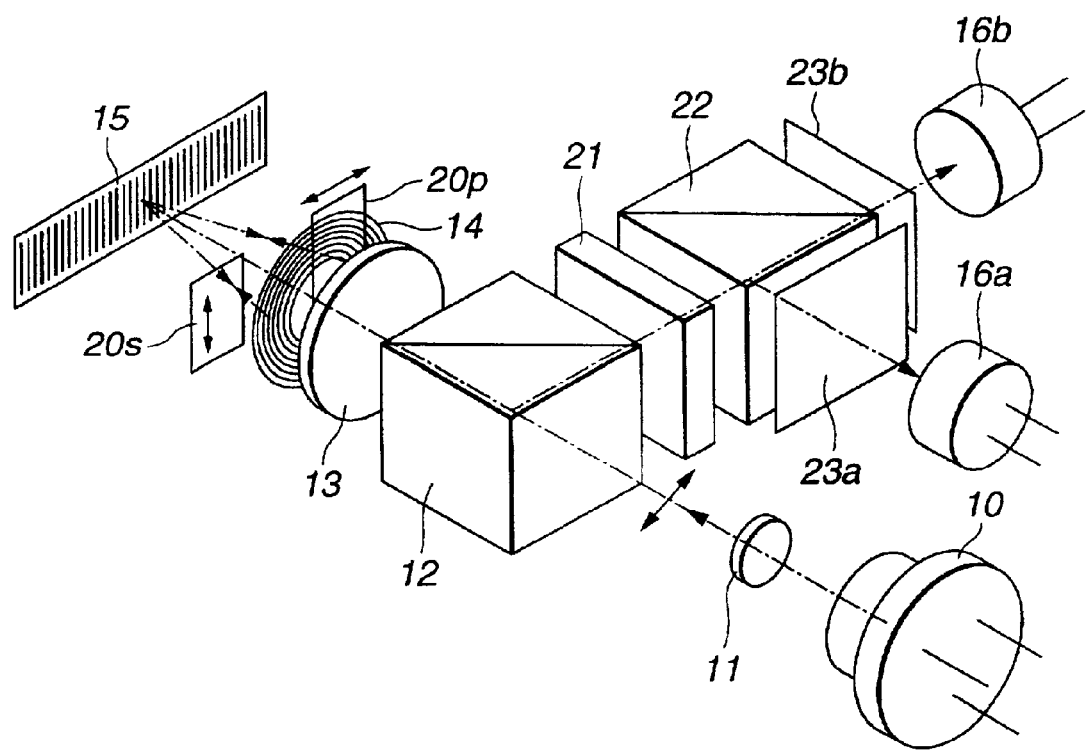
FIG. 25 is a diagram illustrating the configuration of an encoder according to a seventh embodiment of the present invention.

FIG. 25 is a perspective view illustrating a seventh embodiment of the present invention, in which two-phase signals are detected by disposing a polarizing element so as to generate a phase-difference signal. Although a linear encoder using a polarizing plate as a polarizing element, and using a linear diffraction lens is illustrated, a rotary encoder using a ¼-wavelength plate as a polarizing element and using a radial diffraction lens may also be adopted.

In FIG. 25, a collimator lens 11, a non-polarizing beam splitter 12, a lens 13, an annular reflection grating 14, two polarizing plates 20S and 20P whose orientations of polarization are shifted by 90 degrees from each other, and a diffraction-grating scale 15 are arranged in the optical path of a light beam from a semiconductor-laser light source 10, serving as an coherent light source. A ¼-wavelength plate 21 and a non-polarizing beam splitter 22 are arranged in the reflecting direction of the non-polarizing beam splitter 12. A polarizing plate 23a and a photosensor 16a are disposed in the reflecting direction of the non-polarizing beam splitter 22, and a polarizing plate 23b and a photosensor 16b are arranged in the transmitting direction of the non-polarizing beam splitter 22.

According to the above-described configuration, a light beam from the semiconductor-laser light source 10 passes through the collimator lens 11 and the non-polarizing beam splitter 12, and is substantially perpendicularly projected onto the diffraction-grating scale 15 after passing through the lens 13 and a central portion of the annular reflection grating 14.

A +first-order diffracted light beam reflected from the diffraction-grating scale 15 is emitted with a diffraction angle θ, is diffracted and reflected to the original optical path by the annular reflection grating 14, and is returned to the non-polarizing beam splitter 12 by being subjected to +first-order diffraction by the diffraction-grating scale 15.

A −first-order diffracted light beam reflected from the diffraction-grating scale 15 is emitted with a diffraction angle θ, is diffracted and reflected to the original optical path by the annular reflection grating 14, and is returned to the non-polarizing beam splitter 12 by being subjected to −first-order diffraction by the diffraction-grating scale 15. The light beam projected from the semiconductor-laser light source 10 onto the diffraction-grating scale 15 has vertically and horizontally polarizing components, and the orientations of polarization of the +first-order diffracted light beams propagated to the non-polarizing beam splitter 12 are shifted by 90 degrees from each other and the wavefronts of these light beams are superposed. However, these light beams are not light/dark light beams.

As a result, the two light beams reflected by the non-polarizing beam splitter 12 pass through the ¼-wavelength plate 21 and are converted into a linearly polarized light beam whose orientation of polarization changes based on the phase difference between the two light beams. The obtained light beam is divided into two light beams by the non-polarizing beam splitter 22 provided behind the ¼-wavelength plate 21. Only specific orientations of polarization are extracted by the polarizing plates 23a and 23b, and light/dark signals are sensed by the photodetectors 16a and 16b. The phases (timings) of these light/dark signals are provided by shifts of the orientation of polarization of the polarizing plates 23a and 23b. That is, by shifting the orientations of polarization of the polarizing plates 23a and 23b by 45 degrees in opposite directions, the phase difference between the light-dark signals is set to 90 degrees.

Figure 26:
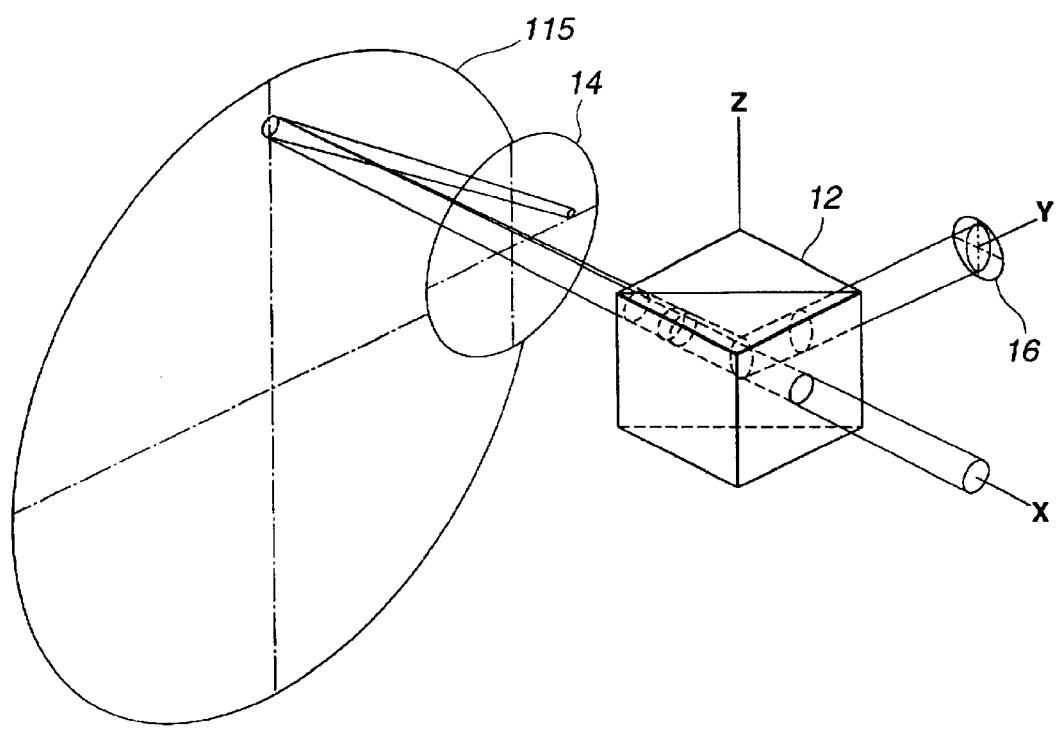
FIG. 26 is a diagram illustrating the configuration of an encoder according to an eighth embodiment of the present invention.

FIG. 26 is a perspective view illustrating an eighth embodiment of the present invention, in which a convergent light beam is directly obtained by using a collimator lens 11 as optical means for projecting a convergent light beam. In the case of FIG. 26, a very gradually convergent light beam is obtained.

Figure 27:
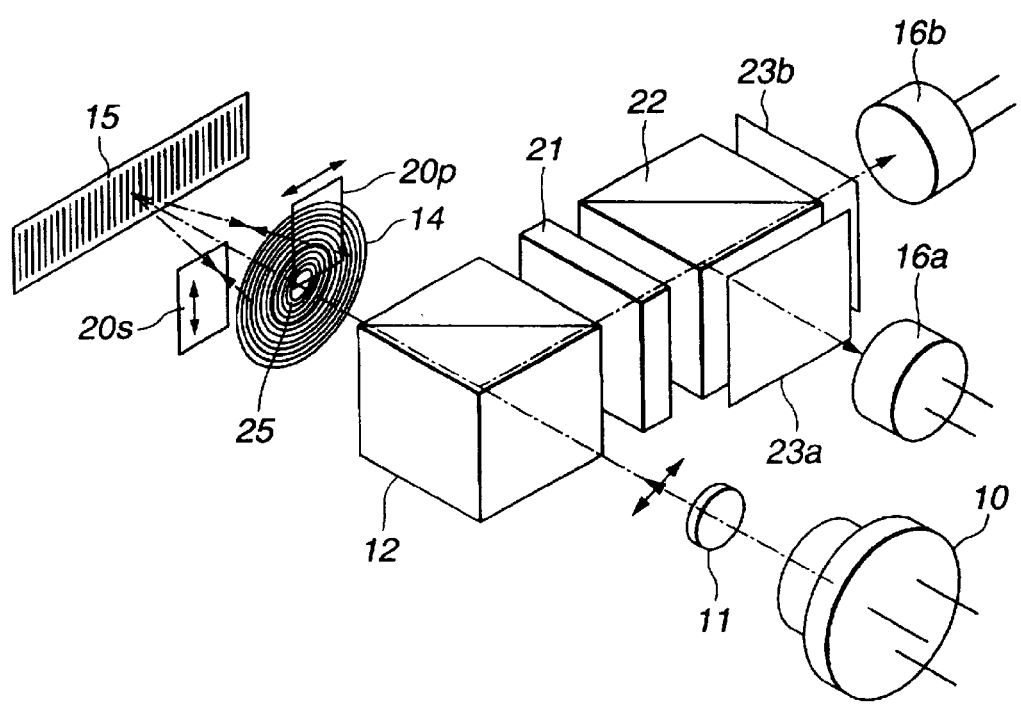
FIG. 27 is a diagram illustrating the configuration of an encoder according to a ninth embodiment of the present invention.

FIG. 27 is a diagram illustrating the configuration of a ninth embodiment of the present invention, in which a diffraction lens 25 is integrally formed at a central portion (a transmitting-window portion) of an annular reflection grating 14. The diffraction lens 25 is patterned so that the pitch of the grating gradually changes from the central portion to the peripheral portion, in order to provide the function of a convex lens.

In the above-described embodiments, partial modification may be performed with respect to the following items.

(a) In the diffraction-grating scale 15 and the radial diffraction grating 115 or the annular reflection grating 14, diffracted light beams having a diffraction order other than the ±first-order diffracted light beams are used.

(b) The polarizing plates 20S, 20P, 23a and 23b are replaced by prisms, each having a polarizing film, or fine-grating patterns, serving as other elements having the equivalent functions.

(c) The phase-difference plates, i.e., the ¼-wavelength plate 21 and the ⅛-wavelength plates are replaced by fine-structure patterns or other anisotropic materials having functions equivalent to the functions of a crystal optical element, such as quartz or the like.

(d) The same effects are obtained by providing at least two phases for a phase-difference signal and setting the phase difference to a value other than 90 degrees, and partially changing the arrangement of polarizers or phase-difference plates.

(e) In the above-described embodiments, the non-polarizing beam splitters 12 and 22 are used in order to guide light beams to be projected onto the diffraction-grating scale 15 and to guide rediffracted light beams to the photosensor 16, respectively. However, the light beams may be guided by using any other appropriate beam dividing/synthesizing means, such as diffraction gratings or the like, or by separating light beams by spatially shifting forward and backward optical paths, or by selectively reflecting only one of the light beams and guiding the selected light beam to the photosensor 16.

(f) For example, by changing the order of arrangement of the collimator lens 11, the non-polarizing beam splitter 12, the lens 13 and the annular reflection grating 14, another optical arrangement is adopted in order to provide a system of linearly condensing a light beam onto the diffraction-grating scale 15.

In the above-described embodiments, for example, an element having a reflecting film deposited in the vacuum on the back of a glass plate processed by etching or the like can be used as the annular reflection grating 14. Hence, an excellent environment resisting property is obtained.

As described above, the optical encoder according to the present invention has the following effects by optimizing a state of projection of a light beam onto a diffraction-grating scale or an annular diffraction grating.

(1) The interfered wavefronts of the diffracted light beams tend to coincide with each other, a flat light-dark pattern is obtained, and a stable encoder signal having an excellent S/N ratio can be obtained.

(2) Since, for example, a plane optical element can be used as the annular reflection grating, the space of arrangement is not complicated, and a small encoder can be easily provided.

(3) Since variations in the wavelength of the light beam from the light source are corrected, an interference signal is stabilized.

(4) Since an alignment error is corrected, even an encoder in which a diffraction-grating scale and a detection head are separated can be relatively easily mounted.

(5) The size of a beam reflecting optical element is small and the number of components is small. Hence, by adding deflection means to light-beam projection means, the degree of freedom in the method or the direction of projection of a light beam onto a diffraction-grating scale is increased, and a wider posture of application can be obtained.

(6) Since the rediffracted light beam is guided to the photosensor without greatly spreading, it is possible to perform detection with a small loss and an excellent SIN ratio.

Figure 28A:
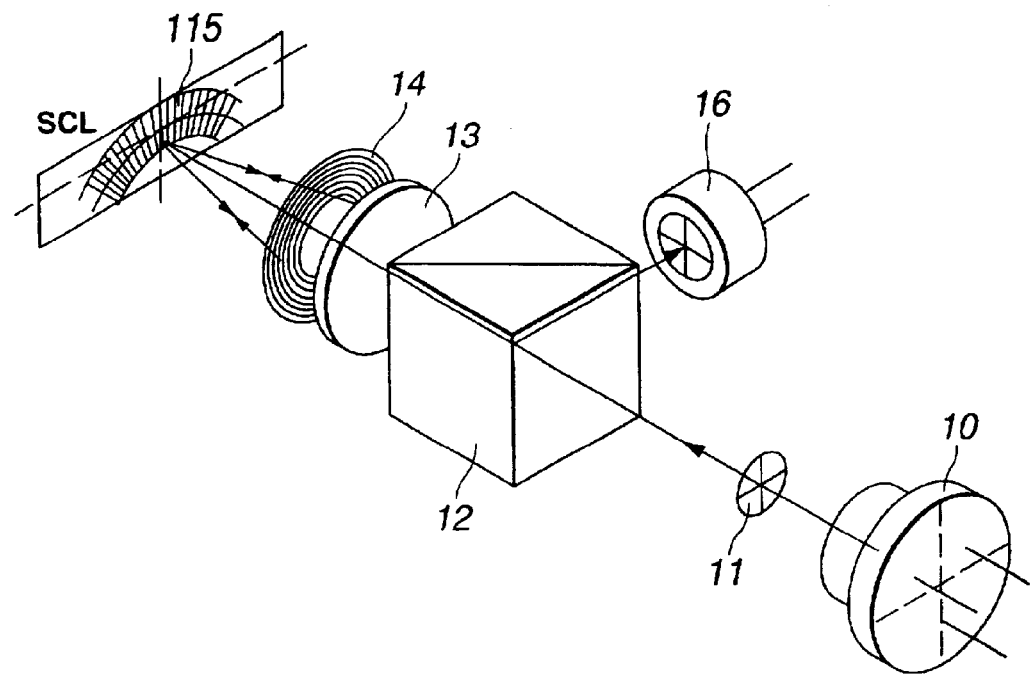
FIGS. 28A–28C are diagrams illustrating the configuration of an optical system (condensing of light onto a scale grating by a lens L in a return path) according to a tenth embodiment of the present invention.
Figure 28B:
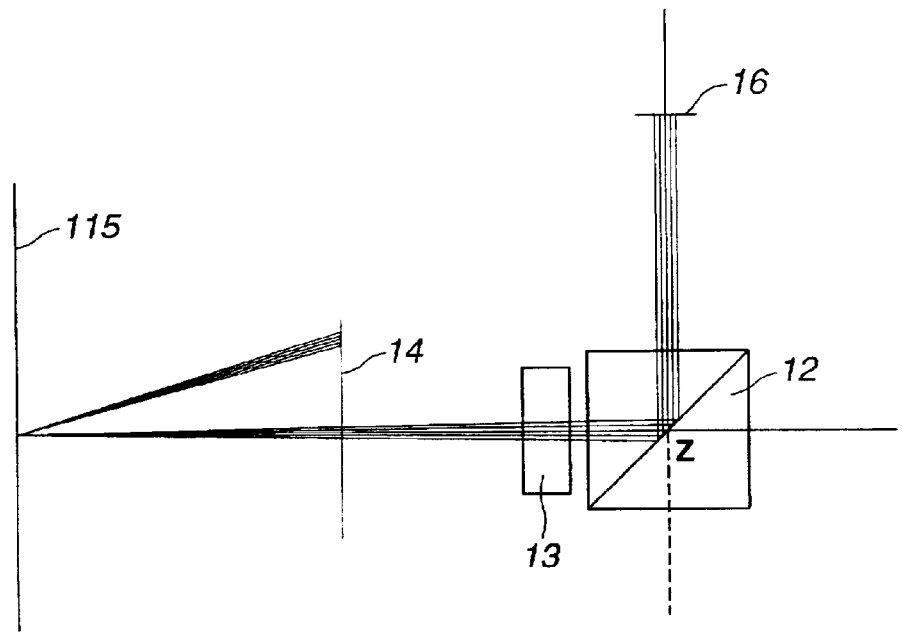
Figure 28C:
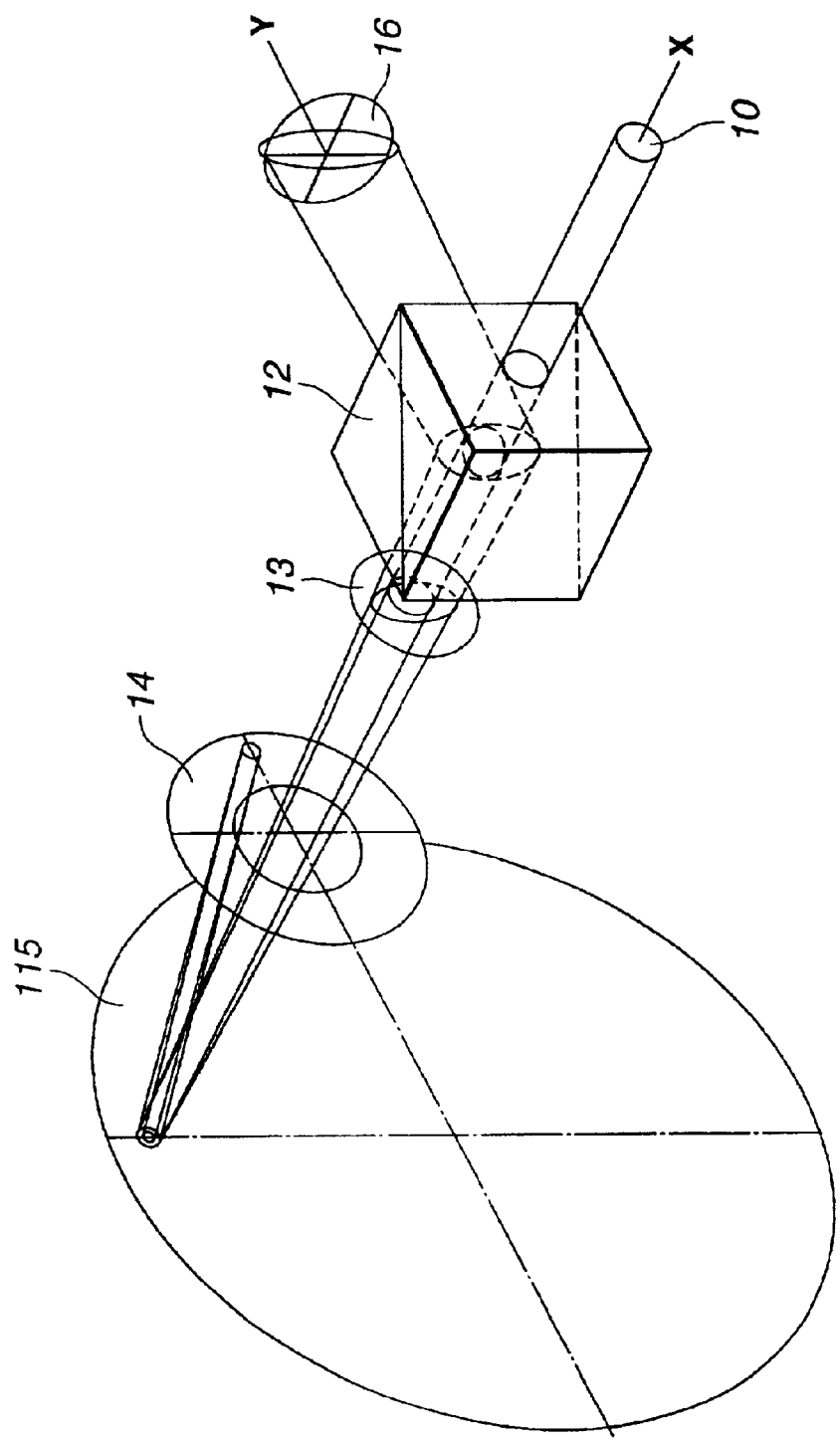

FIG. 28A is a diagram illustrating the arrangement of the optical system of a rotary encoder according to a tenth embodiment of the present invention. FIGS. 28B and 28C are diagrams illustrating results of tracking of + or −first-order light beam by projecting each light beam having a diameter of 1 mm onto the same optical system. A light beam R emitted from a semiconductor laser becomes a substantially parallel light beam by a lens 13, passes through a beam splitter 12, becomes a converged light beam after passing through the lens 13, and is projected onto a radial diffraction-grating scale 115 in a state of tending to be converged. Diffracted light beams R+and R−from the diffraction-grating scale 115 are projected onto an annular reflection grating 14. When the pitch of the grating on the diffraction-grating scale 115 is represented by P1, the pitch P2 of the annular reflection grating 14 is set to be P2=P1/2.

The annular reflection grating 14 locally operates as a linear diffraction grating having the pitch P2. Hence, the light beam emitted from a linear condensing region of the radial diffraction-grating scale 115 and projected onto the annular reflection grating 14 is diffracted substantially in the original direction toward the radial diffraction-grating scale 115. At that time, the light beam is condensed on substantially one point by the function of the lens 13, and is rediffracted in a state of tending to be diverged. The diffracted light beams are superposed and returned to the beam splitter 12.

As for the degree of point-like condensation on the diffraction-grating scale in the return path, there exists a linear condensation aberration by the annular reflection grating 14, and when using the radial diffraction-grating scale 115 as the diffraction-grating scale, an aberration peculiar to a radial grating is also added. Accordingly, completely point-like condensation cannot be realized. However, such a small amount of aberration can be neglected.

In the tenth embodiment, it is designed to realize point-like condensation on the diffraction-grating scale in the return path when the radial diffraction-grating scale 115 and the annular reflection grating 14 locally operate as liner gratings. Actually, however, complete point-like condensation is not realized due to the above-described aberrations. The position of condensation when neglecting the above-described aberrations need not completely coincide with the initial position on the diffraction-grating scale in the return path. The effect of stabilizing the state of interference is obtained provided that the position of condensation is between the annular reflection grating 14 and the radial diffraction-grating scale 115.

The resultant light beam is guided in a direction different from the semiconductor laser 10 by the beam splitter 12, and is detected as an interference light beam by a photosensor 16. When using ±first-order diffracted light beams, the period of light and dark of interference equals four periods for the movement of 1 pitch of the radial diffraction-grating scale 115.

FIG. 28B illustrates a result of calculation for light-beam elements only in the direction of arrangement of the grating at irradiated portions on the radial diffraction-grating scale 115 and the annular reflection grating 14. In FIG. 28B, only light-beam elements between the annular reflection grating 14 and the photosensor 16 are selectively illustrated. As shown in FIG. 28B, the light beam is substantially condensed at the radial diffraction-grating scale 115 in the return path, and is directed from the radial diffraction-grating scale 115 to the photosensor 16 as a divergent light beam. FIG. 28C illustrates a result of tracking of parallel light-beam elements having a diameter of 1 mm from a light source 10 to the photosensor 16. A substantially elliptical light beam is obtained on the photosensor 16.

Figure 29:
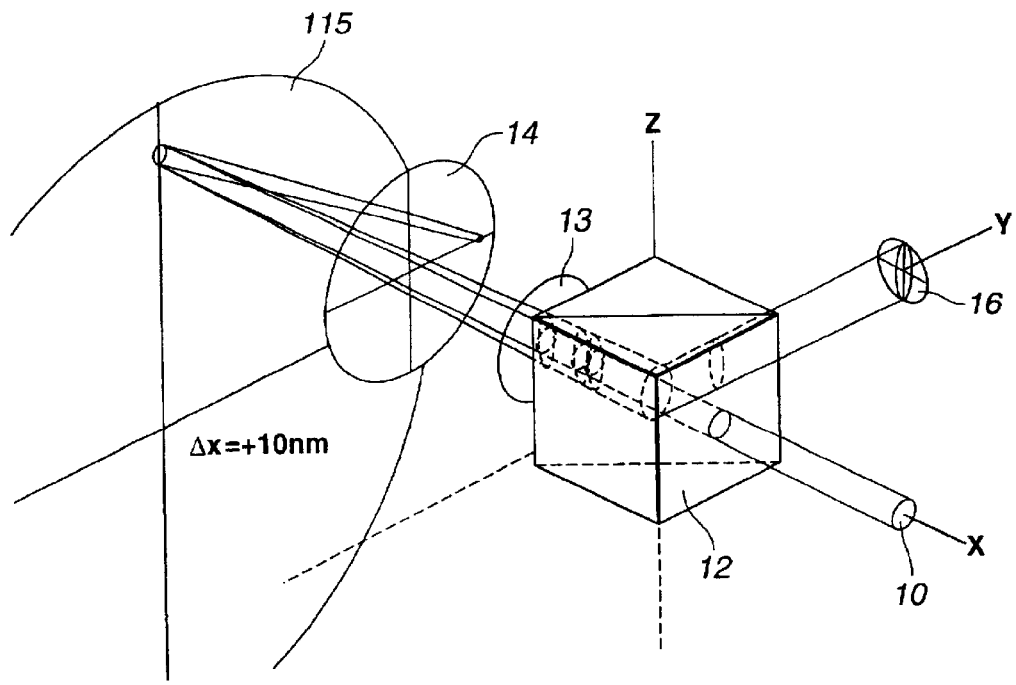
FIG. 29 is a diagram illustrating the influence of a change in the wavelength of a light beam emitted from a light source in the tenth embodiment.

FIG. 29 is a diagram illustrating a result of calculating a shift of the optical path when the diffraction angle changes due to a change in the oscillation wavelength of the semiconductor-laser light source 10 by 10 nm caused, for example, by a change in the temperature environment, in the tenth embodiment. In this case, the irradiated position on the annular reflection grating 14 is slightly shifted due to the change in the diffraction angle. However, since the light beam is diffracted with an original diffraction angle by the annular reflection grating 14, the position of rediffraction by the radial diffraction-grating scale 115 and the state of the emitted light beam are invariable. Hence, the state of interference is, of course, stable.

Figure 30:
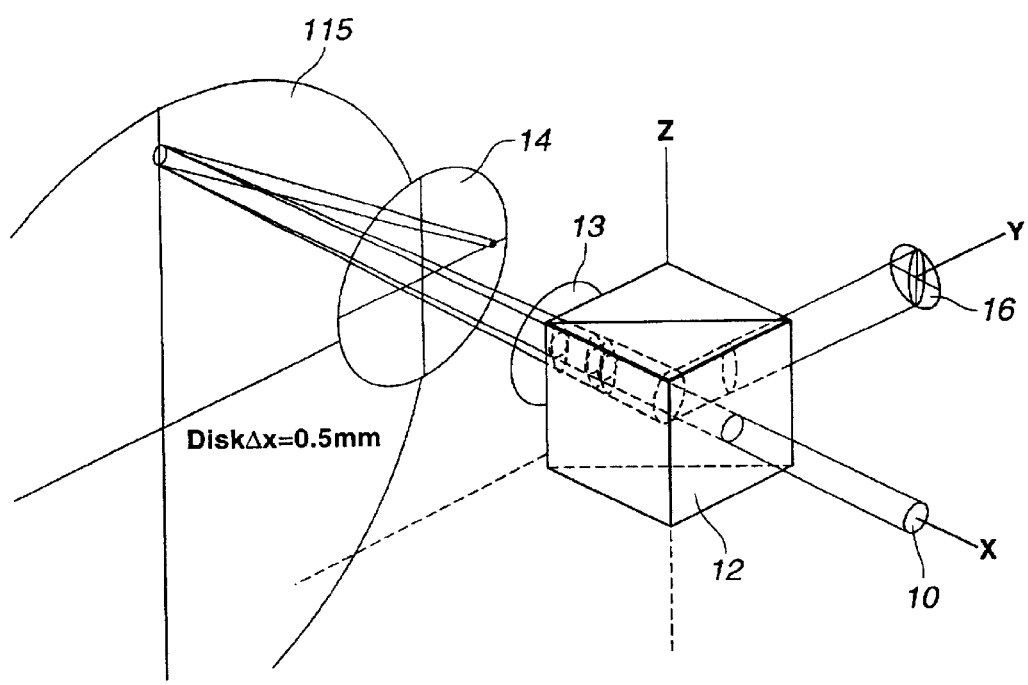
FIG. 30 is a diagram illustrating a change in the gap between a scale and a detection head in the tenth embodiment.

FIG. 30 is a diagram illustrating a shift of the optical path when the position of the radial diffraction-grating scale 115 is shifted by 0.5 mm. Even if the gap between the detection-head unit and the radial diffraction-grating scale 115 is increased, the position of rediffraction of the light beams diffracted by the annular reflection grating 14 by the radial diffraction-grating scale 115 and the state of the emitted light beam are invariable. Hence, the state of interference is, of course, stable.

Figure 31A:
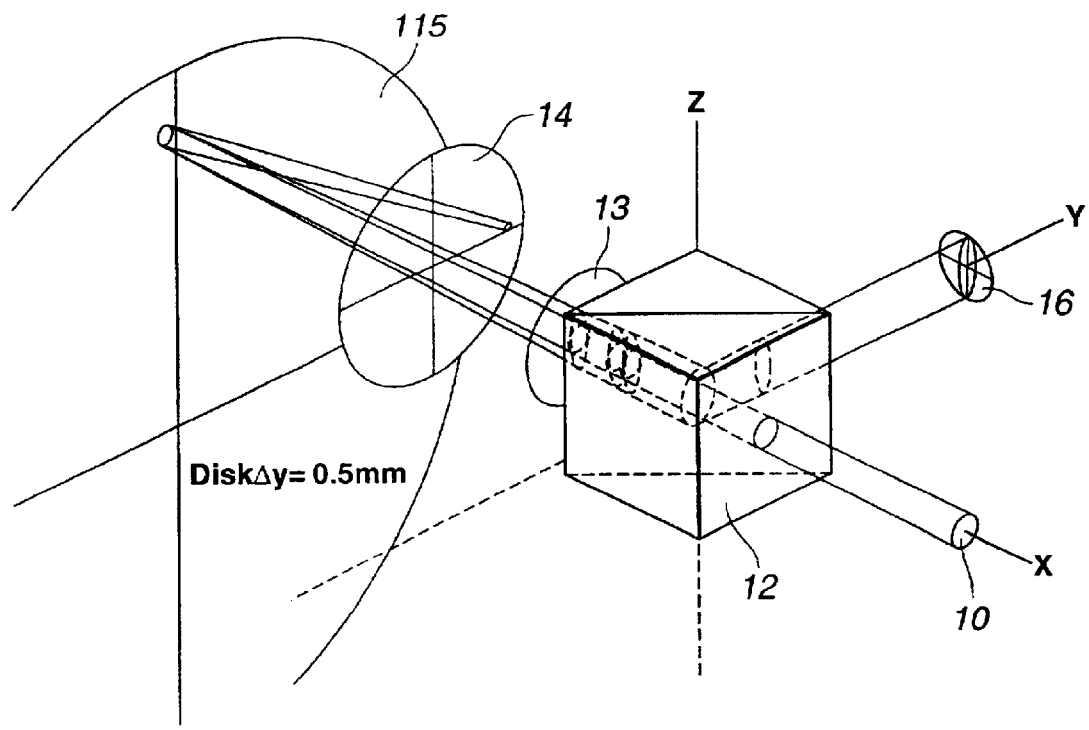
FIGS. 31A and 31B are diagrams, each illustrating the influence of a change in the azimuth angle between the scale and the detection head in the tenth embodiment.
Figure 31B:
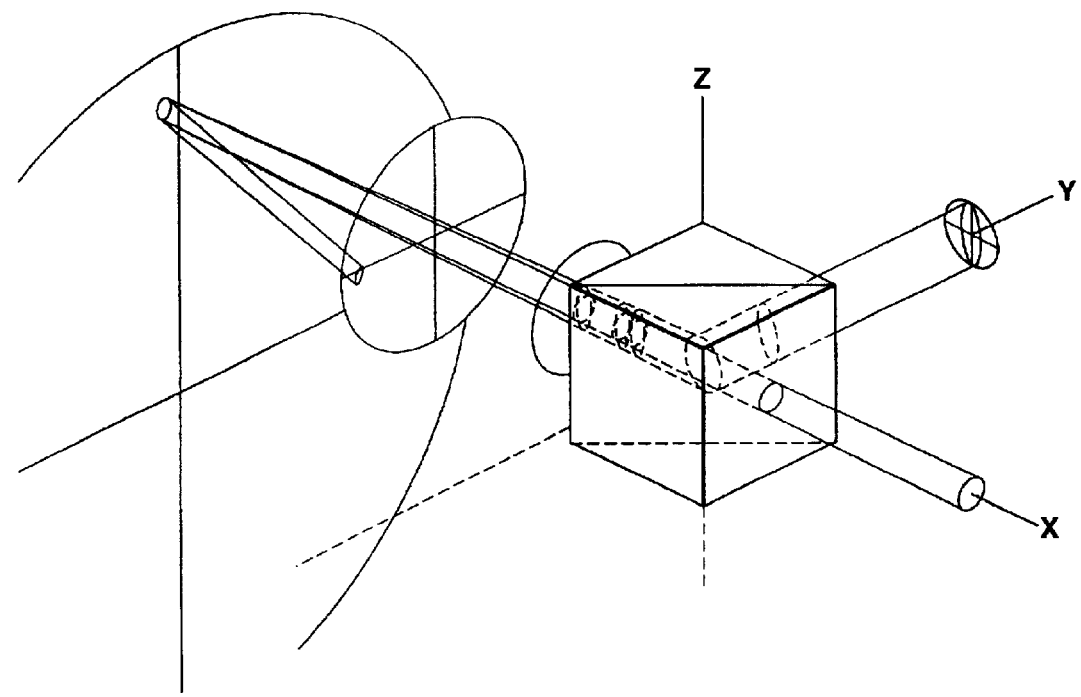

FIGS. 31A and 31B are diagrams, each illustrating a result of calculation when the detection-head unit is shifted with respect to the radial diffraction-grating scale 115 by 0.5 mm in a tangential direction, in the tenth embodiment. This case is equivalent to the case that the radial diffraction-grating scale 115 is eccentric by 0.5 mm, and is also equivalent to an azimuth error in the arrangement of the scale when using the linear grating 15. Even if the irradiated position is shifted, since the light beam is diffracted to the original optical path by the annular reflection grating 14, the position of rediffraction by the radial diffraction-grating scale 115 and the state of the emitted light beam are invariable. FIGS. 31A and 31B illustrate the optical paths of a +first-order diffracted light beam and a −first-order diffracted light beam, respectively. Although the irradiated positions on the photosensor 16 are slightly shifted in the vertical direction, these light beams are substantially parallel to each other, and the state of interference is stable. The above-described amount of shift of 0.5 mm is provided in order to facilitate understanding of the result of calculation. The amount of shift in the actual encoder is much smaller.

Figure 32A:
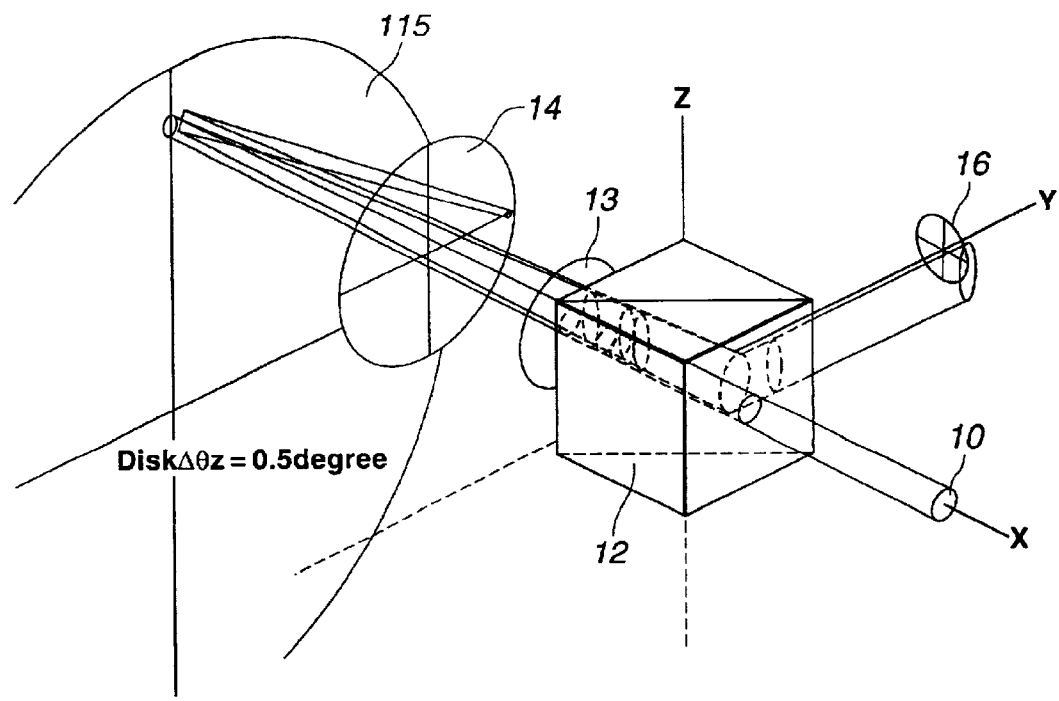
FIGS. 32A–33B are diagrams, each illustrating the influence of a change in the tilt angle between the scale and the detection head in the tenth embodiment.
Figure 32B:
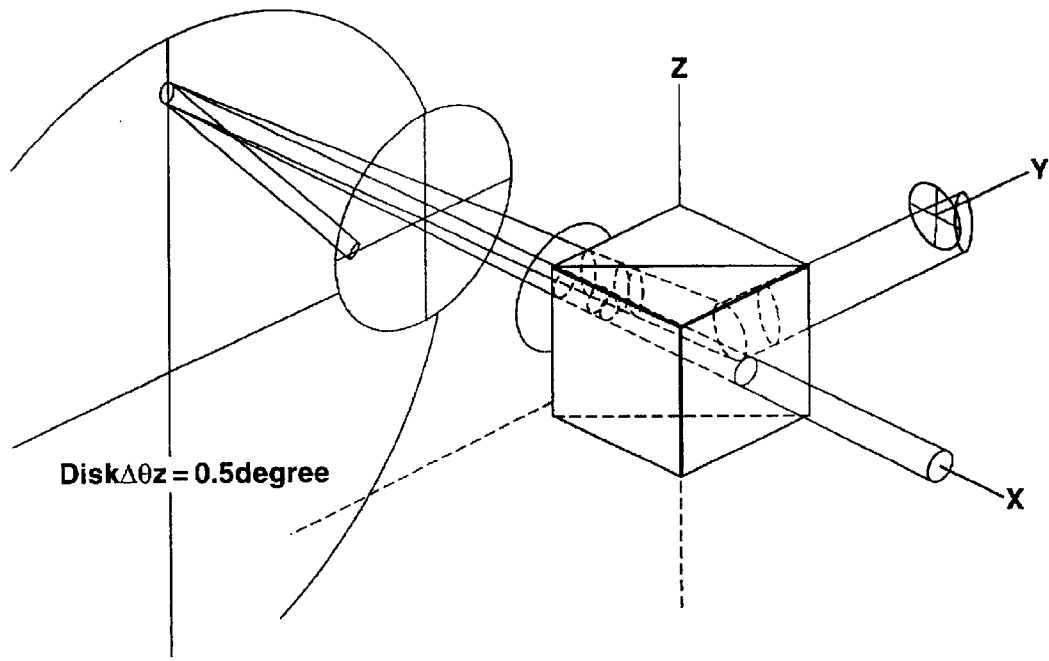

FIGS. 32A and 32B are diagrams, each illustrating a shift of the optical path when a tilt error of $\Delta\theta z=0.5$ degrees is given with respect the line of the grating for the angle of installation between the radial diffraction-grating scale 115 and the detection-head unit. The result of reading of the optical paths of the ±first-order diffracted light beams shown in FIGS. 32A and 32B indicates that, even if a small amount of tilt error is added, the difference between the ±first-order diffracted light beams in the position of rediffraction by the radial diffraction-grating scale 115 does not change. Hence, the state of interference is stable. In FIGS. 32A and 32B, the incident light beams on the photosensor 16 are shifted in reverse directions in the z-axis direction on the surface of the photosensor 16. Since these z-axis components are substantially parallel, the state of interference hardly changes. The amount of shift of 0.5 mm in the calculation is provided in order to facilitate understanding of the result of calculation. The amount of shift in the actual encoder is much smaller.

Figure 33A:
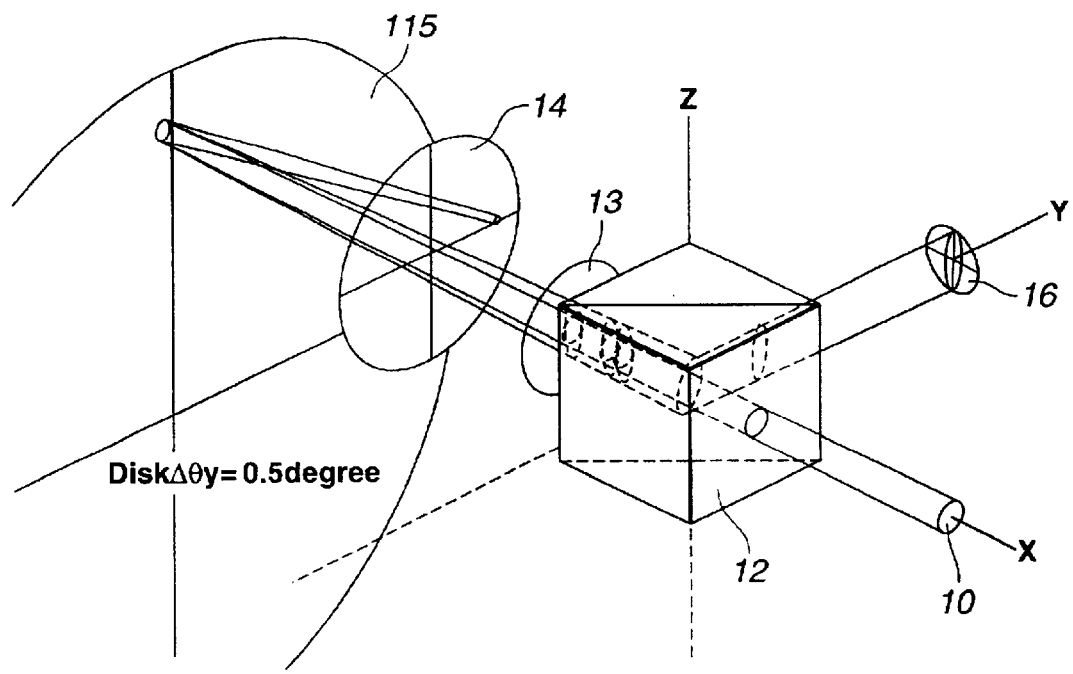
Figure 33B:
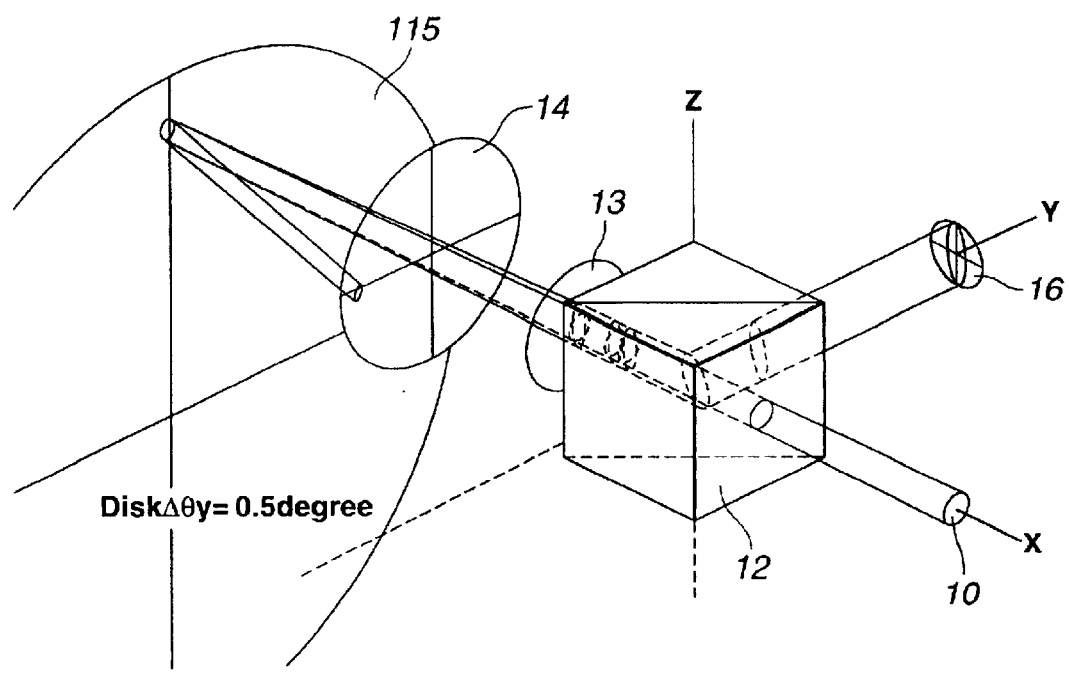

FIGS. 33A and 33B are diagrams, each illustrating a shift of the optical path when a tilt error of $\Delta\theta y=0.5$ degrees is provided with respect the orientation of arrangement of the grating for the angle of installation between the radial diffraction-grating scale 115 and the detection-head unit. The result of reading of the optical paths of the ±first-order diffracted light beams shown in FIGS. 33A and 33B indicates that, even if a small amount of tilt error is added, the difference between the ±first-order diffracted light beams in the position of rediffraction by the radial diffraction-grating scale 115 does not change. Hence, the state of interference is stable, and the irradiated position on the photosensor 16 is substantially not shifted.

As described above, by combining the annular reflection grating 14 with point-like projection of a light beam on the radial diffraction-grating scale 115 in the return path, it is possible to make provision of a small-size and high-resolution encoder having a large allowance in a mounting error to be compatible with detection of a stable interference signal.

Figure 34:
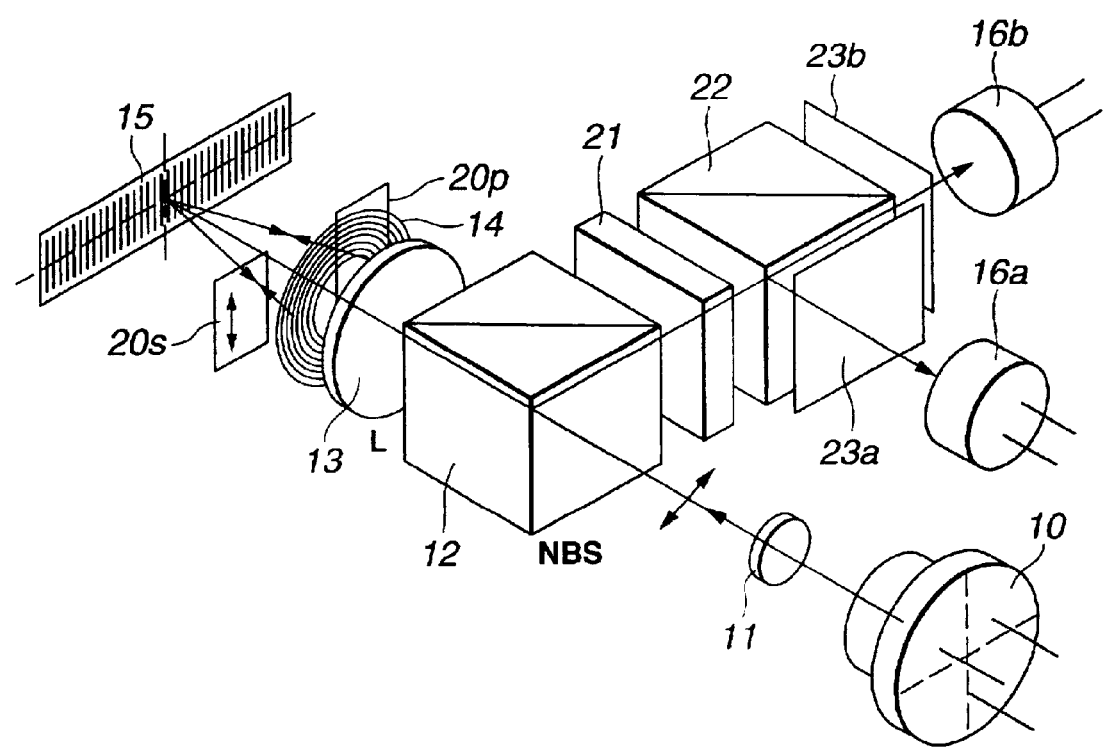
FIG. 34 is a diagram illustrating addition of an optical system for generating a phase-difference signal using a polarizer according to an eleventh embodiment of the present invention.

FIG. 34 is a diagram illustrating an eleventh embodiment of the present invention, in which two-phase signals are detected by disposing a polarizing element so as to generate a phase-difference signal in the configuration of the tenth embodiment. In the eleventh embodiment shown in FIG. 34, a linear encoder using a polarizing plate as the polarizing element and using a linear diffraction lens is adopted. In FIG. 34, a light beam from a semiconductor laser 10 passes through a non-polarizing beam splitter 12, and is substantially perpendicularly projected onto a diffraction-grating scale 15.

A +first-order diffracted light beam reflected from the diffraction-grating scale 15 is emitted with a diffraction angle θ, is diffracted and reflected to the original optical path by an annular reflection grating 14 provided at an upper portion, and is returned to the non-polarizing beam splitter 12 by being subjected to +first-order diffraction by the diffraction-grating scale 15.

A −first-order diffracted light beam reflected from the diffraction-grating scale 15 is emitted in the opposite direction with a diffraction angle θ is diffracted and reflected to the original optical path by the annular reflection grating 14, and is returned to the non-polarizing beam splitter 12 by being subjected to −first-order diffraction by the diffraction-grating scale 15. In the eleventh embodiment shown in FIG. 34, polarizing plates 20s and 20p whose orientations of polarization are shifted by 90 degrees from each other are inserted in the optical path between the diffraction-grating scale 15 and the annular reflection grating 14. The light beam projected from the semiconductor laser 10 onto the diffraction-grating scale 115 includes the above-described polarized components.

Accordingly, the orientations of polarization of the ±first-order diffracted light beams propagated to the non-polarizing beam splitter 12 are shifted by 90 degrees from each other and the wavefronts of these light beams are superposed (not light/dark light beams).

As a result, the two light beams reflected by the non-polarizing beam splitter 12 pass through a ¼-wavelength plate 21 and are converted into a linearly polarized light beam whose orientation of polarization changes based on the phase difference between the two light beams. The obtained light beam is divided into two light beams by a non-polarizing beam splitter 22 provided behind the ¼-wavelength plate 21. By extracting only specific orientations of polarization by polarizing plates 23a and 23b, light/dark signals are obtained. The phases (timings) of these light/dark signals are provided by shifts of the orientation of polarization of the polarizing plates 23a and 23b. By shifting the orientations of polarization of the polarizing plates 23a and 23b by 45 degrees in opposite directions, the phase difference between the light-dark signals is set to 90 degrees.

Figure 35:
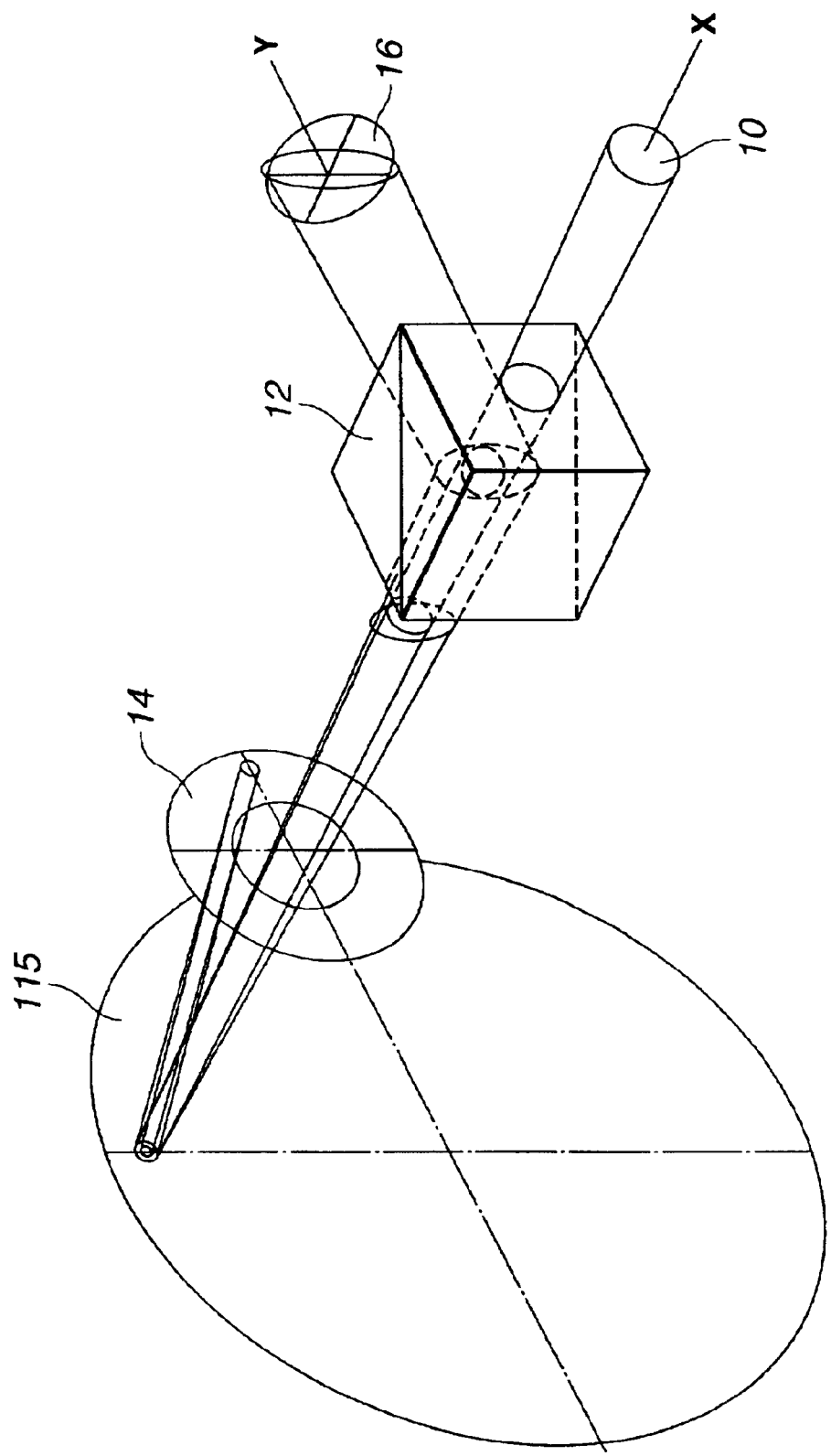
FIG. 35 is a diagram illustrating an optical path of an encoder according to a twelfth embodiment of the present invention (addition of a convex lens)

FIG. 35 illustrates a twelfth embodiment of the present invention.

Figure 36:
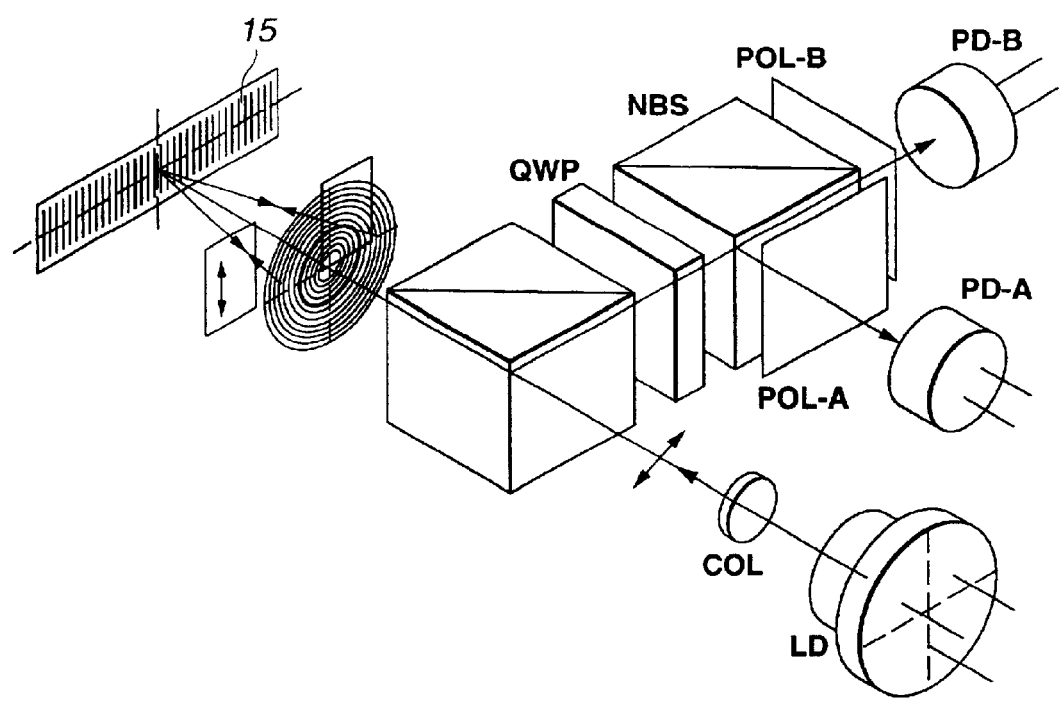
FIG. 36 is a diagram illustrating an optical path of an encoder according to a thirteenth embodiment of the present invention (addition of a diffraction lens)

In FIG. 35, instead of adopting a lens 13 as optical means for projecting a convergent light beam, a convergent light beam is directly obtained by a collimator lens 11 (not shown). In FIG. 36 illustrating a thirteenth embodiment of the present invention, a diffraction lens is integrally formed at a central portion (transmitting-window portion) of an annular reflection grating 14. The diffraction lens is patterned so that the pitch of the grating gradually changes from the central portion to the peripheral portion, in order to provide the function of a convex lens.

In the tenth, eleventh and twelfth embodiments, partial modification may be performed with respect to the following items.

(1) In the diffraction-grating scale 15 or the radial diffraction grating 115 and the annular reflection grating 14, diffracted light beams having a diffraction order other than the ±first-order diffracted light beams are used.

(b) The polarizing plates are replaced by other elements (prisms, each having a polarizing film, or fine-grating patterns) having the equivalent functions.

(3) The phase-difference plates (the ¼-wavelength plate and the ⅛-wavelength plates) are replaced by elements (fine-structure patterns or other anisotropic materials) having functions equivalent to the functions of a crystal optical element, such as quartz or the like.

(4) The same effects are obtained by providing at least two phases for a phase-difference signal and setting the phase difference to a value other than 90 degrees, and partially changing the arrangement of polarizing elements or phase-difference plates.

(5) In the above-described embodiments, the non-polarizing beam splitters are used in order to guide light beams to be projected onto the diffraction-grating scale and to guide rediffracted light beams to the photosensor. However, the light beams may be guided by using any other appropriate beam dividing/synthesizing means (diffraction gratings or the like), or by separating light beams by spatially shifting forward and backward optical paths, or by selectively reflecting only one of the light beams and guiding the selected light beam to the photosensor.

(6) For example, by changing the order of arrangement of the collimator lens, the non-polarizing beam splitter and the annular reflection grating, another optical arrangement is adopted in order to provide a system of condensing a light beam onto one point of the diffraction-grating scale in the return path.

The tenth, eleventh and twelfth embodiments have the following effects by using a convergent-light-beam projection optical system, and an annular reflection grating as a returning optical element.

(1) Even when using a radial diffraction grating as a scale grating, the interfered wavefronts of the diffracted light beams tend to coincide with each other, a flat light-dark pattern is obtained, and a stable encoder signal having an excellent S/N ratio can be obtained.

(2) Since a plane optical element is used as the annular reflection grating, the space of arrangement is not complicated, and a small encoder can be easily provided.

(3) Since variations in the wavelength of the light beam from the light source are corrected, an interference signal is stabilized.

(4) Since an alignment error is corrected, even an encoder in which a scale grating and a detection head are separated can be relatively easily mounted.

(5) Since an element having a reflecting film deposited in the vacuum on the back of a glass plate processed by etching or the like can be used as the annular reflection grating, an excellent environment resisting property is provided.

(6) The size of a beam reflecting optical element is small and the number of components is small. Hence, by adding deflection means to light-beam projection means, the degree of freedom in the method or the direction of projection of a light beam onto a scale grating is increased, and a wider posture of application can be obtained.

(7) Since the rediffracted light beam is guided to the photosensor without spreading, it is possible to perform detection with a small loss and an excellent SIN ratio.

Fourteenth through seventeenth embodiments of the present invention will now be described in detail with reference to FIGS. 37 through 50.

Figure 37:
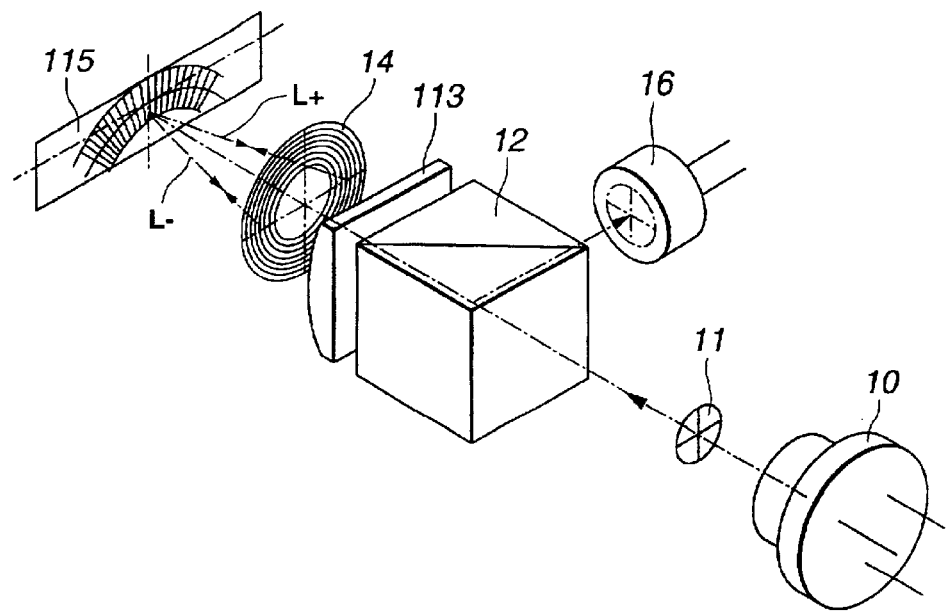
FIG. 37 is a perspective view illustrating a fourteenth embodiment of the present invention.

FIG. 37 is a perspective view illustrating the configuration of a rotary encoder according to a fourteenth embodiment of the present invention. In FIG. 37, a collimator lens 11, a non-polarizing beam splitter 12, a cylindrical lens 113, an annular reflection grating 14, and a radial grating 115 for the rotary encoder are arranged in the optical path of a light beam emitted from a semiconductor-laser light source 10, and a photosensor 16 is disposed in the reflecting direction of the non-polarizing beam splitter 12. When the pitch of the grating on the radial grating 115 is represented by P1, the pitch P2 of the annular reflection grating 14 is set so as to satisfy a relationship of P2=P1/2.

According to such a configuration, a light beam L emitted from the semiconductor-laser light source 10 becomes a substantially parallel light beam by the collimator lens 11, and is projected onto the radial grating 115 linearly with respect to the orientation of arrangement of the grid line or the tangential direction after passing through the non-polarizing beam splitter 12, the cylindrical lens 113 and a central portion of the annular reflection grating 14. Diffracted light beams L+ and L−reflected from the radial grating 115 are projected onto the annular reflection grating 14 in the form of an ellipse. The light beam is linearly projected onto the radial grating 115 due to the light condensing characteristics of the cylindrical lens 113. Since the power of the cylindrical lens 113 does not operate in an axial direction orthogonal to the projected light beam, the light beam having only the original substantially parallel property is obtained.

Figure 38:
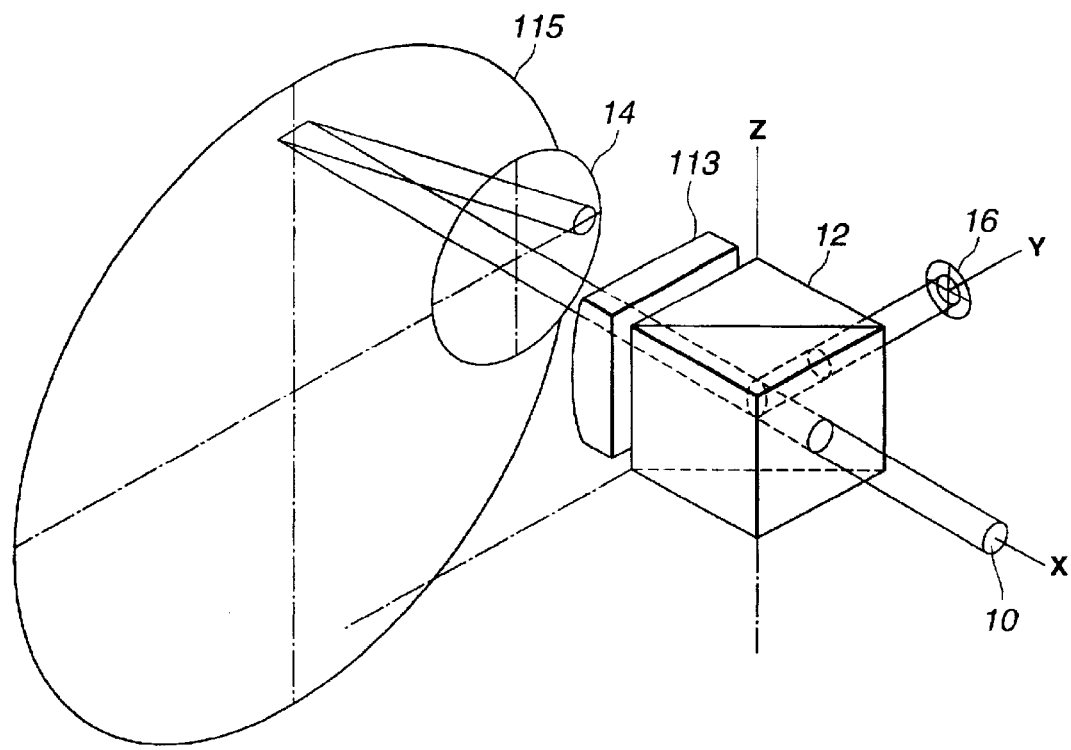
FIGS. 38 and 39 are diagrams, each illustrating a result of tracking of a light beam.
Figure 39:
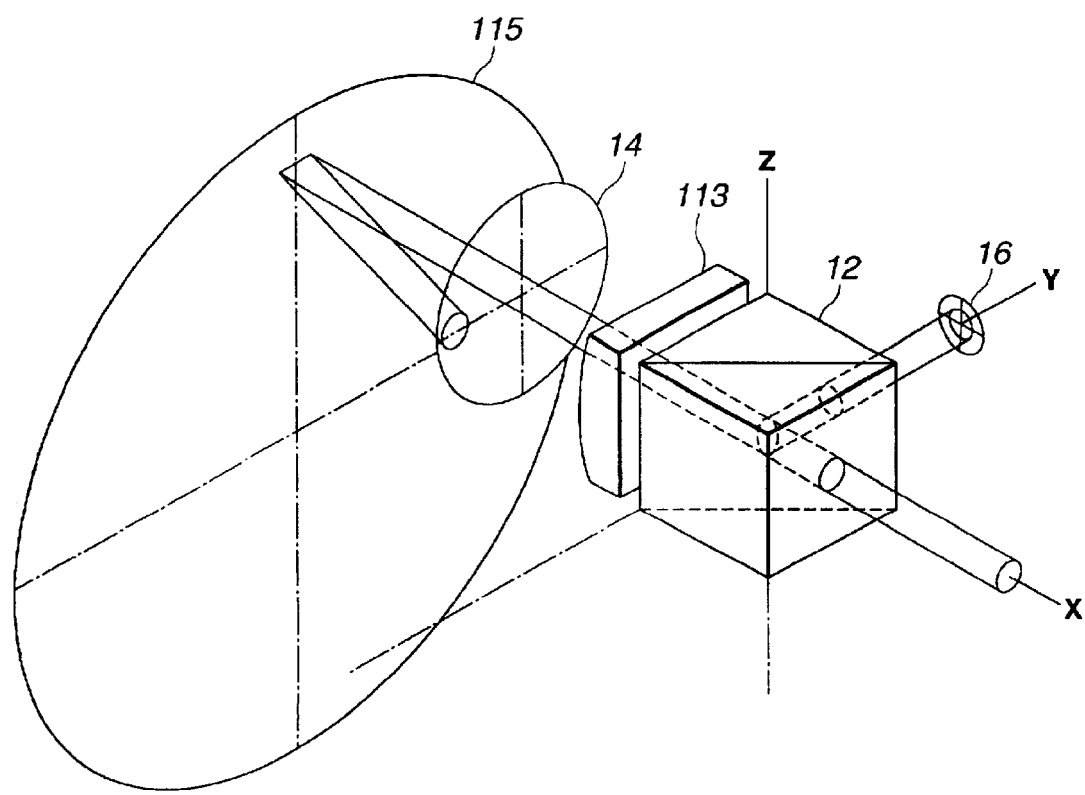

FIGS. 38 and 39 are diagrams illustrating results of tracking of ±first-order diffracted light beams by projecting a light beam having a diameter of 1 mm in the same optical system. The annular reflection grating 14 locally operates as a linear diffraction grating having the pitch of P2. Hence, the light beams emitted from the linearly condensed region of the radial grating 115 and projected onto all portions on the annular reflection grating 14 are diffracted and returned to the original optical path to be projected onto and diffracted by the radial grating 115, and are returned to the non-polarizing beam splitter 12 in a superposed state. This is an effect peculiar to the annular reflection grating 14.

The resultant light beam is guided in a direction different from the semiconductor-laser light source 10 by the beam splitter 12, and is detected as an interference light beam by the photosensor 16. When ±first-order diffracted light beams are used, the period of light and dark of interference equals four periods with respect to one pitch of the radial grating 115. As shown in FIGS. 38 and 39, a substantially circular light beam is obtained on the photosensor 16.

Figure 40:
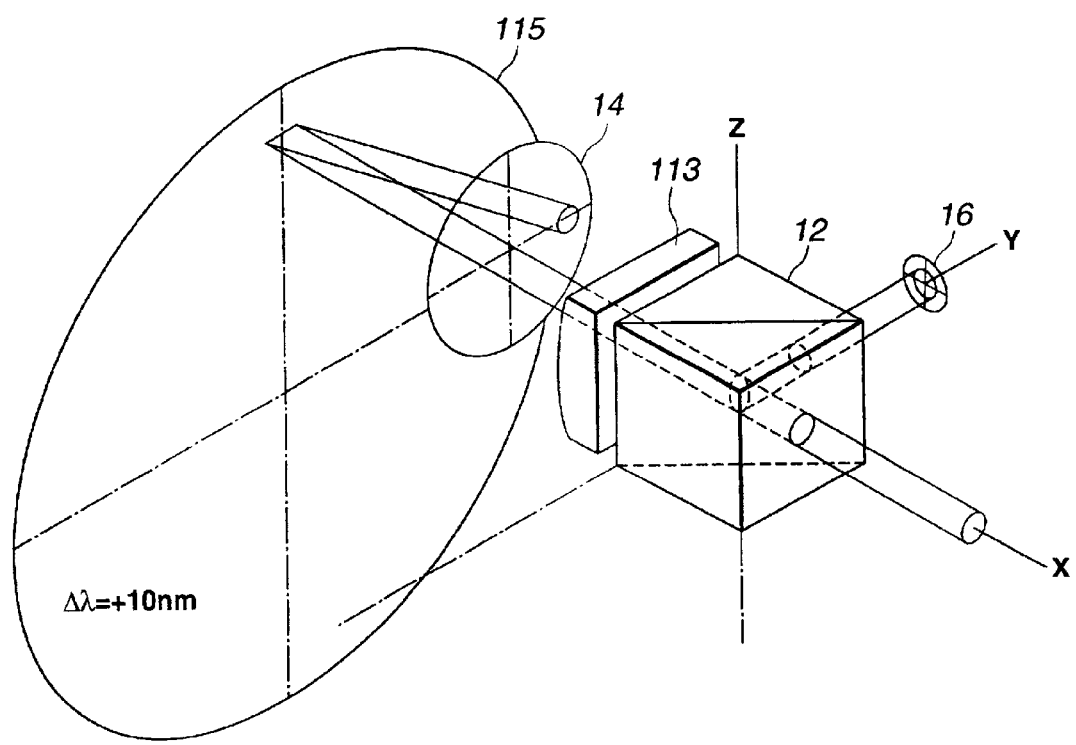
FIG. 40 is a diagram illustrating the influence of a change in the wavelength of a light beam.

FIG. 40 is a diagram illustrating a result of calculating a shift of the optical path when the diffraction angle changes due to a change in the oscillation wavelength of the semiconductor-laser light source 10 by Δλ=10 nm caused, for example, by a change in the temperature environment. In this case, the irradiated position on the annular reflection grating 14 is slightly shifted due to a change in the diffraction angle of the diffracted light by the radial grating 115. However, since the light beam is diffracted with an original diffraction angle by the annular reflection grating 14, the position of rediffraction by the radial grating 115 and the state of the emitted light beam are invariable. Hence, the state of interference is stable.

Figure 41:
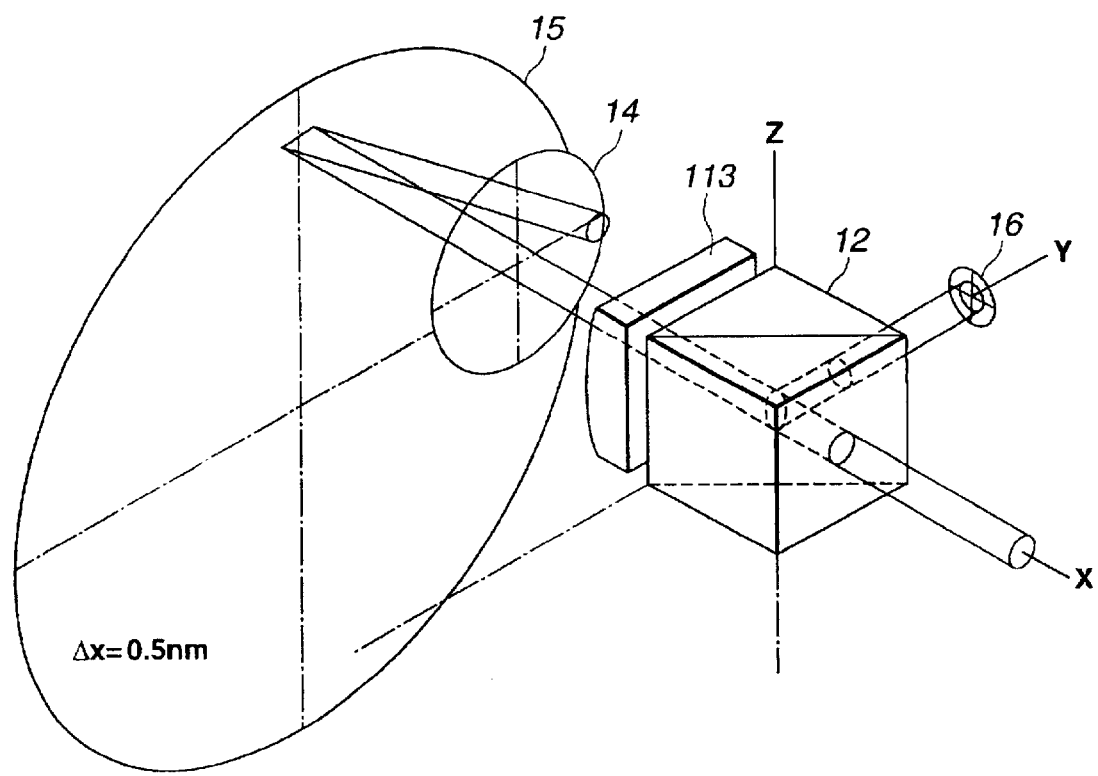
FIG. 41 is a diagram illustrating the influence of a change in the gap between a scale and a detection head.

FIG. 41 is a diagram illustrating a shift of the optical path when the position of the radial grating 115 is shifted by Δx=0.5 mm. Even if the gap of the radial grating 115 at the position illuminated by the light beam is reduced, the position of rediffraction by the radial grating 115 and the state of the emitted light beam are invariable. Hence, the state of interference is stable.

Figure 42:
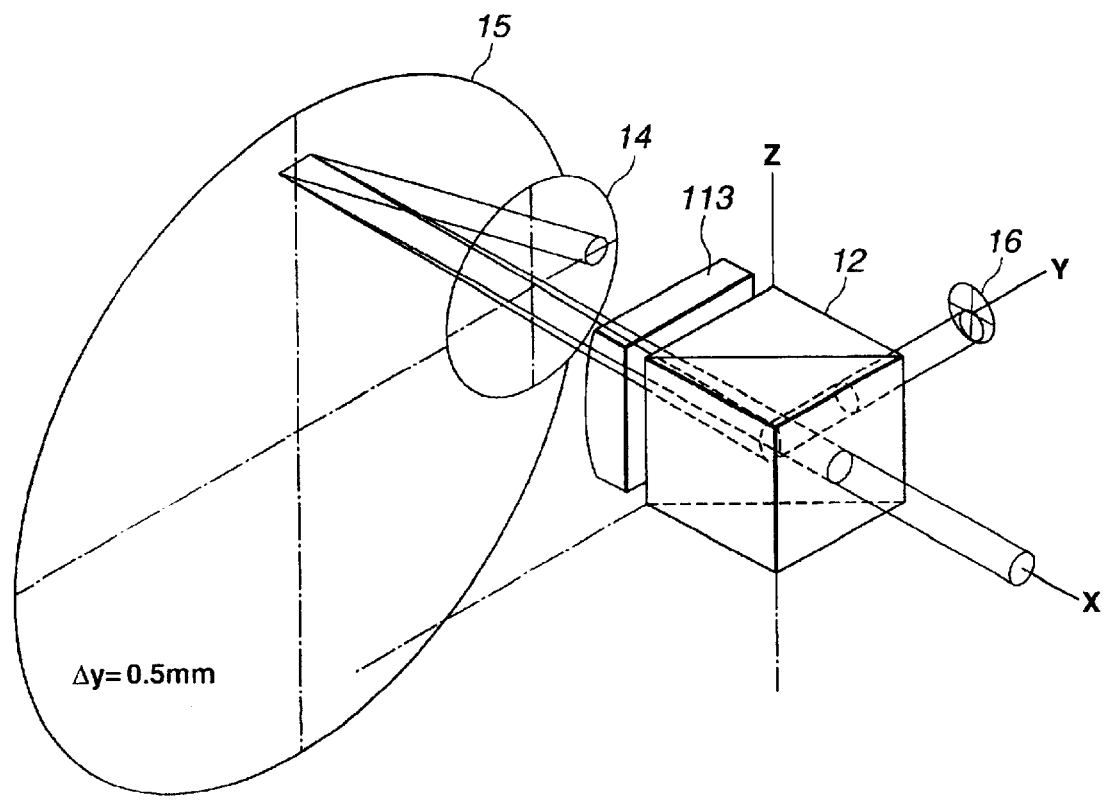
FIGS. 42 and 43 are diagrams, each illustrating the influence of a change in the azimuth angle between the scale and the detection head.
Figure 43:
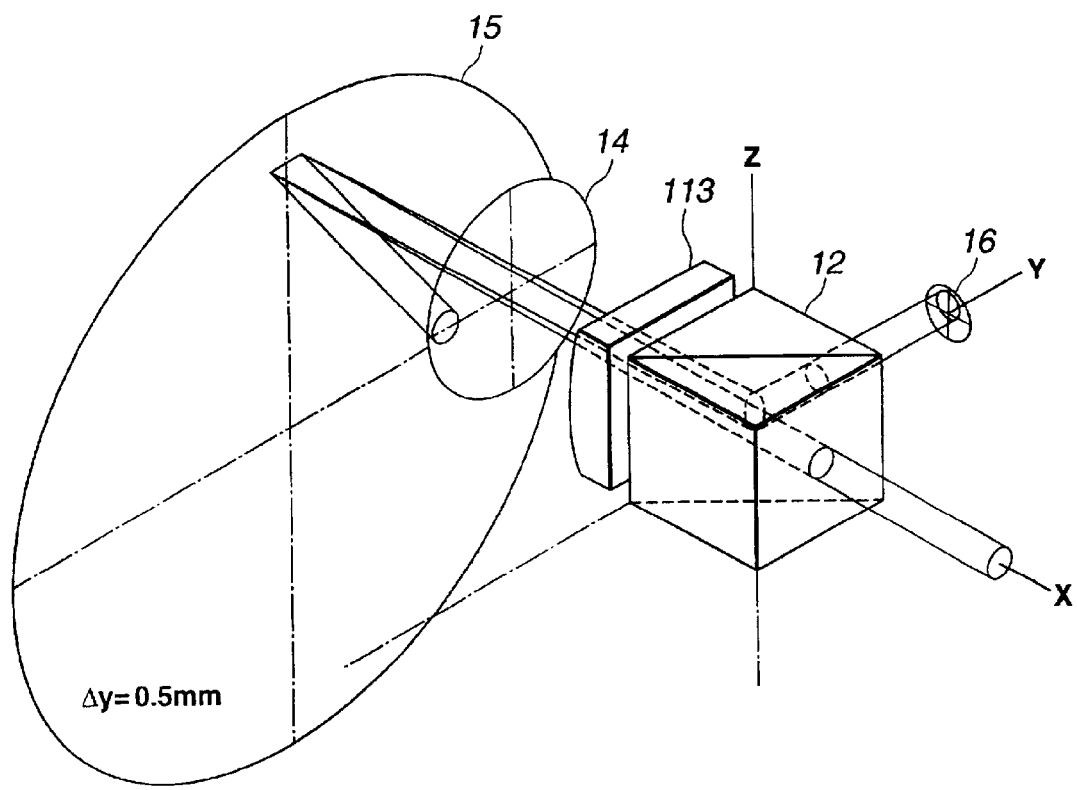

FIGS. 42 and 43 are diagrams, each illustrating a result of calculation when the detection-head unit is shifted with respect to the radial grating 115 by Δy=0.5 mm in a tangential direction. This case is equivalent to the case that the radial grating is eccentric by 0.5 mm, and is also equivalent to an azimuth error in the arrangement of the scale when using a linear grating. Even if the irradiated position is shifted, since the light beam is returned to the original optical path by the function of the annular reflection grating 14, the position of rediffraction by the radial grating 115 and the state of the emitted light beam are invariable. FIGS. 42 and 43 illustrate the optical paths of a+first-order diffracted light beam and a −first-order diffracted light beam, respectively. Although the irradiated positions on the photosensor 16 are slightly shifted in the vertical direction, these light beams are substantially parallel to each other, and the state of interference is stable. The above-described amount of shift of 0.5 mm is provided in order to facilitate understanding of the result of calculation. The amount of shift in the actual encoder is much smaller.

Figure 44:
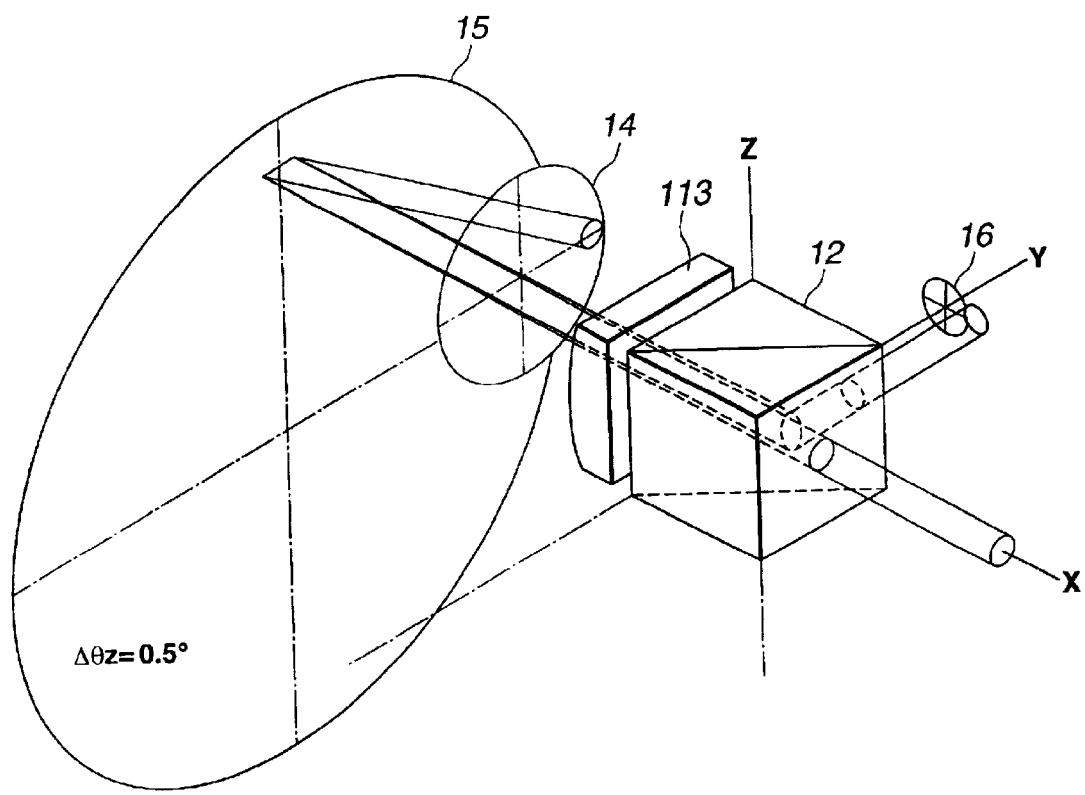
FIGS. 44 through 47 are diagrams, each illustrating the influence of a change in the tilt angle between the scale and the detection head.
Figure 45:
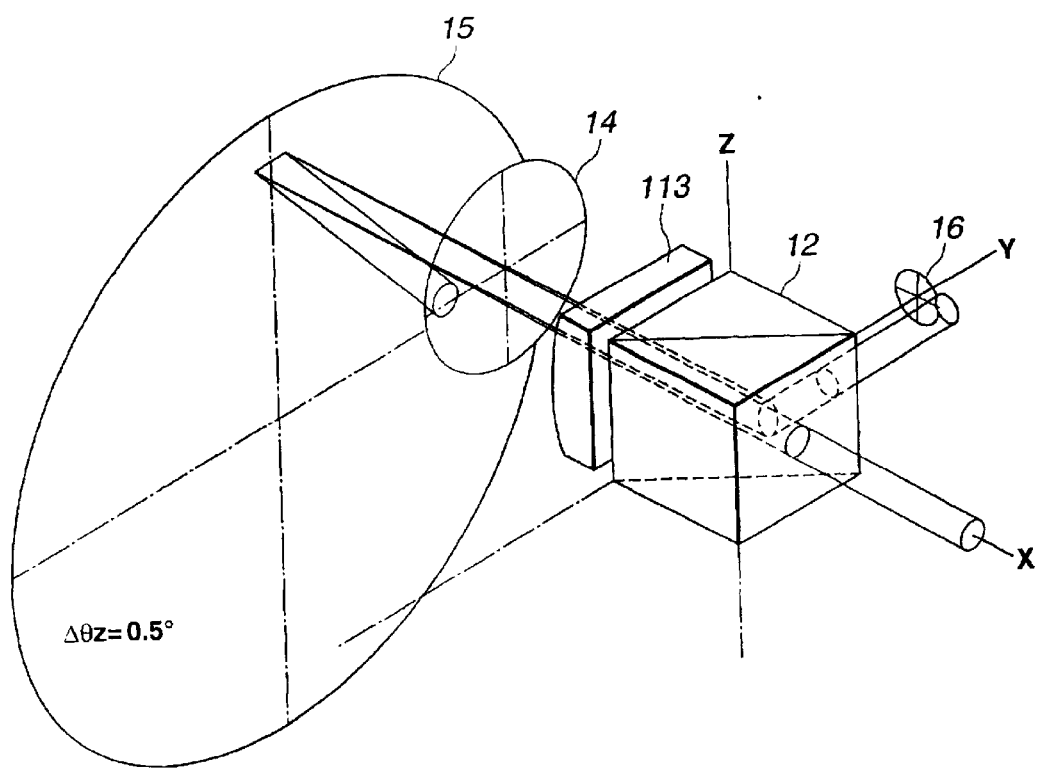

FIGS. 44 and 45 are diagrams, each illustrating a shift of the optical path when a tilt error of Δθz=0.5 degrees is given with respect the orientation of arrangement of the grating for the angle of installation between the radial grating 115 and the detection-head unit. The result of reading of the optical paths of the ±first-order diffracted light beams shown in FIGS. 44 and 45 indicates that, even if a small amount of tilt error is added, the difference between the ±first-order diffracted light beams in the position of rediffraction by the radial grating 115 and the state of emitted light beams does not change. Hence, the state of interference is stable.

In FIGS. 44 and 45, the incident light beams on the photosensor 16 are shifted from the surface of the photosensor 16. However, the amount of shift of 0.5 mm is provided in order to facilitate understanding of the result of calculation. The amount of shift in the actual encoder is much smaller, as in the cases of FIGS. 42 and 43.

Figure 46:
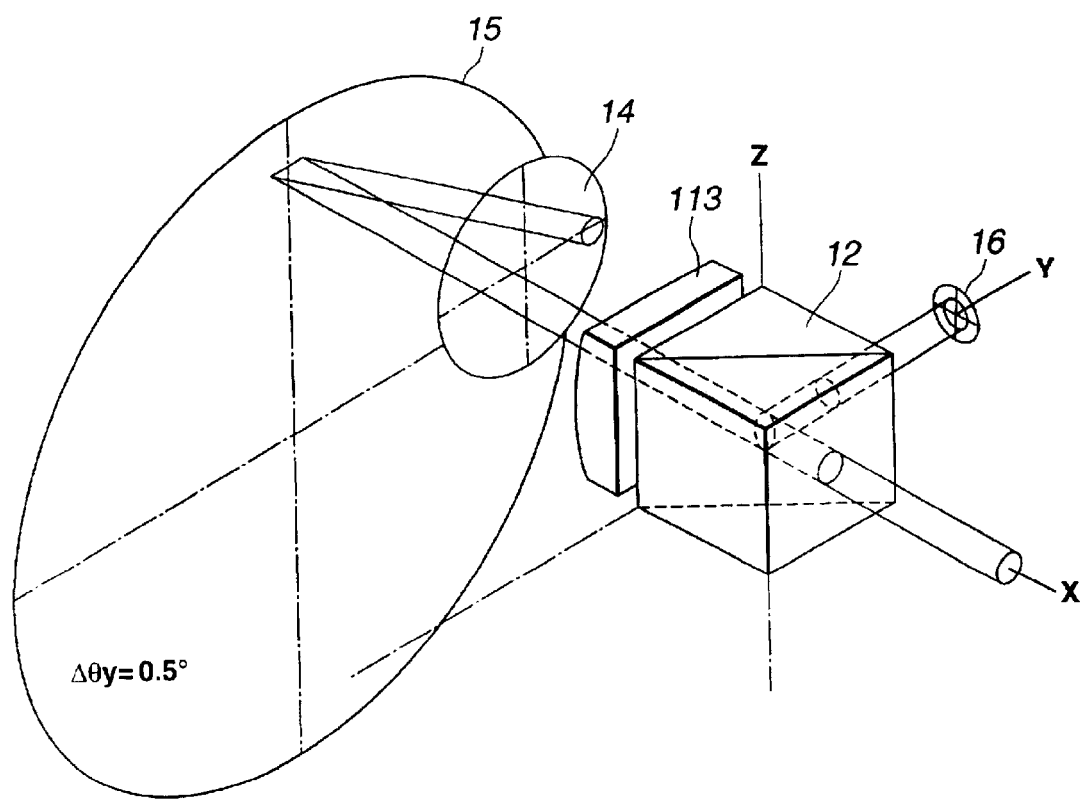
Figure 47:
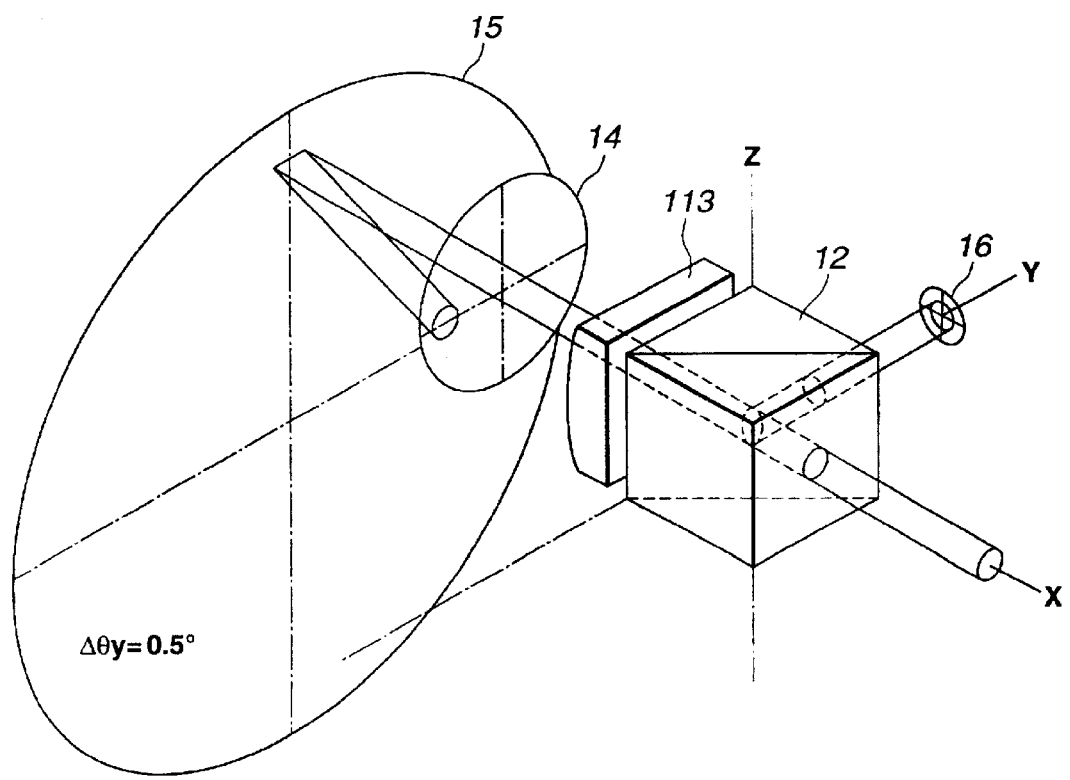

FIGS. 46 and 47 are diagrams, each illustrating a shift of the optical path when a tilt error of Δθy=0.5 degrees is given with respect the orientation of arrangement of the grating for the angle of installation between the radial grating 115 and the detection-head unit. The result of reading of the optical paths of the ±first-order diffracted light beams in FIGS. 46 and 47 indicates that, even if a small amount of tilt error is added, the difference between the ±first-order diffracted light beams in the position of rediffraction by the radial grating 115 and the state of emitted light beams does not change. Hence, the state of interference is stable, and the irradiated position on the photosensor 16 is substantially not shifted.

As described above, by combining the annular reflection diffraction grating 14 with linear projection of a light beam, it is possible to make provision of a small-size and high-resolution encoder having a large allowance in a mounting error to be compatible with detection of a stable interference signal.

Figure 48:
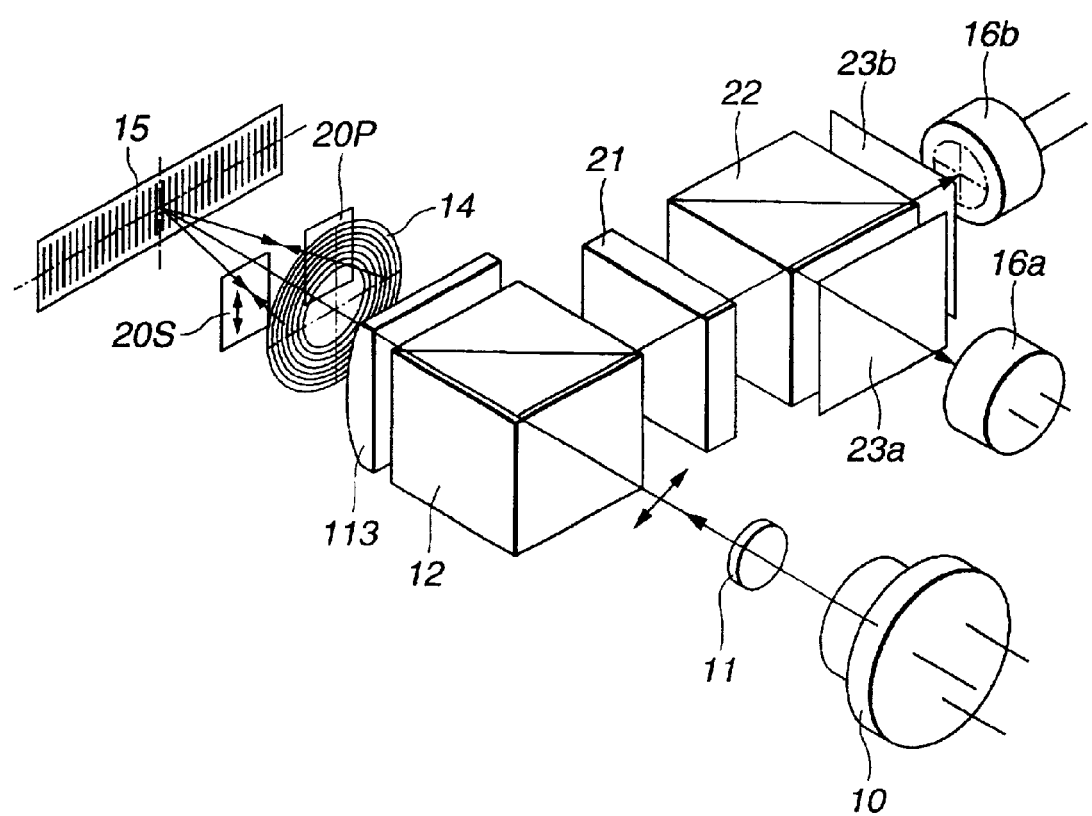
FIG. 48 is a perspective view illustrating a fifteenth embodiment of the present invention.

FIG. 48 is a perspective view illustrating an encoder according to a fifteenth embodiment of the present invention, in which two-phase signals are detected by adding a phase-difference-signal generation optical system having a polarizing element. By replacing a diffraction-grating scale 15 in this linear encoder by a radial grating, a rotary encoder may also be provided.

In FIG. 48, a collimator lens 11, a non-polarizing beam splitter 12, a cylindrical lens 113, an annular reflection grating 14, two polarizing plates 20S and 20P whose orientations of polarization are shifted by 90 degrees from each other, and a diffraction-grating scale 15 are arranged in the optical path of a light beam from a semiconductor-laser light source 10, serving as an coherent light source. A ¼-wavelength plate 21 and a non-polarizing beam splitter 22 are arranged in a reflecting direction of the non-polarizing beam splitter 12. A polarizing plate 23a and a photosensor 16a are disposed in the reflecting direction of the non-polarizing beam splitter 22, and a polarizing plate 23b and a photosensor 16b are arranged in the transmitting direction of the non-polarizing beam splitter 22.

According to the above-described configuration, a light beam from the semiconductor-laser light source 10 passes through the collimator lens 11 and the non-polarizing beam splitter 12, and is substantially perpendicularly projected onto the diffraction-grating scale 15 after passing through the cylindrical lens 113 and a central transmitting-window portion of the annular reflection grating 14.

A +first-order diffracted light beam reflected from the diffraction-grating scale 15 is emitted with a diffraction angle θ, is diffracted and reflected to the original optical path by the annular reflection grating 14 provided at an upper portion, and is returned to the non-polarizing beam splitter 12 by being subjected to +first-order diffraction by the diffraction-grating scale 15.

A −first-order diffracted light beam reflected from the diffraction-grating scale 15 is emitted in an opposite direction with a diffraction angle θ, is diffracted and reflected to the original optical path by the annular reflection grating 14, and is returned to the non-polarizing beam splitter 12 by being subjected to −first-order diffraction by the diffraction-grating scale 15.

The light beam projected from the semiconductor-laser light source 10 onto the diffraction-grating scale 15 has vertically and horizontally polarized components. Although the orientations of polarization of the ±first-order diffracted light beams propagated to the non-polarizing beam splitter 12 are shifted by 90 degrees from each other and the wavefronts of these light beams are superposed, these light beams are not light-and-dark light beams.

As a result, the two light beams reflected by the non-polarizing beam splitter 12 pass through the ¼-wavelength plate 21 and are converted into a linearly polarized light beam whose orientation of polarization changes based on the phase difference between the two light beams. The obtained light beam is divided into two light beams by a non-polarizing beam splitter 22 provided behind the ¼-wavelength plate 21. Only specific orientations of polarization are extracted by the polarizing plates 23a and 23b, and light/dark signals are sensed by the photodetectors 16a and 16b. The phases (timings) of these light/dark signals are provided by shifts of the orientation of polarization of the polarizing plates 23a and 23b. That is, by shifting the orientations of polarization of the polarizing plates 23a and 23b by 45 degrees in opposite directions, the phase difference between the light-dark signals is set to 90 degrees.

Figure 49:
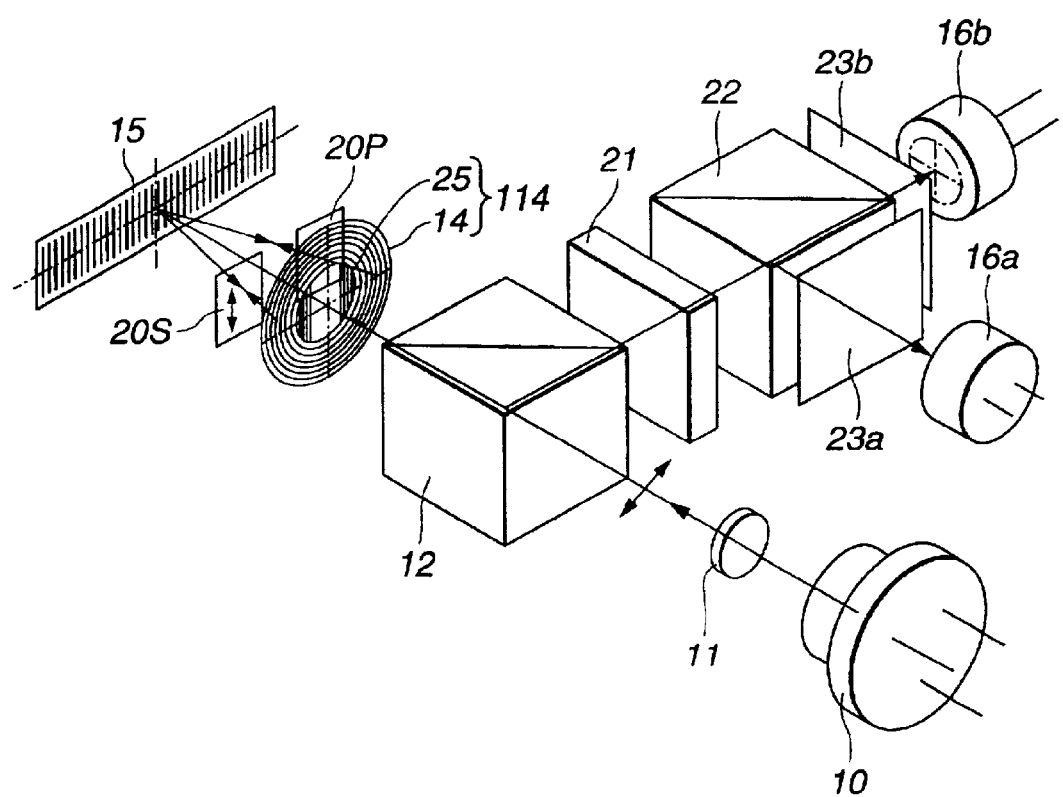
FIG. 49 is a perspective view illustrating a sixteenth embodiment of the present invention.

FIG. 49 illustrates a sixteenth embodiment of the present invention, in which a linear diffraction lens 114 (a linear Fresnel zone plate) is used as optical means for projecting a light beam obtained by linearly condensing a light beam. That is, a linear diffraction lens 25 is integrally formed at a central transmitting-window portion of an annular reflection grating 14. The linear diffraction lens 25 is patterned so that the pitch of the grating gradually changes from the central portion to the peripheral portion, in order to provide the function of a cylindrical lens. Two-phase signals are detected by disposing a crystal optical element for generating a phase-difference signal.

Figure 50:
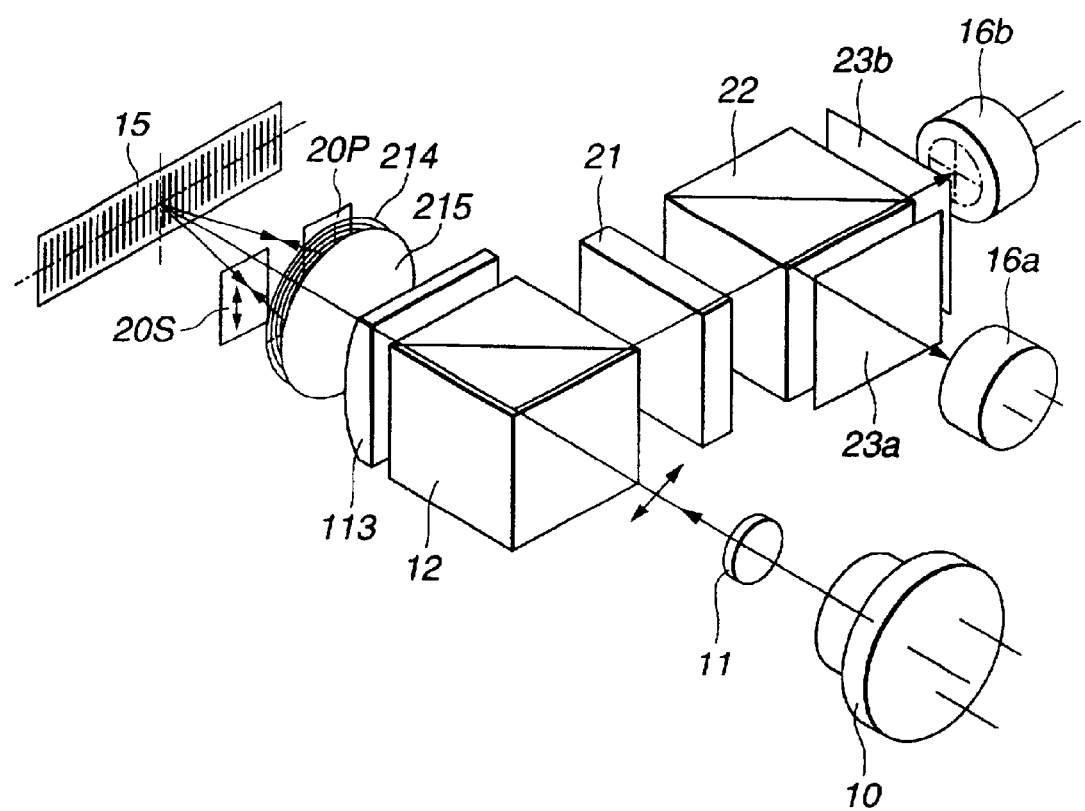
FIG. 50 is a perspective view illustrating a seventeenth embodiment of the present invention.

FIG. 50 illustrates a seventeenth embodiment of the present invention, in which an annular transmission grating 214 is adopted instead of the annular reflection grating 14. Diffracted light beams are reflected by a reflecting surface 215 provided immediately behind the annular transmission grating 214, and are projected onto a diffraction-grating scale 15. The pitch of the annular transmission grating 214 is set to the same value as the pitch of the diffraction-grating scale 15.

In FIG. 50, a collimator lens 11, a non-polarizing beam splitter 12, a cylindrical lens 13, the annular transmission grating 214 having the reflecting surface 215 immediately behind it, two polarizing plates 20S and 20P whose orientations of polarization are shifted by 90 degrees from each other, and the diffraction-grating scale 15 are arranged in the optical path of a semiconductor-laser light source 10, serving as a coherent light source. A ¼-wavelength plate 21 and a non-polarizing beam splitter 22 are arranged in the reflecting direction of the non-polarizing beam splitter 12. A polarizing plate 23a and a photosensor 16a are disposed in the reflecting direction of the non-polarizing beam splitter 22, and a polarizing plate 23b and a photosensor 16b are arranged in the transmitting direction of the non-polarizing beam splitter 22.

According to the above-described configuration, a light beam from the semiconductor-laser light source 10 passes through the collimator lens 11, the non-polarizing beam splitter 12 and a central transmitting-window portion of the annular transmission grating 214, and is substantially perpendicularly projected onto the diffraction-grating scale 15 via the cylindrical lens 13.

A +first-order diffracted light beam reflected from the diffraction-grating scale 15 is emitted with a diffraction angle θ, is returned to the original optical path at the reflecting surface 215 immediately after being refracted by the annular transmission grating 214 provided at an upper portion, and is returned to the non-polarizing beam splitter 12 by being subjected to +first-order diffraction by the diffraction-grating scale 15.

A −first-order diffracted light beam reflected from the diffraction-grating scale 15 is emitted with a diffraction angle θ in the opposite direction, is returned to the original optical path at the reflecting surface 215 immediately after being diffracted by the annular transmitting grating 214, is again diffracted and deflected by the annular transmitting grating 214, and is returned to the non-polarizing beam splitter 12 by being subjected to −first-order diffraction by the diffraction-grating scale 15.

The light beam projected from the semiconductor-laser light source 10 onto the diffraction-grating scale 15 has a polarized component whose orientation is 45 degrees with respect to the optical axes of the polarizing plates 20S and 20P. Hence, the ±first-order diffracted light beams propagated to the non-polarizing beam splitter 12 are linearly polarized light beams having planes of polarization orthogonal to each other. When the two light beams are subjected to vector synthesis after passing through the ¼-wavelength plate 21, a linearly polarized light beam whose orientation of polarization changes based on the phase difference between the two light beams is obtained. Accordingly, light/dark signals are obtained by extracting only specific orientations of polarization of light beams obtained by dividing the linearly polarized light beam by the polarizing plates 23a and 23b. The phases (timings) of these light/dark signals are provided by shifts of the orientation of polarization of the polarizing plates 23a and 23b. Hence, by shifting the orientations of polarization of the polarizing plates 23a and 23b by 45 degrees in opposite directions, the phase difference between the light-dark signals is set to 90 degrees.

In FIGS. 48 and 50, phase-difference plates may be inserted instead of the polarizing plates 20S, 20P, 23a and 23b in order to obtain a phase-difference signal. Furthermore, in FIG. 50, these polarized-state changing elements may be inserted between the annular transmission grating 214 and the reflecting surface 215.

In the above-described embodiments, partial modification may be performed with respect to the following items.

(a) The cylindrical lens 113 is replaced by an optical element having equivalent functions.

(b) The cylindrical lens 113, and the annular reflection grating 14 or the annular transmission grating 214 are integrated. For example, the annular reflection grating 14 is formed on the plane side of the cylindrical lens 113.

(c) The functions of the cylindrical lens 13 and the collimator lens 11 are replaced by the functions of toric lenses or hologram lenses.

(d) In the diffraction-grating scale 15 and the radial diffraction grating or the annular reflection grating 214, diffracted light beams having a diffraction order other than the ±first-order diffracted light beams are used.

(e) The polarizing plates 20S, 20P, 23a and 23b are replaced by prisms, each having a polarizing film, or fine-grating patterns, serving as other elements having the equivalent functions.

(f) The phase-difference plates, i.e., the ¼-wavelength plate and the ⅛-wavelength plates, are replaced by fine-structure patterns or other anisotropic materials having functions equivalent to the functions of a crystal optical element, such as quartz or the like.

(g) The same effects are obtained by providing at least two phases for a phase-difference signal and setting the phase difference to a value other than 90 degrees, and partially changing the arrangement of polarizing elements or phase-difference plates.

(h) In the above-described embodiments, the non-polarizing beam splitters 12 and 22 are used in order to guide light beams to be projected onto the diffraction-grating scale 15 and to guide rediffracted light beams to the photosensor 16, respectively. However, the light beams may be guided by using any other appropriate beam dividing/synthesizing means, such as diffraction gratings or the like, or by separating light beams by spatially shifting forward and backward optical paths, or by selectively reflecting only one of the light beams and guiding the selected light beam to the photosensor 16.

(i) For example, by changing the order of arrangement of the collimator lens 11, the non-polarizing beam splitter 12, the cylindrical lens 13, the annular reflection grating 14 and the annular transmission grating 214, another optical arrangement is adopted in order to provide a system of linearly condensing a light beam onto the diffraction-grating scale 15.

In the above-described embodiments, for example, an element having a reflecting film deposited in the vacuum on the back of a glass plate processed by etching or the like can be used as the annular reflection grating. Hence, an excellent environment resisting property is provided.

As described above, the optical encoder according to the present invention has the following effects by optimizing a state of projection of a light beam onto a diffraction-grating scale or an annular diffraction grating.

(1) The interfered wavefronts of the diffracted light beams tend to coincide with each other, a flat light-dark pattern is obtained, and a stable encoder signal having an excellent S/N ratio can be obtained.

(2) Since, for example, a plane optical element can be used as the annular reflection grating, the space of arrangement is not complicated, and a small encoder can be easily provided.

(3) Since variations in the wavelength of the light beam from the light source are corrected, an interference signal is stabilized.

(4) Since an alignment error is corrected, even an encoder in which a diffraction-grating scale and a detection head are separated can be relatively easily mounted.

(5) The size of a beam reflecting optical element is small and the number of components is small. Hence, by adding deflection means to light-beam projection means, the degree of freedom in the method or the direction of projection of a light beam onto a diffraction-grating scale is increased, and a wider posture of application can be obtained.

(6) Since rediffracted light beam is guided to the photosensor without greatly spreading, it is possible to perform detection with a small loss and an excellent S/N ratio.

The individual components shown in outline in the drawings are all well known in the optical encoder arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A grating interference encoder comprising:

an illuminating optical system;

a scale with a diffraction grating for generating two diffracted light beams having different orders by being irradiated by a coherent light beam from said illuminating optical system, said scale being movable relative to said illuminating optical system;

an annular grating for deflecting the two diffracted light beams having the different orders generated from said diffraction grating to cause the deflected light beams to be reprojected onto said diffraction grating;

a photosensor; and a beam splitter for guiding a light beam, obtained by interfering the rediffracted light beams with each other, to said photosensor.

2. An encoder according to claim 1, wherein said annular grating comprises a reflection diffraction grating.

3. An encoder according to claim 1, wherein said annular grating is a transmission diffraction grating, wherein diffracted light beams transmitted through and diffracted by said transmission diffraction grating are reflected by a reflecting optical element, and wherein twice diffracted light beams rediffracted by said transmission diffraction grating are projected onto said diffraction grating.

4. An encoder according to claim 1, wherein said annular grating is local.

5. A grating interference encoder comprising:

an illuminating optical system;

a scale with a diffraction grating for generating two diffracted light beams having different orders by being irradiated by a coherent light beam from said illuminating optical system, said scale being movable relative to said illuminating optical system;

an annular grating for deflecting the two diffracted light beams having the different orders generated from said diffraction grating to cause the deflected light beams to be reprojected onto said diffraction grating;

a linear condenser for linearly condensing the coherent light beam from said illuminating optical system onto said diffraction grating;

a photosensor; and a beam splitter for guiding a light beam, obtained by interfering the rediffracted light beams with each other, to said photosensor.

6. An encoder according to claim 5, wherein said annular grating comprises a reflection diffraction grating.

7. An encoder according to claim 5, wherein said annular grating is a transmission diffraction rating, wherein diffracted light beams transmitted through and diffracted by said transmission diffraction grating are reflected by a reflecting optical element, and wherein twice diffracted light beams rediffracted by said transmission diffraction grating are projected onto said diffraction grating.

8. An encoder according to claim 5, wherein said annular grating is local.

9. An encoder according to claim 5, wherein said linear condensing element comprises a cylindrical lens.

10. An encoder according to claim 5, wherein said linear condensing element comprises a diffraction lens.

11. A grating interference encoder comprising:

an illuminating optical system;

a scale with a diffraction grating for generating two diffracted light beams having different orders by being irradiated by a coherent light beam from said illuminating optical system, said scale being movable relative to said illuminating optical system;

an annular grating for deflecting the two diffracted light beams having the different orders generated from said diffraction grating to cause the deflected light beams to be reprojected onto said diffraction grating; and a photosensor for receiving a light beam obtained by interfering the rediffracted light beams with each other.

* * * * *

UNITED STATES PATENT AND TRADEMARK OFFICE
CERTIFICATE OF CORRECTION

PATENT NO. : 6,831,267 B2
DATED : December 14, 2004
INVENTOR(S) : Kou Ishizuka

It is certified that error appears in the above-identified patent and that said Letters Patent is hereby corrected as shown below:

Column 2,
Line 45, "a encoder" should read -- an encoder --.

Column 3,
Line 31, "objectives-relates" should read -- objectives relates --.

Column 8,
Lines 40 and 48, "angle θ" should read -- angle θ, --.

Column 9,
Lines 17 and 25, "angle θ" should read -- angle θ, --.

Column 12,
Line 56, "illustrates" should read -- illustrate --.

Column 17,
Line 31, "respect" should read -- respect to --.

Column 22,
Line 5, "an" should read -- a --.

Column 26,
Line 33, "rating," should read -- grating, --.

Signed and Sealed this

Nineteenth Day of July, 2005

JON W. DUDAS
*Director of the United States Patent and Trademark Office*